US012574082B2

(12) United States Patent
Haustein et al.

(10) Patent No.: US 12,574,082 B2
(45) Date of Patent: Mar. 10, 2026

(54) ENHANCEMENTS IN CARRIER AGGREGATION FOR WIRELESS COMMUNICATION SYSTEMS, DEVICES OPERATING THEREIN AND A METHOD FOR OPERATING A WIRELESS COMMUNICATION SYSTEM

(71) Applicant: Fraunhofer-Gesellschaft zur Foerderung der angewandten Forschung e.V., Munich (DE)

(72) Inventors: Thomas Haustein, Berlin (DE); Paul Simon Holt Leather, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 18/220,657

(22) Filed: Jul. 11, 2023

(65) Prior Publication Data

US 2023/0370135 A1 Nov. 16, 2023

Related U.S. Application Data

(63) Continuation of application No. PCT/EP2022/050543, filed on Jan. 12, 2022.

(30) Foreign Application Priority Data

Jan. 13, 2021 (EP) ..................................... 21151395

(51) Int. Cl.
*H04B 7/06* (2006.01)
*H04B 7/08* (2006.01)

(52) U.S. Cl.
CPC ....... *H04B 7/0617* (2013.01); *H04B 7/06952* (2023.05); *H04B 7/088* (2013.01)

(58) Field of Classification Search
CPC .... H04B 7/0617; H04B 7/0695; H04B 7/088; H04B 7/06952
See application file for complete search history.

(56) References Cited

U.S. PATENT DOCUMENTS 9,844,077 B1 * 12/2017 Sung ..................... H04W 72/54
2020/0007292 A1 * 1/2020 Huang ................ H04W 72/542

OTHER PUBLICATIONS

3GPP TS 37.340, "3rd Generation Partnership Project; Technical Specification Group Radio Access Network; Evolved Universal Terrestrial Radio Access (E-UTRA) and NR; Multi-connectivity; Stage 2 (Release 16)", 3GPP TS 37.340 V16.3.0 Multi-connectivity; Stage 2, Release 16, Sep. 2020, Sep. 2020, 83 pp.

(Continued)

*Primary Examiner* — Rahel Guarino
(74) *Attorney, Agent, or Firm* — Perkins Coie LLP; Michael A. Glenn

(57) ABSTRACT

A wireless communication system configured for providing wireless communication is adapted to provide a first radio channel in a radio propagation channel and in a first frequency interval and to provide a second radio channel in the radio propagation channel and in a second frequency interval differing from the first frequency interval. The wireless communication system is to obtain first radio channel information indicating a behaviour of the first radio channel and to manage beamforming for the second radio channel based on the first radio channel information.

11 Claims, 39 Drawing Sheets

200 receive beam pattern ($f_1$)
receive beam pattern ($f_2$)
receiver ($f_1$)
78 (optional)
receiver ($f_2$)
channel estimator ($f_1$)
sensor fusion unit
channel estimator ($f_2$)
side information and other constraints ($f_1$)
decision-making and beamforming unit
side information and other constraints ($f_2$)
transmitter ($f_1$)
transmitter ($f_2$)
transmit beam pattern ($f_1$)
transmit beam pattern ($f_2$)

(56) References Cited

OTHER PUBLICATIONS

3GPP TS 38.104, "3rd Generation Partnership Project; Technicial Specification Group Radio Access Network; NR; Base Station (BS) radio transmission and reception (Release 16)", 3GPP TS 38.104 v16.5.0, Base Station (BS) radio transmission and reception Rel. 16, Sep. 2020, Sep. 2020, 277 pp.

3GPP TS 38.213, "3rd Generation Partnership Project; Technical Specification Group Radio Access Network; NR; Physical layer procedures for control (Release 15)", 3GPP TS 38.213 v15.0, "Physical layer procedures for control", 2017, Dec. 2017, 56 pp.

3GPP TS 38.300, "3rd Generation Partnership Project; Technical Specification Group Radio Access Network; NR; NR and NG-RAN Overall Description; Stage 2 (Release 15)", 3GPP TS 38.300 v15.0, "NR and NG-RAN Overall Description", 2017, Dec. 2017, 68 pp.

3GPP TS 38.300, "3rd Generation Partnership Project; Technical Specification Group Radio Access Network; NR; NR and NG-RAN Overall Description; Stage 2 (Release 16)", 3GPP TS 38.300 v16.0, "NR and NG-RAN Overall Description", 2019, Dec. 2019, 101 pp.

3GPP TS 38.321, "3rd Generation Partnership Project; Technical Specification Group Radio Access Network; NR; Medium Access Control (MAC) protocol specification (Release 15)", 3GPP TS 38.321 v15, "Medium Access Control (MAC) protocol specification", 2017, Dec. 2017, 55 pp.

Apple Inc, "On common beam management assumptions and PSD difference in FR2 CA", 3GPP RAN-WG4 Meeting #95-e R4-2006633, Jun. 2020, URL: https://ftp.3gpp.org/tsg_ran/WG4_Radio/TSGR4_95_e/Docs/R4-2006633.zip R4-2006633 (May 15, 2020), XP051883698 [X] 37,38 * Section 2.2; p. 5-p. 6 * [A]2,4-8,13-22 [I] 1,3,9-12,23-36,39, May 15, 2020, 8 pp.

ETSI TS 138 101-2, "5G; NR; User Equipment (UE) radio transmission and reception; Part 2: Range 2 Standalone", 3GPP TS 38.101-2 v16.4, "Radio Transmission and Reception", 2020, Jul. 2020, 176 pp.

ETSI TS 138 306, "5G; NR; User Equipment (UE) radio access capabilities (Release 16)", 3GPP TS 38.306 v16.1, "User Equipment (UE) radio access capabilities", 2020, Jul. 2020, 107 pp.

* cited by examiner

100

$22_1$

UE $22_2$ gNB
$(f_1 + f_2)$ scenario 1 scenario 2

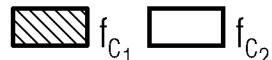
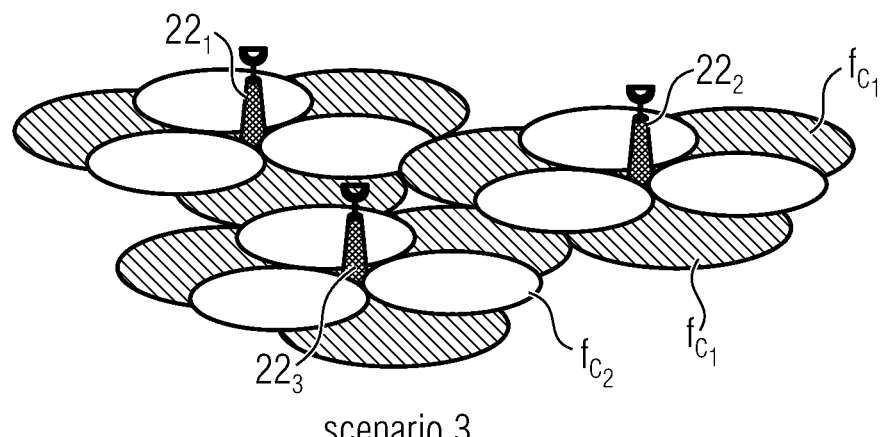
scenario 3
Fig. 14c
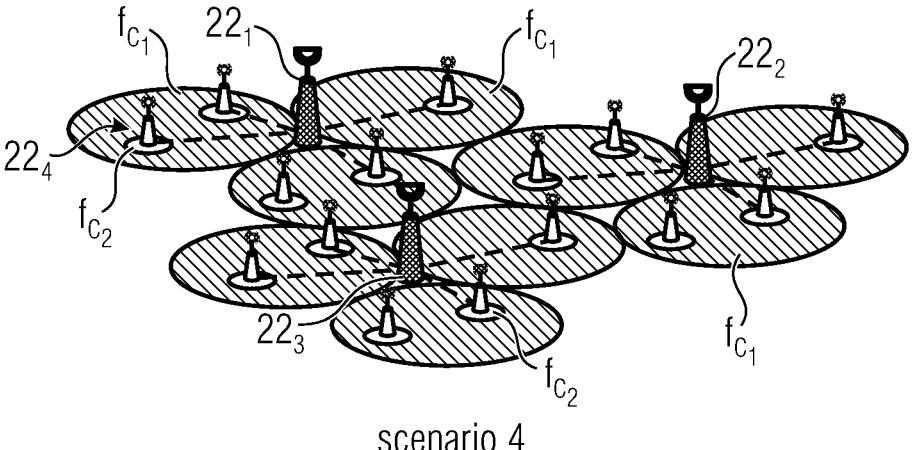
scenario 4
Fig. 14d scenario 5

| design parameter / system metric | | link budget (LB) [dB] — 68₁ | beamwidth (BW) [°] — 68₂ | angular resolution (AR) [°] — 68₃ |
|---|---|---|---|---|
| effective aperture (AE) [m] — 66₁ | same | $AE_1 = AE_2$ → $LB_1 = LB_2$ | condition: $f_1 < f_2$ | |
| | dissimilar | $AE_1 > AE_2$ → $LB_1 > LB_2$ | $BW_1 > BW_2$ | $AR_1 > AR_2$ |
| | dissimilar | $AE_1 < AE_2$ → $LB_1 < LB_2$ | depends on ratio of AE/f | depends on ratio of AE/f |
| number of elements per array (Nele) [] — 66₂ | same | $Nele_1 = Nele_2$ → $LB_1 > LB_2$ | condition: $f_1 < f_2$ | |
| | dissimilar | $Nele_1 > Nele_2$ → $LB_1 > LB_2$ | $BW_1 < BW_2$ | $AR_1 < AR_2$ |
| | dissimilar | $Nele_1 < Nele_2$ → depends on ratio of f/Nele | $BW_1 > BW_2$ | $AR_1 > AR_2$ |

Fig. 32

| system metric / operating parameter | temporal resolution (TR) [s] condition: any $f_1$ and any $f_2$ | |
|---|---|---|
| system bandwidth (SBW) [MHz] | | |
| same | $SBW_1 = SBW_2$ | $TR_1 = TR_2$ |
| dissimilar | $SBW_1 < SBW_2$ | $TR_1 < TR_2$ |
| | $SBW_1 > SBW_2$ | $TR_1 > TR_2$ |

ENHANCEMENTS IN CARRIER AGGREGATION FOR WIRELESS COMMUNICATION SYSTEMS, DEVICES OPERATING THEREIN AND A METHOD FOR OPERATING A WIRELESS COMMUNICATION SYSTEM

CROSS-REFERENCE TO RELATED APPLICATIONS

This application is a continuation of copending International Application No. PCT/EP2022/050543, filed Jan. 12, 2022, which is incorporated herein by reference in its entirety, and additionally claims priority from European Application No. 21151395.7, filed Jan. 13, 2021, which is also incorporated herein by reference in its entirety.

TECHNICAL FIELD

The present invention relates to a wireless communication system, to a device for operating in a wireless communication system and to a method for operating a wireless communication system, a device respectively. The present invention further relates to inter-band beam management assistance (IB-BMA).

BACKGROUND OF THE INVENTION

In modern communication scenarios related to network elements e.g., a basestation (gNB) and a user equipment (UE), the achievable data rate per communication link may be limited by the available bandwidth in any particular band. Since different wireless services are allocated to different parts of the spectrum, an aggregation of bands or spectrum is sometimes used to compensate for the limited system bandwidth associated with a particular band. In this context, the framework of carrier aggregation allows the aggregation of multiple bands which might be separated significantly in the frequency domain e.g., 3.5 GHz and 28 GHz.

Thus, there is a need to enhance operation of wireless communication networks.

It is thus, an object of the present invention to provide for enhancements in operation of wireless communication systems and associated devices.

SUMMARY

An embodiment may have a wireless communication system configured for providing wireless communication, the wireless communication system adapted to: provide a first radio channel in a radio propagation channel and in a first frequency interval; provide a second radio channel in the radio propagation channel and in a second frequency interval differing from the first frequency interval; obtain first radio channel information indicating a behaviour of the first radio channel; and manage beamforming for the second radio channel based on the radio channel information.

Another embodiment may have a device configured for operating in a wireless communication system, the device configured for: using a first radio channel in a first frequency interval; using a second radio channel in a second frequency interval differing from the first frequency interval; and providing information associated with using the first radio channel and using the second radio channel.

The present invention is based on the finding that different radio channels being operated in different frequency intervals, e.g., carriers, sub carriers or the like, share some similarities in a same radio propagation channel despite the differences in frequency intervals. Those similarities may be recognized and may be exploited by manage beam-forming in a frequency interval based on knowledge obtained in a different frequency interval.

According to an embodiment, a wireless communication system configured for providing a wireless communication is to provide a first radio channel in a radio propagation channel and in a first frequency interval. The wireless communication system is to provide a second radio channel in the radio propagation channel and in a second frequency interval differing from the first frequency interval. The wireless communication system obtains first radio channel information indicating a behaviour of the first radio channel and manages beam-forming for the second radio channel based on the first radio channel information.

According to an embodiment, a device configured for operating in a wireless communication system is configured for using a first radio channel in a first frequency interval and for using a second radio channel in a second frequency interval differing from the first frequency interval. The device is configured for providing information associated with using the first radio channel and using the second radio channel. This allows a recipient of such information to adapt beam-forming in other frequency intervals, i.e., in the second frequency interval, the first frequency interval respectively.

According to an embodiment, a method for operating a wireless communication system comprises providing a first radio channel in a radio propagation channel of the wireless communication system and in a first frequency interval. The method further comprises providing a second radio channel in the radio propagation channel and in a second frequency interval differing from the first frequency interval. The method further comprises obtaining a first radio channel information indicating a behaviour of the first radio channel and managing beam-forming for the second radio channel based on the first radio channel information.

According to an embodiment, a method for operating a device comprises using a first radio channel in a first frequency interval and using a second radio channel in a second frequency interval differing from the first frequency interval. The method further comprises providing information associated with using the first radio channel and using the second radio channel.

BRIEF DESCRIPTION OF THE DRAWINGS

Advantageous embodiments are described, in the following, whilst making reference to the accompanying drawings, in which:

FIG. 14a-e show different deployment scenarios or wireless communication networks that may form a basis for embodiments described herein;

FIG. 32 shows a table comprising rows assigned to design parameters and columns ascribed to performance metrics according to embodiments;

FIG. 33 shows a tabular representation of a frequency independent relationship between system bandwidth (SBW) and temporal resolution (TR); according to an embodiment;

DETAILED DESCRIPTION OF THE INVENTION

Figure 1:
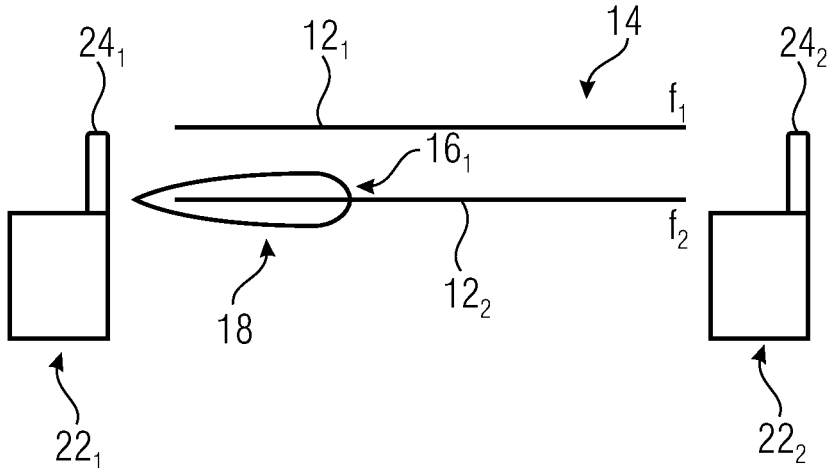
FIG. 1 shows a schematic block diagram of a wireless communication system according to an embodiment.

Equal or equivalent elements or elements with equal or equivalent functionality are denoted in the following description by equal or equivalent reference numerals even if occurring in different figures.

In the following description, a plurality of details is set forth to provide a more thorough explanation of embodiments of the present invention. However, it will be apparent to those skilled in the art that embodiments of the present invention may be practiced without these specific details. In other instances, well known structures and devices are shown in block diagram form rather than in detail in order to avoid obscuring embodiments of the present invention. In addition, features of the different embodiments described hereinafter may be combined with each other, unless specifically noted otherwise.

FIG. 1 shows a schematic block diagram of a wireless communication system 100 according to an embodiment. The wireless communication system is configured for providing wireless communication, for example, by using radio access technologies such as long term evolution (LTE), 5G, 6G, new radio, Wi-Fi, or the like. For example, the wireless communication system may provide for wireless communication that uses a technique being referred to as beamforming, and that allows to selectively direct a transmitted signal by using an antenna pattern, and/or by forming a reception beam pattern as an antenna pattern for adapting or controlling a directivity of a sensitivity of reception.

The wireless communication system provides a first radio channel in a propagation channel of the wireless communication system and in a first frequency internal being referred to as, for example, by a parameter $f_1$ which may indicate a centre frequency. Further, the wireless communication system provides a second radio channel $12_2$ in the same radio propagation channel 14, wherein the second radio channel is provided in a second frequency interval differing from the first frequency interval, which is indicated by a second frequency $f_2$. The first frequency interval and the second frequency interval may differ in at least one of a bandwidth, a centre frequency, a minimum frequency and a maximum frequency. For example, the frequency intervals are disjointed. According to an embodiment, the first frequency interval and the second frequency interval refer to different bandwidth parts, sub-channels, or frequency ranges.

As will be described later in more detail, the first frequency interval and the second frequency interval may relate to at least one of being location within a same frequency band, e.g., intra-band carry aggregation, or in different frequency bands, e.g., inter-band carry aggregation; forming a continuous frequency interval, e.g., intra-band contiguous carry aggregation; and forming a discontinuous frequency interval, e.g., intra-band non-contiguous carry aggregation. Wherein a corresponding behavior may also be implemented, without specific limitations, when referring to dual connectivity or a mufti-connectivity.

The wireless communication system obtains first radio channel information $16_1$ indicating a behaviour of the radio channel $12_1$. The wireless communication system manages beam-forming, i.e., forming an antenna pattern 18, for the radio channel $12_2$ based on the radio channel information $16_1$. That is, information obtained from a channel that operates in a different frequency is used for adapting beam-forming used in the radio channel $12_2$. The antenna pattern 18 may be a transmission pattern or and/or a reception pattern. As a pattern a set of at least one (main) lobe may be understood, possibly together with at least one but usually a plurality of sidelobes, wherein nulls, i.e., minima of transmission power or reception sensitivity may be arranged between lobes.

The radio channels $12_1$ and $12_2$ may be formed between or used by same or different wireless devices $22_1$ and $22_2$ which is explained in more detail later. It may be sufficient, that both radio channels $12_1$ and $12_2$ use, at least in parts, a same radio propagation channel. Devices $22_1$ and $22_2$ may each comprise a wireless interface $24_1$, $24_2$ respectively, providing for the possibility of beam forming, i.e., they may comprise a set of antenna elements, which may be connected to a beam-former or beam-forming entity.

The radio channel information $16_1$ may be provided by one of the devices $22_1$ and $22_2$ and/or by a different entity within the wireless communication system being configured for performing measurements and/or evaluation on the behaviour of the radio channel $12_1$.

Embodiments address an identified deficiency in the current 3GPP technical specification for LTE and NR when a UE is communicating with the network using several wireless links on different component carriers/parts of allocated spectrum and/or to different basestations allowing an aggregation of wireless links and their associated bandwidth/capacities for the purpose of robustness or data rate aggregation for the provided service transmitted over the wireless air interface between the UE and the network.

Figure 2A:
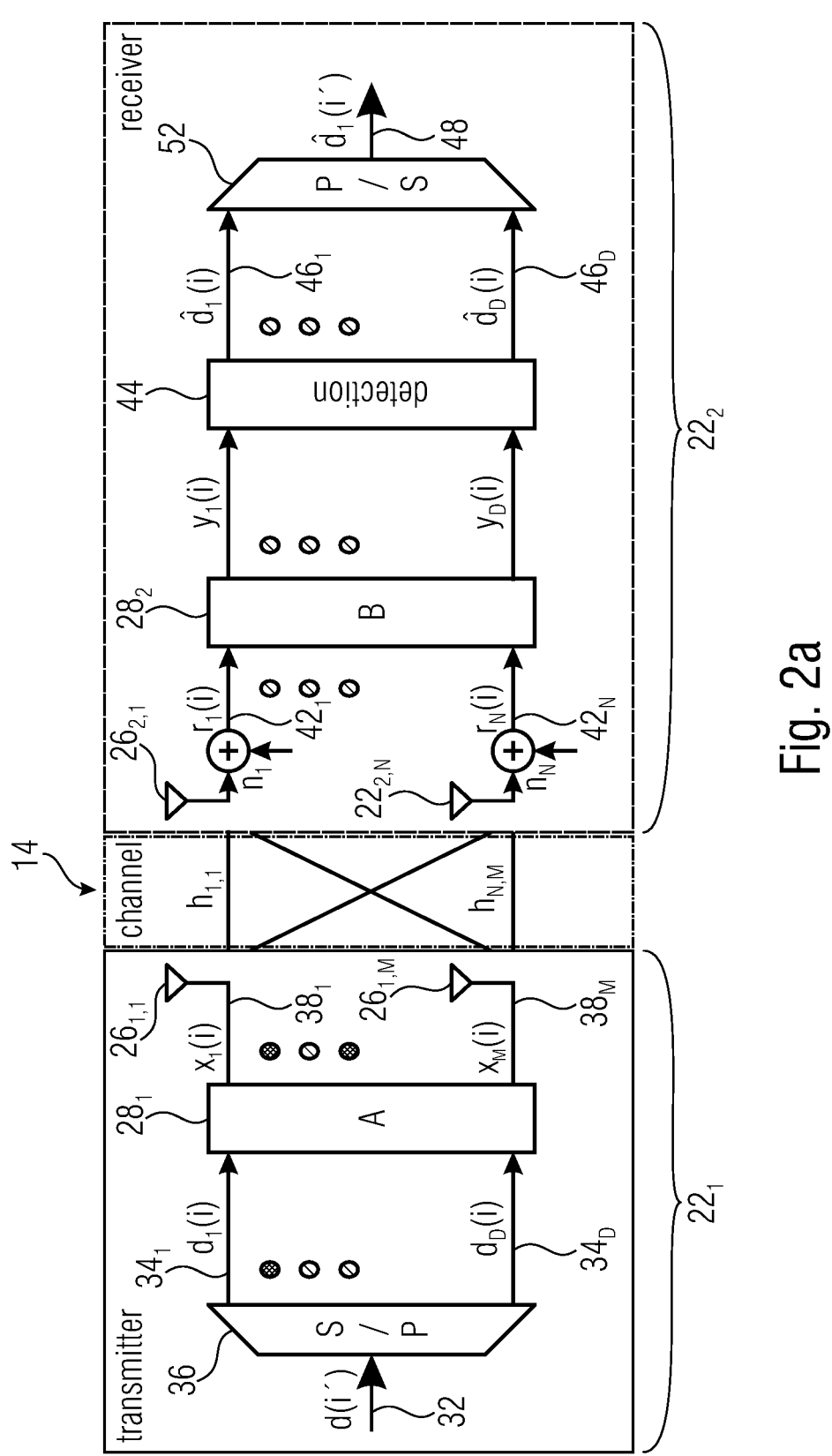
FIG. 2a shows a schematic illustration of a propagation channel according to an embodiment.
Figure 2B:
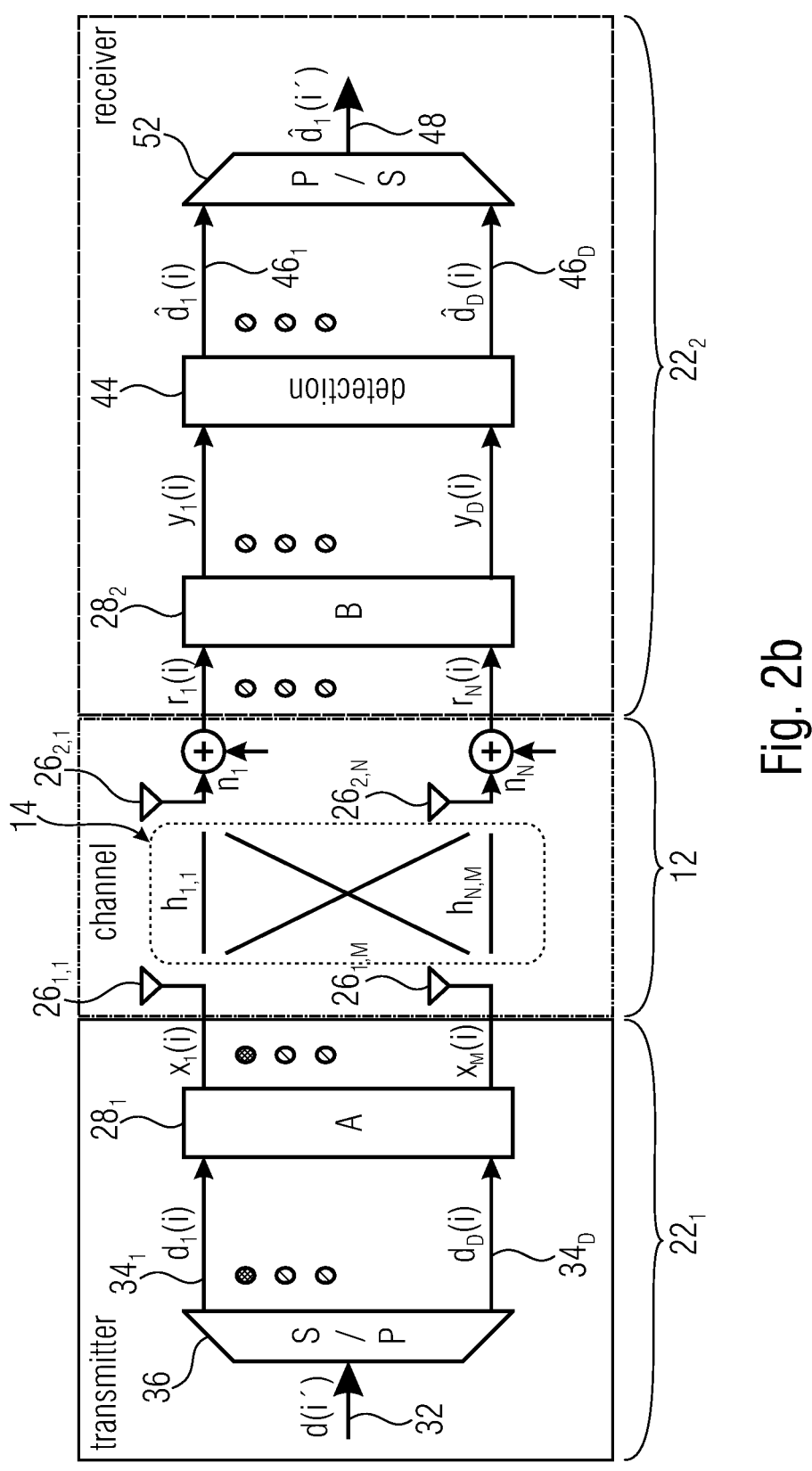
FIG. 2b shows a schematic illustration of a radio channel according to an embodiment.

FIGS. 2a and 2b show schematically different relationships between a transmitter device $22_1$ and a receiver device $22_2$ to emphasize the difference between the radio propagation channel 14 and a radio channel $12_1$, $12_2$ respectively of FIG. 1. Both figures have in common, on a transmitter side antenna elements $26_{1,1}$ to $26_{1,M}$ being controlled by a beam-forming or unit beamformer $28_1$, which is fed, based on a signal 32 being split to part signals $34_1$ to $34_D$ by a serial/ parallel unit 36. The beamformer 28 may control the antenna elements $26_{1,1}$ to $26_{1,M}$ by use of beam-forming control signals $38_1$ to $38_m$.

On the receiver side, a device $22_2$, antenna elements $26_{2,1}$ to $22_{2,N}$ may be used to obtain reception signals $42_1$ to $42_N$ which are received by a beamformer $28_2$ and forwarded to a detection circuit 44 so as to obtain part signals $46_1$ to $46_D$ which may be combined to a reception signal 48 by use of a parallel/serial unit 52.

Whilst specific details on implementing transmitter $22_1$ and/or receiver $22_2$ may vary in different embodiments, FIGS. 2a and 2b illustrate that the respective radio channel 12 not only comprises the radio propagation channel 14, but also incorporates the specifics of the antenna elements $26_{1,1}$ to $26_{1,M}$ and/or $26_{2,1}$ to $26_{2,N}$.

In other words, it is recognized that due to the physics of wave propagation in space, the properties of the propagation channel between two points A and B (for example the location of a basestation and a UE) are generally similar in terms of the number of relevant multipath components, the power delay spectrum and the power angular distribution spectrum. Furthermore, such properties are largely frequency independent. FIG. 2a illustrates the concept of the propagation channel as an entity which is separate to that of the transmitter (including its antennas) and the receiver (also including its antennas).

In other words, FIG. 2a shows an example of a wireless communication link in which the transmitter comprises antennas used for transmission, the receiver comprises antennas used for reception and the channel is therefore void of hardware implementations. In this sense, the channel is better referred to as the "propagation channel".

In order to facilitate wireless communication, the propagation channel is effectively connected to devices/nodes (e.g., transmitters and receivers) via antennas which have particular physical properties. In effect, the antennas, the RF-frontends, the communication architecture and the propagation channel combine to form an effective radio channel that entails the use of suitable and appropriate transmission and reception schemes. FIG. 2b illustrates the concept of the radio channel as an entity which includes the antennas used for both transmission and reception together with the propagation channel introduced earlier.

That is, FIG. 2b shows a common model of a wireless communication link in which the channel comprises both propagation and antenna effects. In this sense, the channel is better referred to as the "radio channel".

In practice, antenna design and in particular the design of beam forming antennas and electronically scanned antenna arrays are highly dependent on the link budget and spherical coverage requirements of the nodes forming the wireless link and, most importantly, are very frequency and hence band specific. As a rule of thumb, higher frequencies can be said to create a larger pathloss between the transmit and receive antennas because their effective aperture decreases as a function of frequency.

The design of the antenna and antenna array normally follows engineering objectives including: link range or distance; electronic scan angle for beamforming; effective aperture to control sensitivity (beamwidth, sidelobe levels and null steering); and so on. As a result, the aggregation of wireless links in different frequency bands may experience significant differences with respect to the effect of the radio channel on multiple components carriers. Conversely however, due to the general frequency independent nature of the propagation channel per se, certain similarities may also exist.

In view of the differences and similarities described above, the inventors have identified the opportunity to exploit such effects when communication links are comprised of multiple component carriers as used for example in inter-band carrier aggregation (CA) combinations such as 3.5 GHz and 28 GHz or 28 GHz and 60 GHz or 3.5 GHz, 28 GHz and 60 GHz.

The inventors have also identified that certain design parameters have significant and systematic effects on radio link performance metrics and that these parameters may be chosen during the design phase or subsequently during configuration and operation according to common or complementary target metrics. Example metrics include: the effective line-of-sight pathloss over a fixed distance; the beamwidth of actively beamformed antenna patterns; the maximum scan angle of an electronically scanned antenna; the beam pointing resolution; the minimum achievable side-lobe level; and so on.

The inventors have similarly identified the benefits of aggregating two or more frequency bands for a communication link while the effective radio channels for the multiple bands are sharing common parts of the propagation channel and can therefore benefit from assisting each other in channel estimation and link optimization when exchanging observations (i.e., measured channel parameters) or transmit configurations.

In the following, three example scenarios of wireless communication system 100 with common radio channel properties are illustrated.

Figure 3:
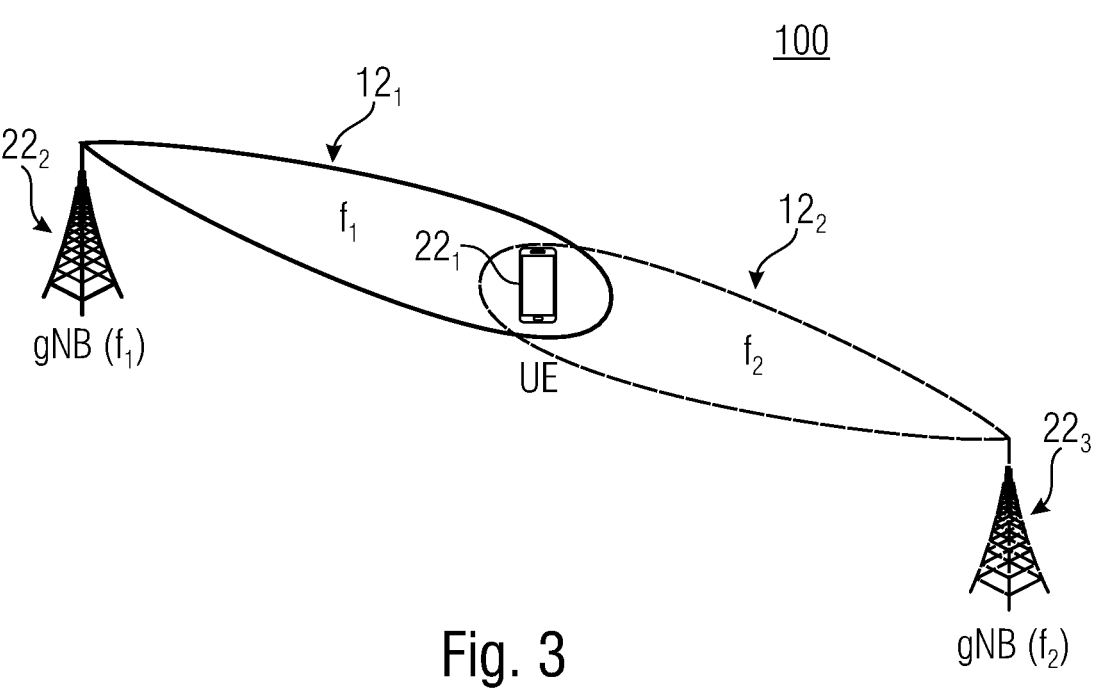
FIG. 3 shows a schematic illustration of a scenario of a wireless communication system using dual connectivity according to an embodiment.

Scenario 1: With reference to FIG. 3, a UE $22_1$ is communicating with two gNBs $22_2$ and $22_3$, each located at very different geo-locations and using different frequencies, $f_1$ and $f_2$. In the scenario shown, while the direction of arrival (DoA) of dominant incoming waves associated with each distant gNB may reveal substantial differences, the DoA of less dominant waves related to reflectors in the close proximity of UE may disclose similarities.

FIG. 3 shows an example of scenario 1: An example of dual connectivity (DC) in which two basestations (gNBs) operate in different frequency bands (denoted $f_1$ and $f_2$) and establish communication with a user equipment (denoted UE). Since the gNBs are in locations that are some distance apart, the propogation channel associated with gNB ($f_1$) and the UE is likely to be different to that associated with gNB ($f_2$) and the UE.

Figure 4:
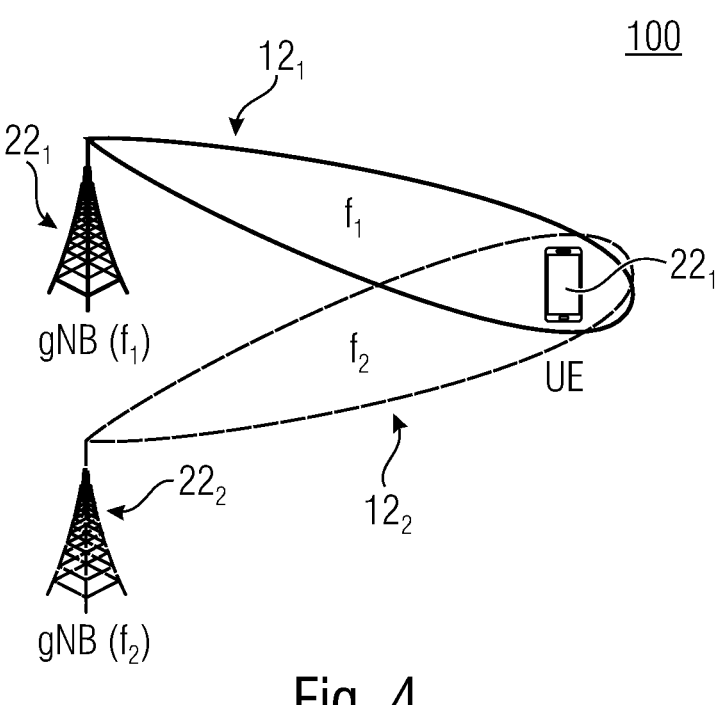
FIG. 4 shows a schematic illustration of a scenario of a wireless communication system using dual connectivity in which two basestations operate in different frequency bands according to an embodiment.

Scenario 2: With reference to FIG. 4, a UE is wirelessly connected to two gNBs, one belonging to the P-Cell the other to the S-Cell. In contrast to Scenario 1, yet with the same UE perspective, the gNBs' geolocation may be seen as similar. For example, in the case when the UE is located in an open courtyard, the DoA associated with the waves arriving from each gNB may look very similar. Observations of the received signal from MNO-A may therefore be easily correlated to observations of the received signal from MNO-B. Such effects might continue to be seen even when the UE moves indoors from the open court yard and the pathloss is therefore increased. For example, consider that MNO-A operates in the 2.6 GHz band while MNO-B uses the 3.8 GHz band. Even though the operating frequency is significantly different, the change in the pathloss experienced with each band when going from outdoors to indoors will be correlated. Now while on the one hand it can be said that the lower frequency band will generally experience lower into-building penetration loss and might therefore provide a stronger signal for exact measurements, on the other hand, as the available spectrum at 3.8 GHz is expected to be larger (and hence the coherence bandwidth), this can be used to mitigate the effects of small-scale fading associated with the indoor multipath propagation environment. In effect, whereas thus far the two or more component carriers were only used as a means to increase bandwidth through carrier aggregation, the inventors claim that the frequency separation of the carriers can be exploited for additional benefits.

FIG. 4 sows an example of scenario 2, i.e., an example of dual connectivity (DC) in which two basestations (gNBs) operate in different frequency bands (denoted $f_1$ and $f_2$) and establish communication with a user equipment (denoted UE). Even though the gNBs are not co-located, significant similarities exist between the propogation channels associated with the gNB ($f_1$) UE and the gNB ($f_2$) UE connections.

Figure 5:
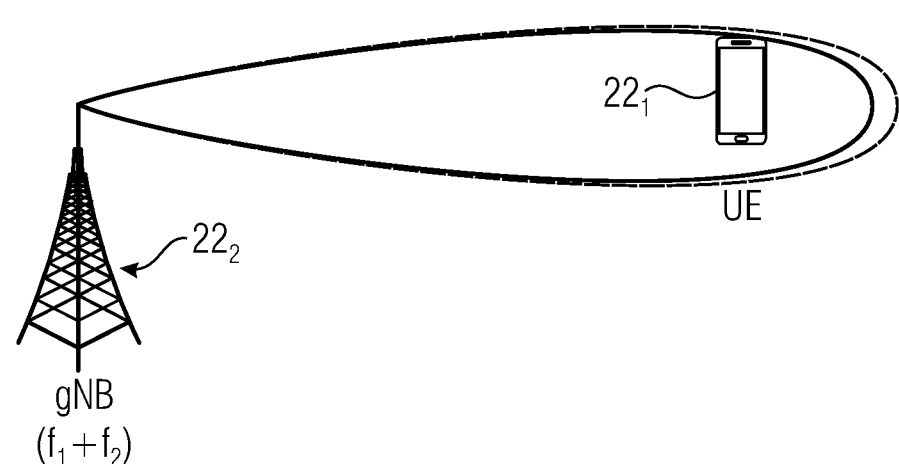
FIG. 5 shows a schematic illustration of a scenario of a wireless communication system using carrier aggregation connectivity in which a basestation operates one or more component carriers.

Scenario 3: With reference to FIG. 5, a UE is connected to two component carriers which can be aggregated by the same basestation (gNB). As the gNB's antennas are co-located, they thus experience the same propagation channel. In case the antennas used to transmit and receive the two or more bands are similar in orientation, polarization, direction, directivity and beamwidth, the two bands are connected to the propagation channel in a very similar way and therefore the radio waves will propagate from the location of the gNB to the location of the UE via many shared and common multipath components. As a result, observations in the one band provide valuable information about the propagation channel which is common to all bands. However, due to certain practical considerations that might influence the effective radio channel—including UE antenna design parameters such as directivity, beamwidth, aperture and polarization—the observation capabilities of the UE in one band might be superior to that in other bands.

FIG. 5 shows an example scenario 3: An example of carrier aggregation (CA) connectivity in which a basestation (denoted gNB) operates one or more component carriers (CCs) in different frequency bands (denoted $f_1$ and $f_2$). Although the gNB in effect operates two radio connections, they are considered to be quasi co-located (QCL). Even though two frequency bands are used ($f_1$ and $f_2$), the characteristics of the propogation channel associated with the connections between the gNB and the UE are likely to be similar due to the QCL of the communications link.

Thus, in view of the described embodiments, the radio channel may be unidirectional between a first node and a second node and/or bidirectional. The first node may be, for example, a basestation, a UE, a relay a spectrum monitoring device or any other node. The second node may be, accordingly, a basestation, a UE, a relay, a spectrum monitoring device or any other node. Through the teaching of the above given examples with deployment scenarios 1-3, the inventors identified a significant benefit from assisted beam management across the multiple bands used in carrier aggregation (CA) and/or dual connectivity (DC).

The resulting differences according to the aggregated wireless links between UE and gNB with respect to link-relevant metrics—including beamwidth, field of view, effective pathloss, antenna gain, beam steering angle, effective multipath resolution in time, frequency and space—can be selectively chosen, tuned and exploited to thus assist cross-component carrier beam management. As an example, initial and coarse beam alignment between the two antenna arrays at each end of a bi-directional wireless link operating in a high signal-to-noise ratio environment can be completed quickly and reliably even when using beams with large beamwidths and a moderate multipath resolution capability as might be offered by simple arrays if their elements are arranged in a 1×4 or 2×8 uniform rectangular array (URA). With the proviso that the two non-contiguous CA bands deploy a similar number of antenna elements, equally-spaced (in terms of wavelength, typically lambda-by-two), and with the same transmit power and antenna gain at both the transmit and receive sides, the frequency bands will experience a difference in pathloss which is proportional to the square of the carrier frequencies (due to the different effective apertures of the antenna arrays). Therefore, the low frequency band may allow for channel observations at a higher and thus "better" level of SNR.

In a further example, the antenna design for the higher frequency band ($f_2$) uses an increased number of antenna elements, again with half-wavelength spacing, thus resulting in a narrower beamwidth, a higher antenna gain and there-fore, improved multipath resolution. On the other hand, the instantaneous observation angle or field of view (FoV) will be reduced compared to an array with a smaller number of antenna elements. Assuming that the effective pathlosses in the two bands at $f_1$ and $f_2$ are similar as too are the orientations and pointing directions of the antenna arrays, then the main differences between the two bands are in FoV and the resulting multipath resolution. As a direct conse-quence, observations in $f_1$ allow more multipath components to be collected over a wider DoA incidence in a given time interval, while observations in $f_2$ cover fewer multipath components at a higher spatial resolution (in the same time interval). Combinations of time (equivalent to system band-width of one band) and spatial resolution (angular resolution for DoA components due to the number of antenna elements used for beamforming) allow for larger or smaller differ-ences in observation accuracy or measurement uncertainty between $f_1$ and $f_2$. In view of these effects, a judicious choice of the band or frequency used for observations can thus be made.

Since the properties and the configurable parameters of the antenna arrays at the UE used for multi band aggregation and/or dual connectivity can be calibrated and stored in a memory at the UE and eventually shared with the network, deployment scenario dependent and beam management spe-cific cross-carrier or cross-band assistance procedures can be executed. This allows improved beam management capa-bilities to be exploited through the exchange of cross band information.

Embodiments describe such potential benefits, the related parameterization and configuration, suitable deployment scenarios and use cases and procedures and associated protocols and messages enabling the exploitation and lever-aging of the aforementioned features and correlations.

Background

Figure 6:
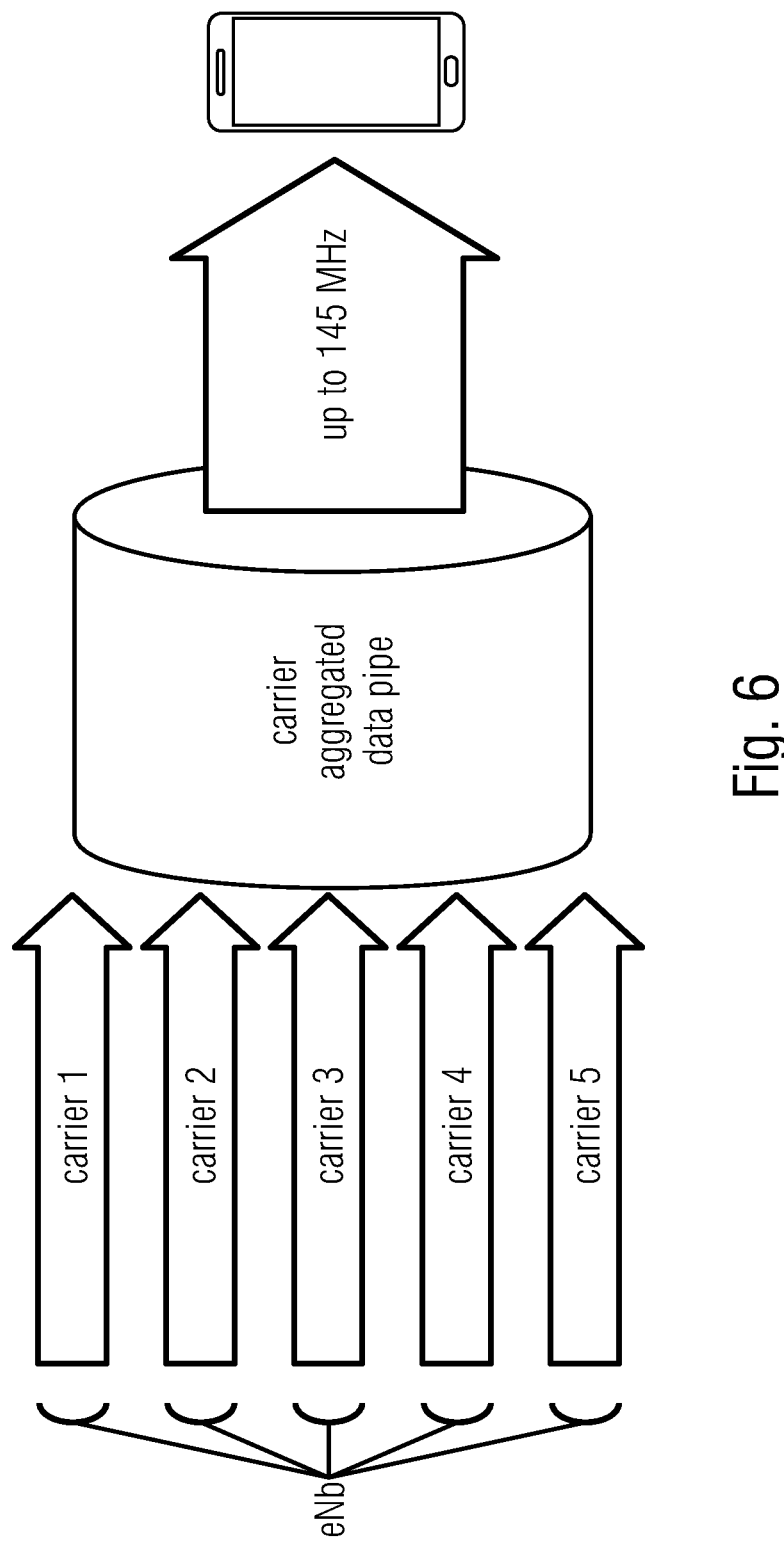
FIG. 6 shows an example of carrier aggregation in LTE which may be used in embodiments.

To support the demand for the increased data rates asso-ciated with each communication link between a basestation and a user equipment, larger amounts of bandwidth are used. However, as the resulting system bandwidth used for a specific link is often not obtainable within a given frequency band using a single component carrier, several component carriers need to be combined or aggregated. Such methods have been used since the introduction of 4G LTE in which several component carriers, each with a maximum system bandwidth of 20 MHz, are bundled together in order to achieve a higher aggregated wireless communication pipe as described in FIG. 6 showing an example of carrier aggre-gation in LTE.

Figure 7:
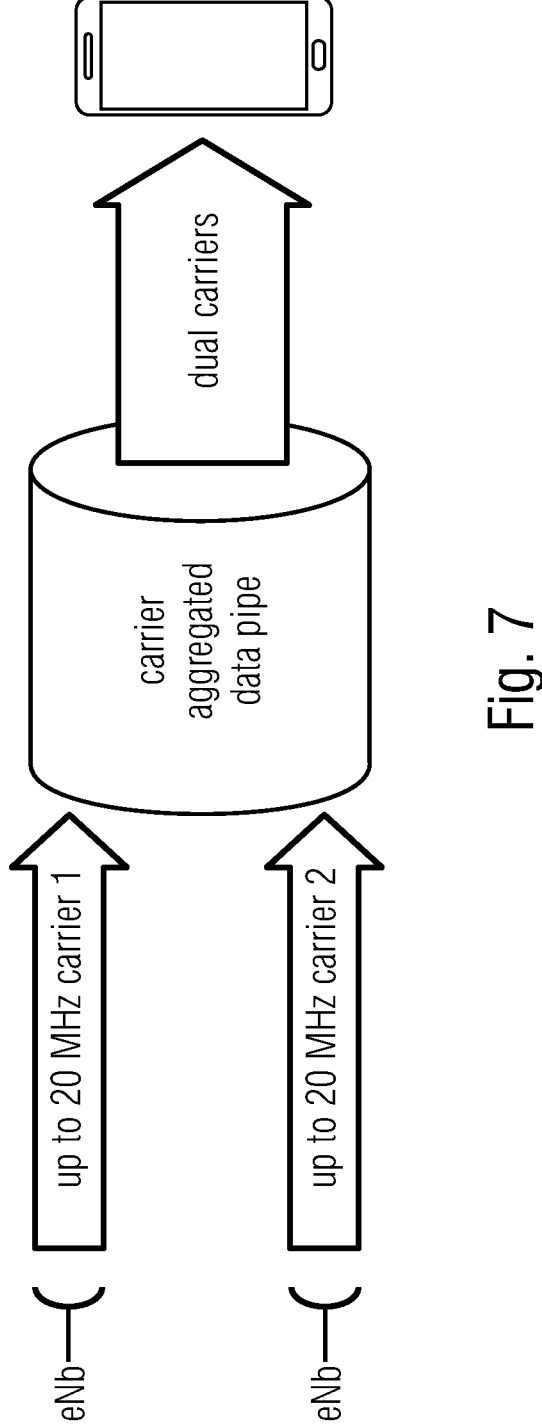
FIG. 7 shows an example of dual connectivity in LTE according to an embodiment.
Figures 8, 9:
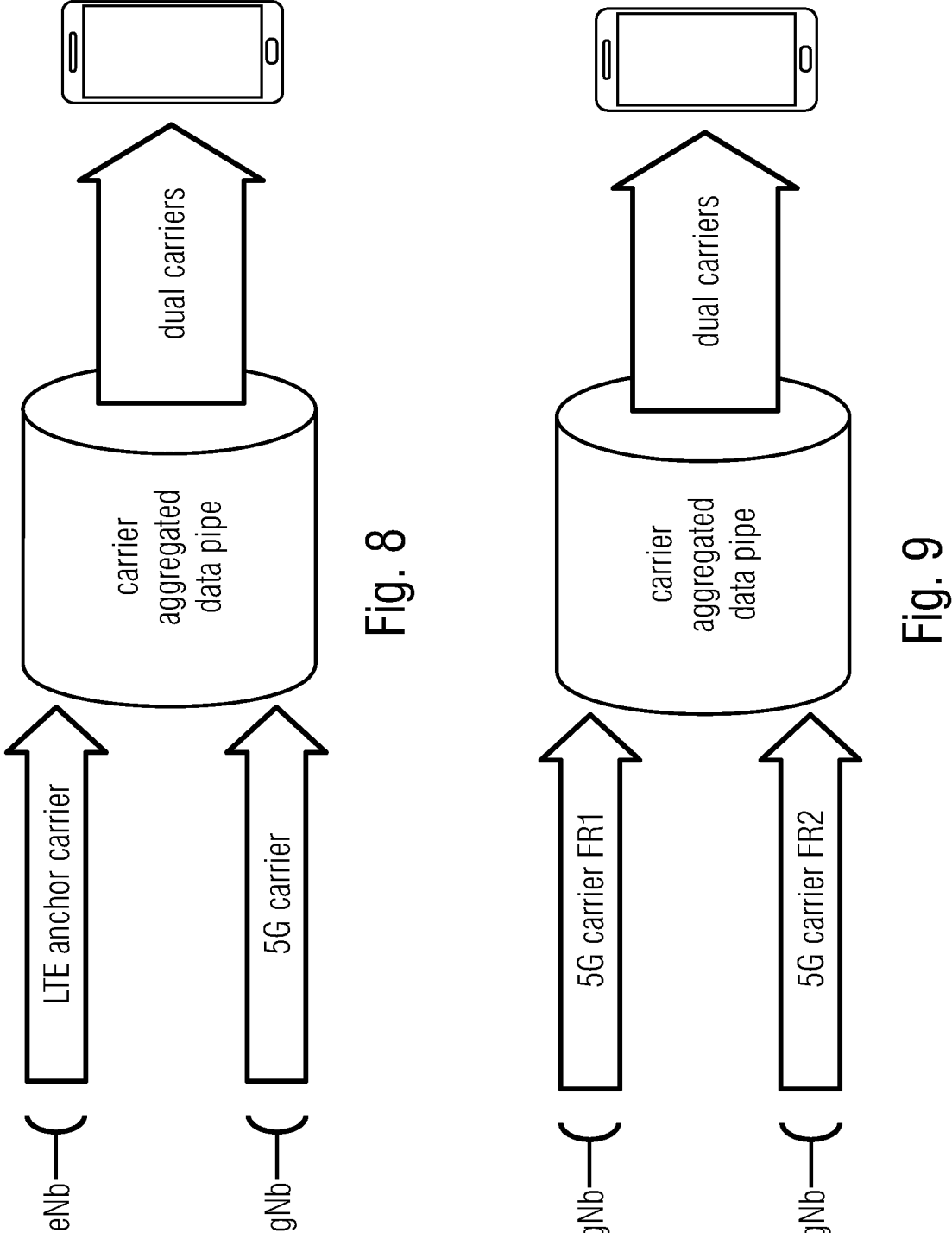
FIG. 8 shows an example of carrier aggregation of LTE eNB and NR gNB carriers according to an embodiment.
FIG. 9 shows an example of stand-alone (SA) carrier aggregation in 5G-NR using component carriers in FR1 and FR2 according to an embodiment.

The aggregation of component carriers can be done within the framework of LTE-CA or NR-CA (see FIG. 6 and FIG. 9, respectively), and can be extended by using mechanisms of dual connectivity (DC) between similar (see FIG. 7 showing an example of dual connectivity in LTE) or differ-ent (see FIG. 8 showing an example of EN-DC showing the carrier aggregation of LTE eNB and NR gNB carriers according to the concept of non-stand-alone (NSA) deploy-ment used in 4G-LTE and 5G-NR) radio access technologies (RATs). Furthermore, the concept of CA can be applied in the unlicensed band (NR-U) allowing to operate multiple component carriers for example in the ISM band. This section provides a brief background to Carrier Aggregation and Dual Connectivity. FIG. 9 shows an example of stand-alone (SA) carrier aggregation in 5G-NR using component carriers in FR1 and FR2.

Carrier Aggregation

Figure 10:
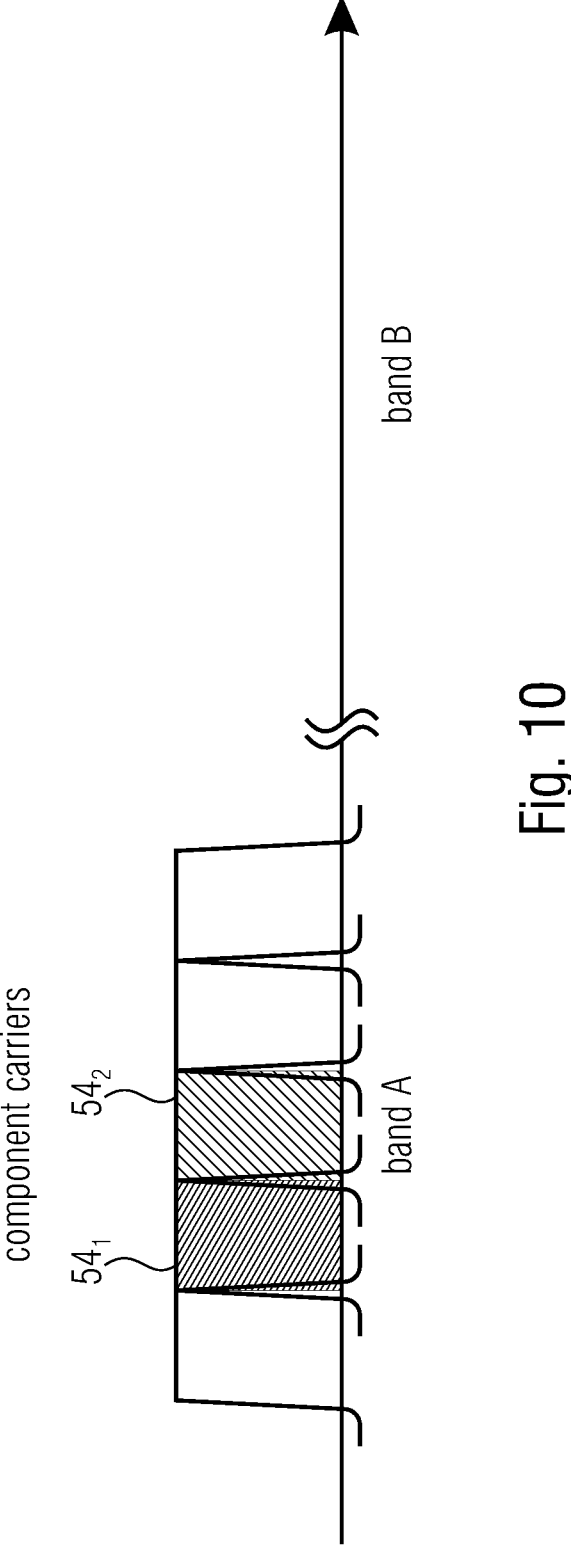
FIG. 10 a schematic diagram representing the concept of intra-band contiguous carrier aggregation according to an embodiment.
Figures 11, 12:
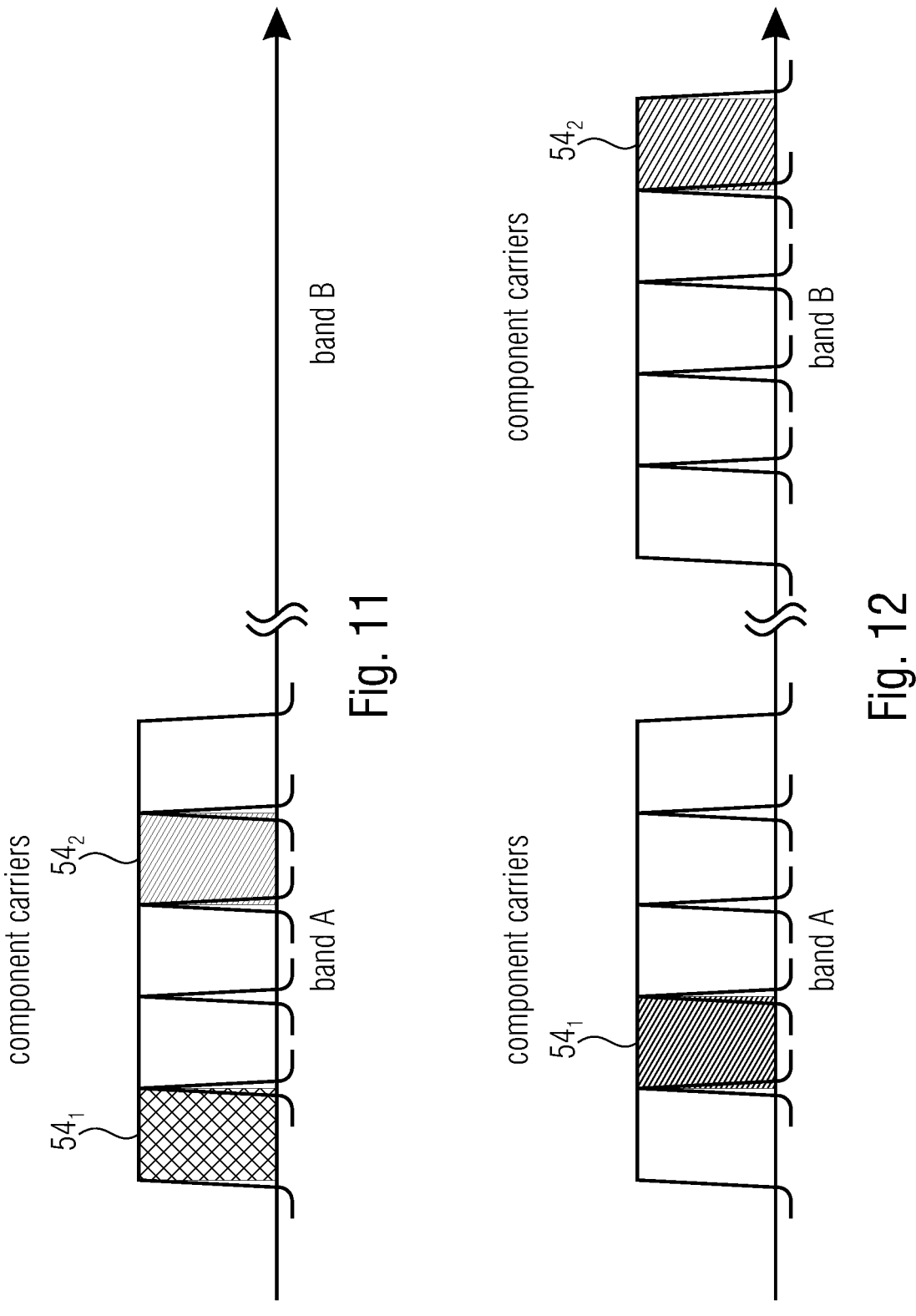
FIG. 11 a schematic diagram representing the concept of intra-band non-contiguous carrier aggregation with component carriers according to an embodiment.
FIG. 12 a schematic diagram representing the concept of inter-band aggregation with non-contiguous component carriers according to an embodiment.

According to embodiments, the first radio channel $12_1$ and the second radio channel $12_2$ may, at least temporarily, both be provided between a first node of the wireless communi-cation system and a second node, i.e., same nodes, of the wireless communication system. Carrier aggregation (CA) is well-established feature in LTE-Advanced and is a part of 5G-NR from its first release—see, for example, [1] [2] and [3]. Many features of NR CA are also applicable to LTE-Advanced Carrier Aggregation. The description of CA herein mainly focuses on NR. The description of CA in LTE-Advanced can be found in numerous references. In CA, multiple NR carriers—referred to as component carriers (CCs) can be aggregated and transmitted/received in parallel to/from the same CA-capable device/node providing an overall wider aggregated bandwidth and correspondingly, higher per-link data rates. Carrier Aggregation is supported in the UL and DL directions, each supporting up to 16 carriers [4] with possibly different bandwidths and different duplex schemes e.g., Supplemental Uplink (SUL) or supple-mental Downlink (SDL) where an additional component carrier is only used as UL or DL while the other CCs support UL and DL. The carriers can be contiguous or dispersed in the frequency domain, which results in three different options, as schematically shown in FIGS. 10, 11 and 12 which show aggregation of carriers $54_1$ and $54_2$: intra-band contiguous carrier aggregation in FIG. 10; intra-band non-contiguous carrier aggregation with component carriers in FIG. 11; and inter-band aggregation with non-contiguous component carriers in FIG. 12. Embodiments are neither limited to aggregate carriers, nor to aggregation of compo-nent carriers or a number of two aggregated channels or the like. Embodiments also relate, for example, to dual or higher-level connectivity and/or to aggregate other elements and/or a number of three or more, e.g., 4, 5, 6, or more bandwidth providing logical or physical entities.

Figure 13:
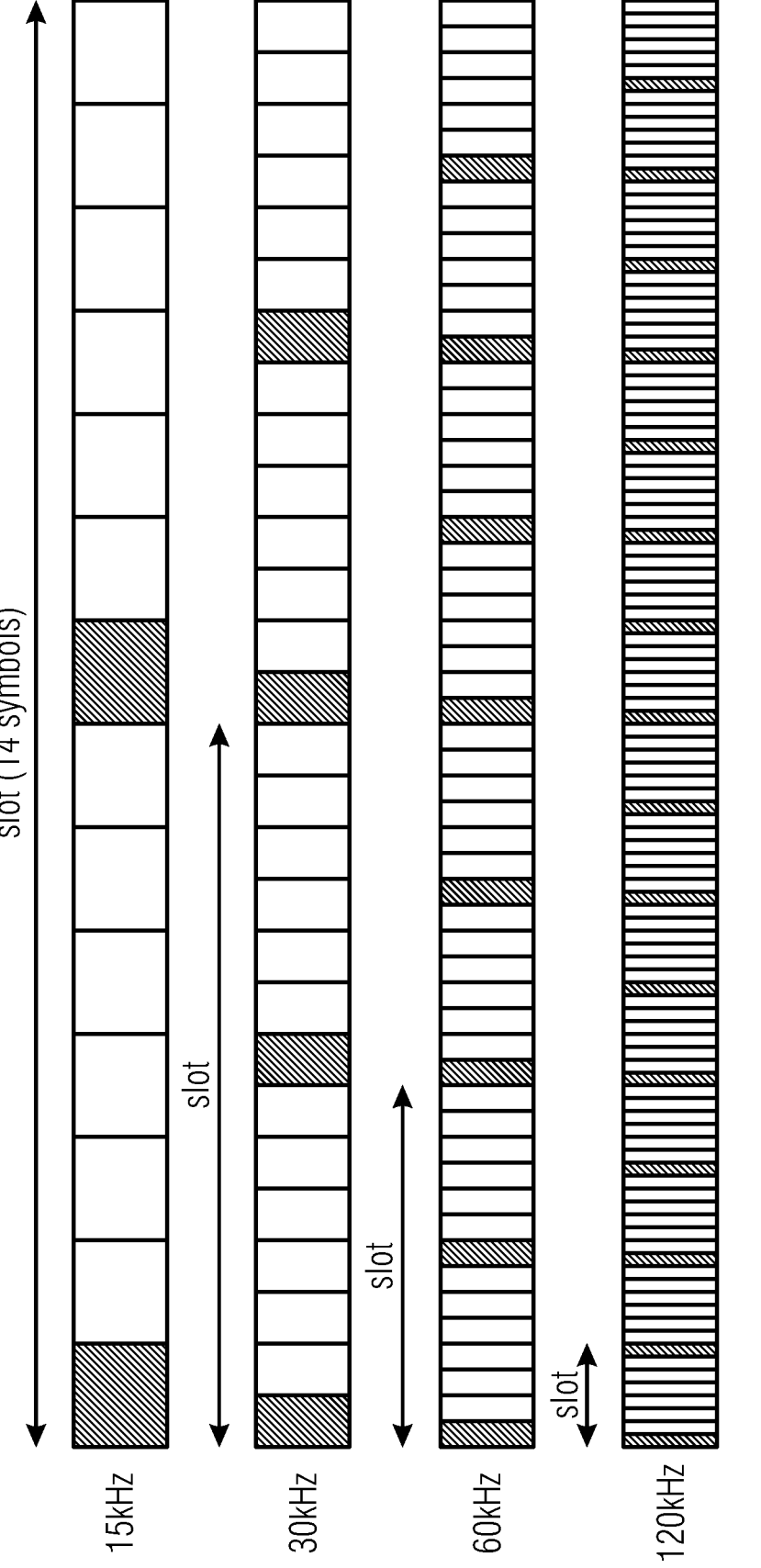
FIG. 13 shows an example of the flexible numerology used in NR which is based on the fixed sub-carrier spacing used in LTE according to an embodiment.

FIG. 13 shows an example of the flexible numerology used in NR which is based on the fixed sub-carrier spacing used in LTE. In other words, the NR waveform is scalable—the subcarrier spacing of OFDM can be chosen according to $15 \times 2^n$ kHz, where the integer-valued n is a design parameter and can be optimized for different scenarios. The 3GPP has agreed that NR should allow subcarrier spacing ranging from at least 3.75 kHz (n=−2) to 480 kHz (n=5). A lower subcarrier spacing than 15 kHz (and a correspondingly longer cyclic prefix) is beneficial to support multicast-broadcast single-frequency network (MBSFN) transmission. For example, n=−2 results in a subcarrier spacing of 3.75 kHz, which is in the same range as the subcarrier spacings used in various digital broadcast standards, such as DVB, as well as being in line with some modes of NB-IoT. Hence, n=−2 is an option in the set of scaling factors to be considered. Choosing the value of n is not straightforward. It depends on various factors including type of deployments, service requirements, hardware impairments, mobility, per-formance, and implementation complexity. In the following, we provide a comprehensive discussion on these factors involved in selecting n for the NR waveform. That is, based on the single sub-carrier spacing (SCS) of 15 kHz used in LTE, NR supports flexible SCS, examples of which are shown for 30, 60 and 120 kHz. In all cases, the duration of the OFDM symbol is the inverse of the SCS when keeping the total number of sub-carriers constant e.g. 2048 sub-carriers, with 1200 used at 15 kHz SCS corresponds to 18 MHz system bandwidth (aka 20 MHz) and a 1 ms slot length. The same number of 2048 sub-carriers used at 120 kHz SCS result in 144 MHz system bandwidth (aka 160 MHz) and a 125 μs slot length.

In addition to supporting different carrier aggregation options in terms of frequency adjacency of the component carriers, carrier aggregation can be provided in a centralised manner, i.e., from a single basestation or via geographically distributed radio units, so-called Remote Radio Heads (RRH). The following section describes some of the deployment scenarios that were already identified for the first release of CA in LTE-Advanced—Release 10. FIG. 14a-e show different deployment scenarios that may form a basis for embodiments described herein, i.e., devices and/or wireless communication systems may implement such known scenarios. At the same time, those examples do not limit the embodiments described herein. With $f_{c1}$ cells or areas are referred that use a first frequency interval, whilst $f_{c2}$ indicates areas that use a second different frequency interval in accordance with FIG. 1.

Deployment Scenario 1

Figure 14A:
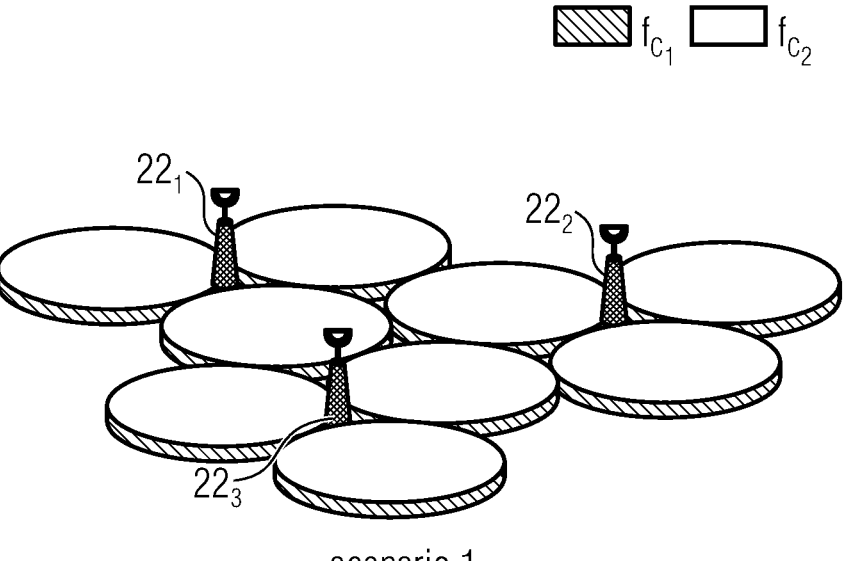

With reference to FIG. 14a, in this deployment scenario the cells with carrier frequencies $f_{c1}$ and $f_{c2}$ are (geographically) collocated, and their coverage is overlaid with $f_{c1}$ and $f_{c2}$ in the same frequency band. They provide approximately the same coverage due to similar path loss characteristics within the same band. This carrier aggregation scenario achieves higher data rates throughout the cell where both layers provide sufficient coverage and mobility. An example scenario is the case where $f_{c1}$=2000 MHz and $f_{c2}$=800 MHz are of the same band where aggregation is possible between the overlaid cells.

Deployment Scenario 2

Figure 14B:
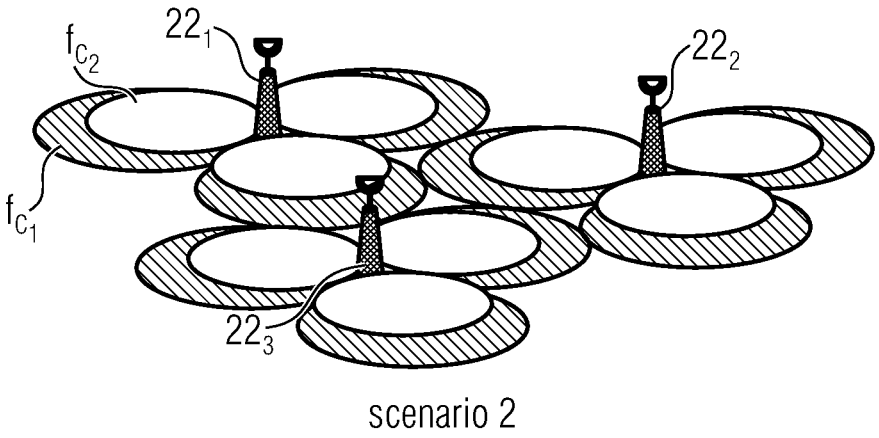

With reference to FIG. 14b, in this deployment scenario the cells with carrier frequencies $f_{c1}$ and $f_{c2}$ are collocated and overlaid with $f_{c1}$ and $f_{c2}$ in different frequency bands. Different coverage is provided on different carriers due to the larger path loss in the higher frequency band. Mobility is typically supported on the carrier in the lower frequency band which further provides sufficient coverage. The carrier in the higher frequency band is used to improve data rates and throughput. The cells $f_{c1}$ and $f_{c2}$ are collocated and overlaid, but $f_{c2}$ has smaller coverage due to larger path loss. In other words, only $f_{c1}$ provides sufficient coverage and $f_{c2}$ is used to improve throughput. An example scenario would be the case where $f_{c1}$={800 MHz, 2000 MHz} and $f_{c2}$={3500 MHz} where aggregation is possible between the overlaid cells.

Deployment Scenario 3

With reference to FIG. 14c, in this deployment scenario the cells comprising carrier frequencies $f_{c1}$ and $f_{c2}$ are collocated with $f_{c1}$ and $f_{c2}$ in different frequency bands. The antennas for cells of $f_{c2}$ are directed to the cell boundaries of $f_{c1}$ to improve the cell-edge data rates and user throughput. Due to the larger path loss, coverage holes exist for cells in the higher frequency band on which mobility management is typically not performed. The carrier aggregation is supported in areas with overlapping coverage and the mobility is based on $f_{c1}$ coverage. An example would be the case where $f_{c1}$={800 MHz, 2000 MHz} and $f_{c2}$={3500 MHz} in which aggregation is possible between the overlaid cells.

Deployment Scenario 4

With reference to FIG. 14d, in this deployment scenario the cells associated with carrier frequency $f_{c1}$ provide macro coverage and remote radio heads (RRHs) corresponding to carrier frequency $f_{c2}$ are used to improve throughput at the hot spots. The mobility is performed based on the cell coverage of frequency $f_{c1}$. In this deployment scenario, the carrier frequencies $f_{c1}$ and $f_{c2}$ are usually of different bands. The carrier aggregation is applicable to users within the coverage of RRHs and the underlying macro-cells. An example would be the case where $f_{c1}$={800 MHz, 2000 MHz} corresponds to a larger cell and $f_{c2}$={3500 MHz} corresponds to smaller cell, in which aggregation is possible between the overlaid cells.

Deployment Scenario 5

Figure 14E:
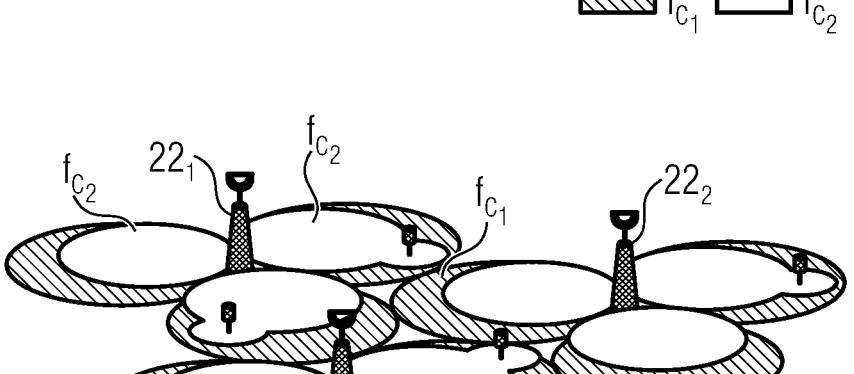

With reference to FIG. 14e, in this deployment scenario (similar to scenario 2) frequency-selective repeaters or distributed antenna systems are additionally deployed to extend the coverage for one of the carrier frequencies. It is expected that $f_{c1}$ and $f_{c2}$ cells of the same eNB can be aggregated where coverage overlaps.

Protocol Stack and Main Features

In CA, for each CA-capable UE, one of the component carriers is defined as the primary component carrier (PCC). Note that component carriers in CA are also referred to as cells. Hence, PCC is also referred to as the primary cell (PCell). Other carriers are referred to as secondary component carriers (SCC) or as secondary cells (SCells). This notation is due to the fact that each CC is considered to be independent and is operated according to a system information block (SIB) which announces an associated cell-ID. Consequently, aggregated CCs are often referred to as aggregated cells.

Figure 15A:
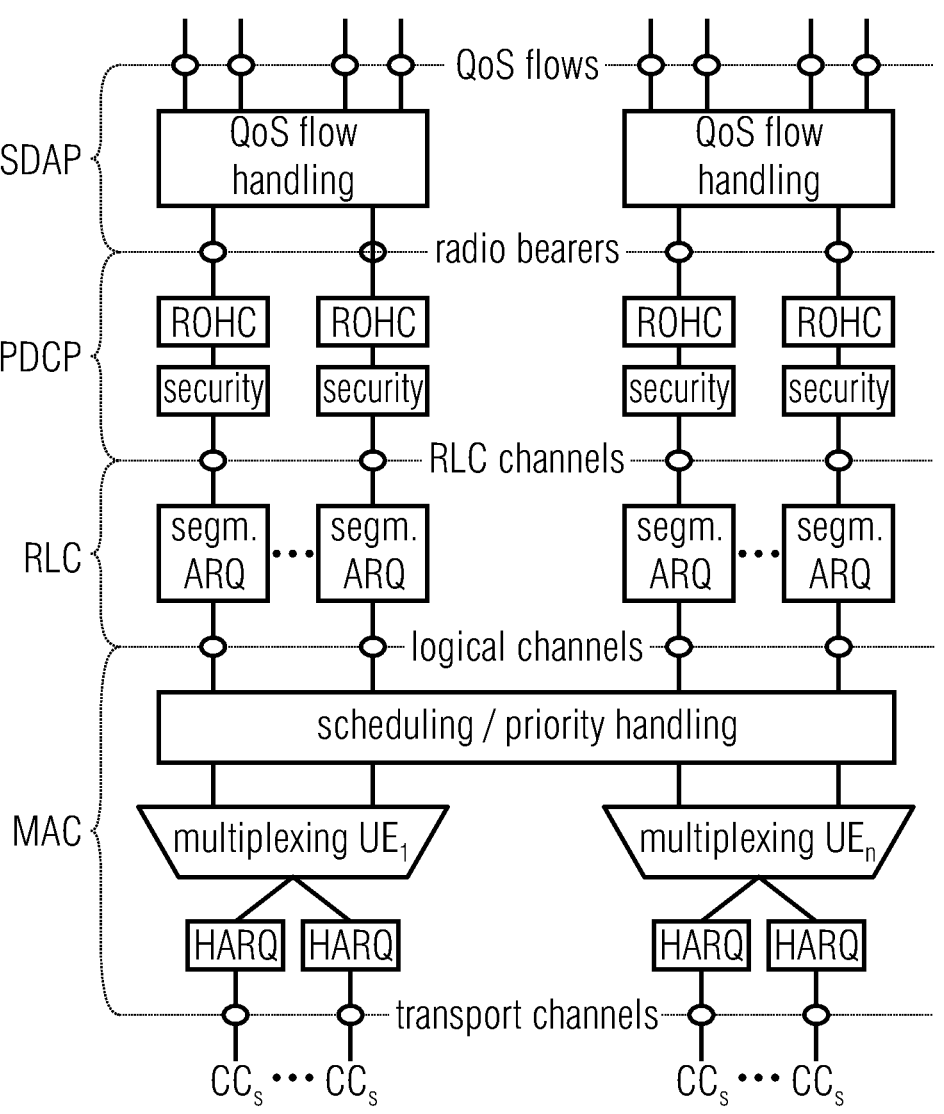
FIG. 15a shows a schematic representation of a CA Layer 2 structure for downlink according to an embodiment.
Figure 15B:
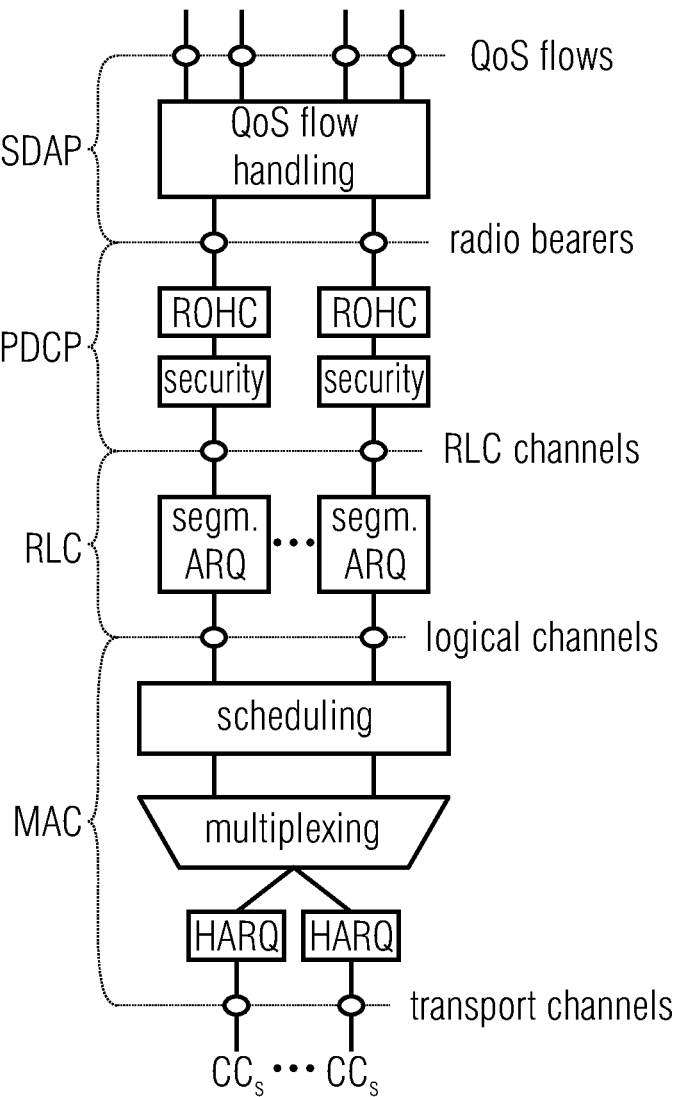
FIG. 15b shows a schematic representation of a CA Layer 2 structure for uplink based according to an embodiment.

PCC is the component carrier that handles UE's initial connection and is responsible for activating SCCs after the UE has established the Radio Resource Control (RRC) connection to the network. That means that CA is applicable when a UE is in RRC-connected state. However, all RRC-related signalling is done exclusively via PCell. SCells, on the other hand, may be dynamically activated/deactivated to meet varying data/QoS requirements while controlling UE's battery consumption. Hence, CA is activated by activating secondary (additional) component carriers by using MAC Control Element (CE). From a protocol perspective, CA is mainly transparent to the protocols above MAC layer. This can be seen in FIG. 15a showing CA Layer 2 structure for downlink and FIG. 15b CA Layer 2 structure for uplink. The exception is the case of CA Duplication (DUPS: Dual Protocol Stack), which is described in the next subsection.

Some of the main features of CA may include:

Use of L1/L2 control signalling for uplink and downlink.
   In the downlink, L1/L2 signalling provides scheduling assignments and uplink scheduling grants to inform the device about the resources and transport format to use for uplink transmission. In addition, the downlink control signalling can also be used for slot format indication, pre-emption indication and power control. This downlink control information is carried using Physical Downlink Data channel (PDCCH) channel. A set of PDCCH candidates for a UE to monitor is defined in terms of PDCCH search space sets. A search space set can be a Common Search Space (CSS) set or a user-specific search space set (USS) set. PDCCH monitoring may be applied to all activated SCells. Its main characteristics in the case of CA are as follows:

PCC always monitors PDCCH.

With cross-carrier scheduling using Carrier Indicator Field (CIF), the PDCCH of a PCell or an SCell may be used to schedule resources on a different SCell but with the following restrictions If an SCell is configured with a PDCCH, that cell's data uplink and downlink channels are always scheduled by the PDCCH on this SCell;

The scheduling PDCCH and the scheduled PDSCH/PUSCH are using the same numerology.

Figure 16A:
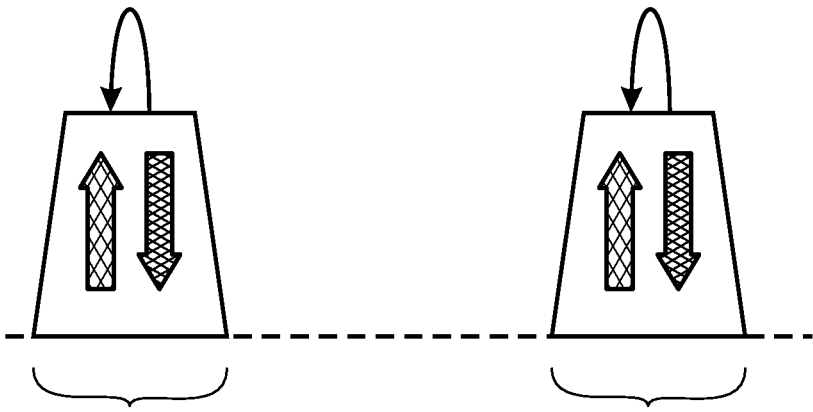
FIG. 16a shows a schematic illustration of a principle being referred to as self-scheduling according to an embodiment.
Figure 16B:
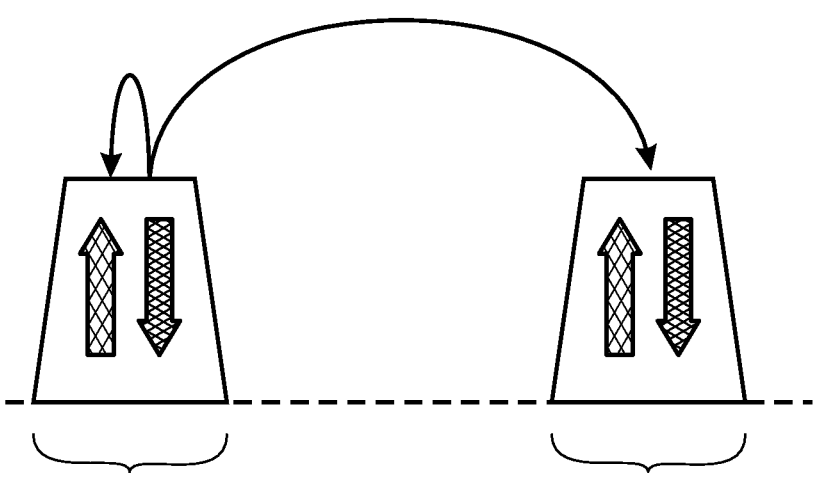
FIG. 16b shows a schematic illustration of a principle being referred to as cross-carrier scheduling according to an embodiment.

FIG. 16*a* shows a schematic illustration of a principle being referred to as self-scheduling, whilst FIG. 16*b* shows a schematic illustration of a principle being referred to as cross-carrier scheduling.

Figure 17:
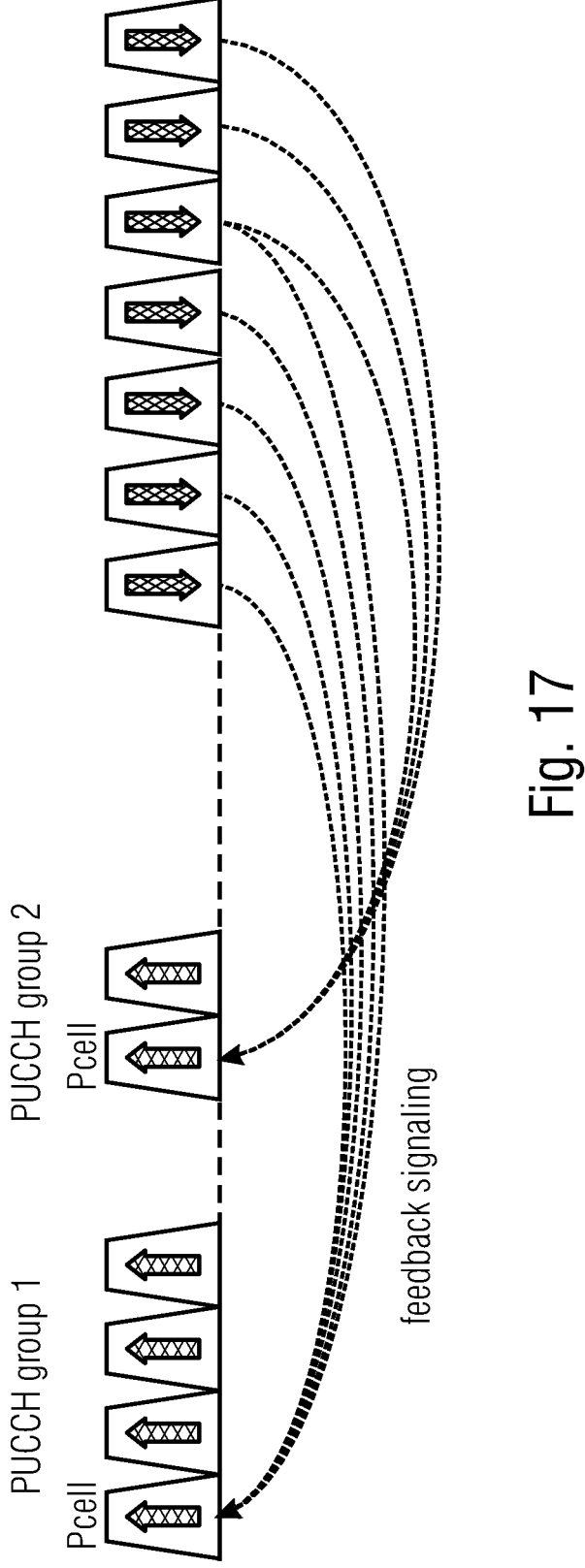
FIG. 17 shows a schematic representation two PUCCH groups according to an embodiment.

Uplink L1/L2 control signalling supports hybrid-ARQ acknowledgments to the gNB. This feedback is normally provided on the uplink control channel of the primary cell (PUCCH). However, in case of a large number of downlink carriers, the primary uplink CC may be overloaded with this control information. The NR system therefore supports configuration of PUCCH configuration for a Secondary Cell (SCell) in addition to the PCell in the uplink CA. When CA is performed with this function, CCs are grouped together either with the PCell or SCell with PUCCH (PUCCH-SCell) as shown in FIG. 17 showing two PUCCH groups. UE sends UCI for CCs within each group by using the PCell or PUCCH-SCell.

Support for a single timing advance. A UE with single timing advance capability for CA can simultaneously receive and/or transmit on multiple CCs corresponding to multiple serving cells sharing the same timing advance (multiple serving cells grouped in one Timing Advance Group (TAG));

Support for a multiple timing advance. A UE with multiple timing advance capability for CA can simultaneously receive and/or transmit on multiple CCs corresponding to multiple serving cells with different timing advances (multiple serving cells grouped in multiple TAGs). NG-RAN ensures that each TAG contains at least one serving cell;

Radio link monitoring (RLM), which is a procedure by which a UE monitors the quality of the configured monitored resources on the link to indicate out-of-sync/in-sync status to higher layers, is only activated on PCC. It should be noted that although the RLM procedure is not activated for SCell, the quality of the link on SCCs is also known to the gNB through channel state information (CSI) reporting by the UE and measurements of the UE's Sounding Reference Signal (SRS).

Packet Duplication in Carrier Aggregation and Dual Connectivity

Figure 18A:
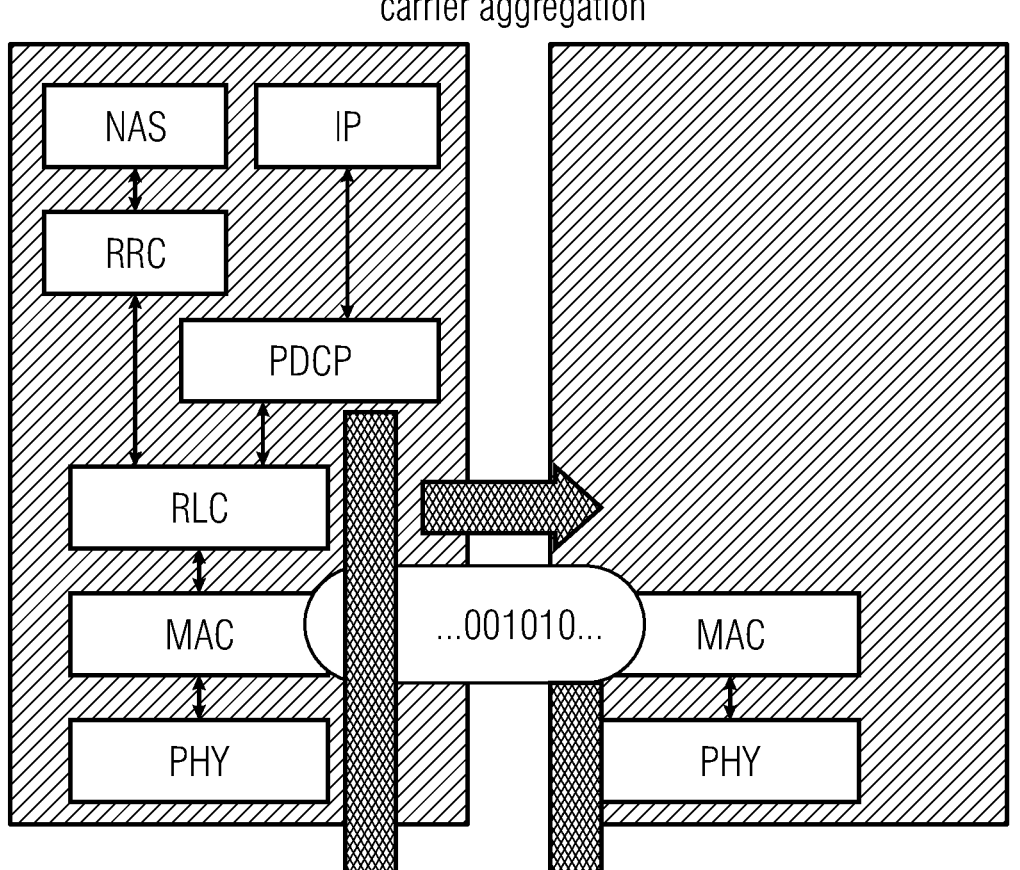
FIG. 18a shows a schematic illustration of a principle of Carrier Aggregation according to an embodiment.
Figure 18B:
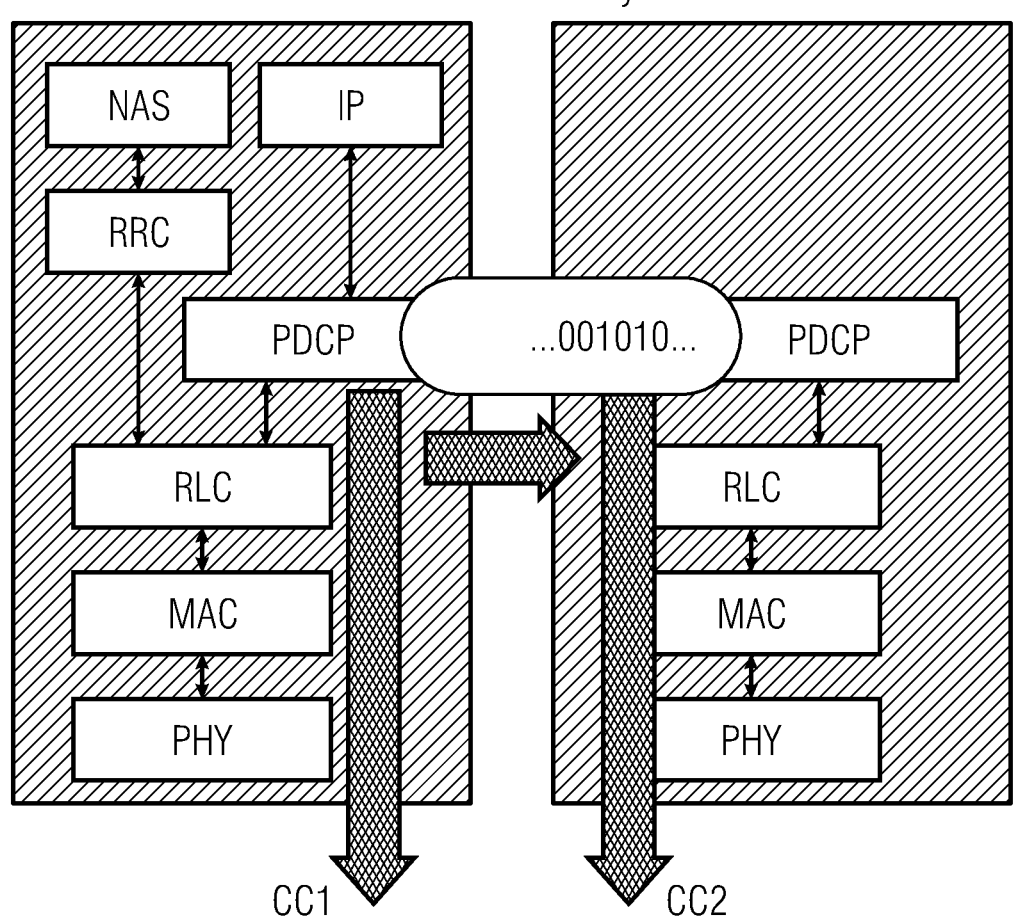
FIG. 18b shows a schematic illustration a principle of Dual Connectivity according to an embodiment.

Within the technical specification for 5G-NR blind repetition Techniques over Carrier Aggregation, CA, and Dual Connectivity, DC, for URLLLC use-cases have been introduced to ensure user plane data delivery. By duplication of data across multiple carriers, the new redundancy features to ensure that the signal reaches its destination, see FIG. 18*a* illustrating a principle of Carrier Aggregation and FIG. 18*b* illustrating a principle of Dual Connectivity. Carrier aggregation and dual connectivity may form two redundancy schemes included in the 5G NR standard that designed to ensure that data reaches its destination.

The packet duplication functionality is introduced in 5G-NR to provide support for ultra-reliable and low-latency use cases. Packet duplication is performed on the Packet Data Convergence Protocol (PDCP) layer and is supported for both user and control planes. The PDCP layer in the transmitter is responsible for packet duplication, whereas the PDCP layer in the receiver eliminates the duplicated packets. The duplicated packet carries the same PDCP sequence number. The duplication is configured by the RRC layer. When configuring duplication for a user plane (data radio bearer), RRC also can set the initial state to either activated or deactivated. After the configuration, the state can then be dynamically controlled using MAC control element. When duplication is configured for a signalling radio bearer, the state is always active. The duplication entails an additional RLC entity and an additional (secondary) logical channel to handle the duplicated PDCP PDUs.

Figure 19:
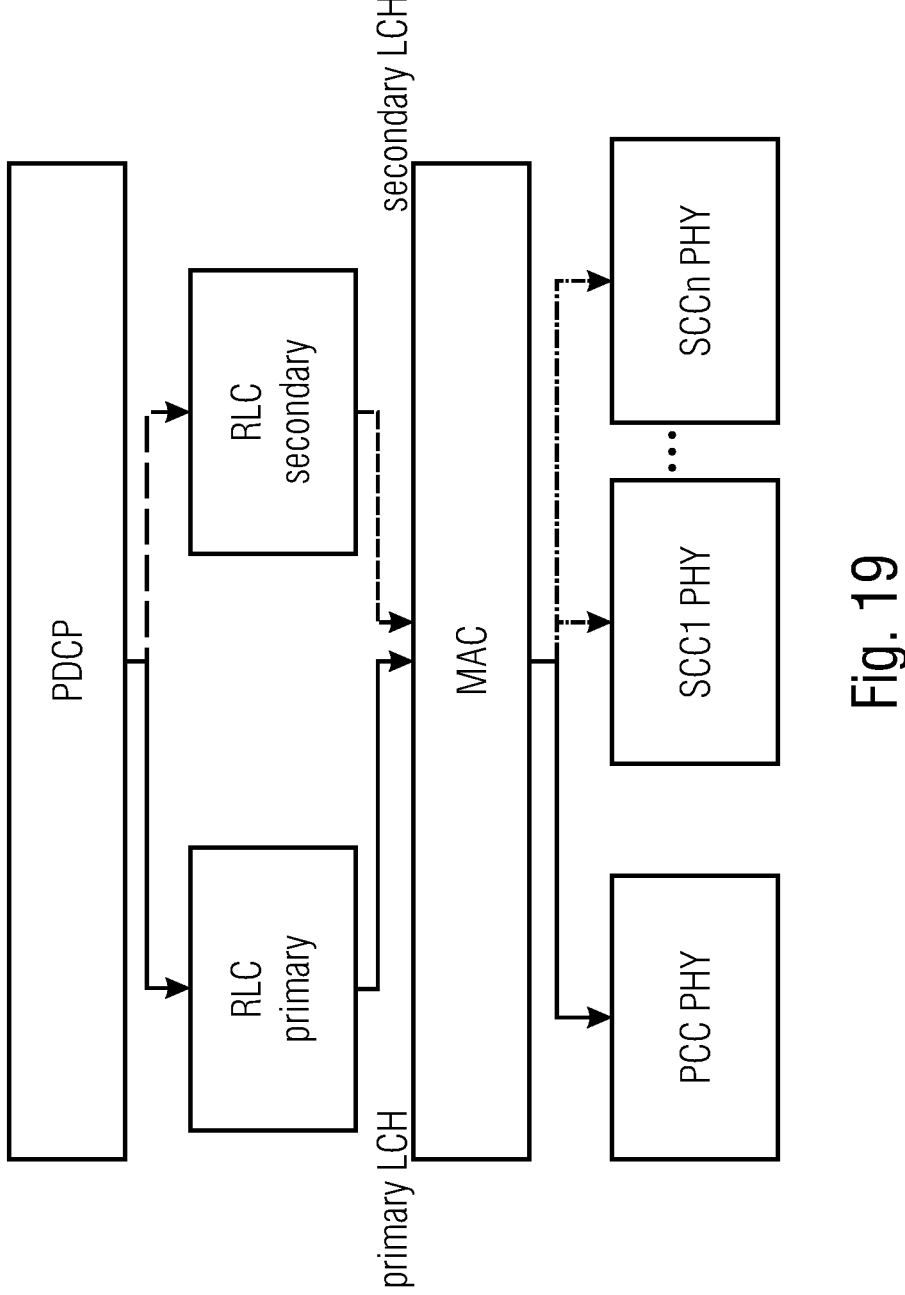
FIG. 19 a further example representation of the principle of carrier aggregation according to an embodiment.

In case of CA, which is referred to as CA duplication and also illustrated in FIG. 19, PDCP duplication is used to allocate packets onto different carriers. For that, the logical channel mapping is used in MAC to ensure that the primary and secondary logical channels are not sent on the same carrier. When duplication is deactivated for a data radio bearer, the logical channel mapping restrictions of the primary and secondary logical channels are not applied for as long as duplication remains deactivated. When an RLC entity acknowledges the transmission of a PDCP PDU, the PDCP entity indicates to the other RLC entity to discard it. In addition, in case of CA duplication, when an RLC entity restricted to only SCell(s) reaches the maximum number of retransmissions for a PDCP PDU, the UE informs the gNB but does not trigger RLF.

Carrier Aggregation with HO

According to the current specifications, at intra-NR handover, RRC can also add, remove, or reconfigure SCells for usage with the target PCell. When adding a new SCell, dedicated RRC signalling is used for sending all required system information of the SCell i.e. the UEs do not need to acquire broadcast system information directly from the SCells.

Carrier Aggregation in NR-U

Figures 20A, 20B, 20C:
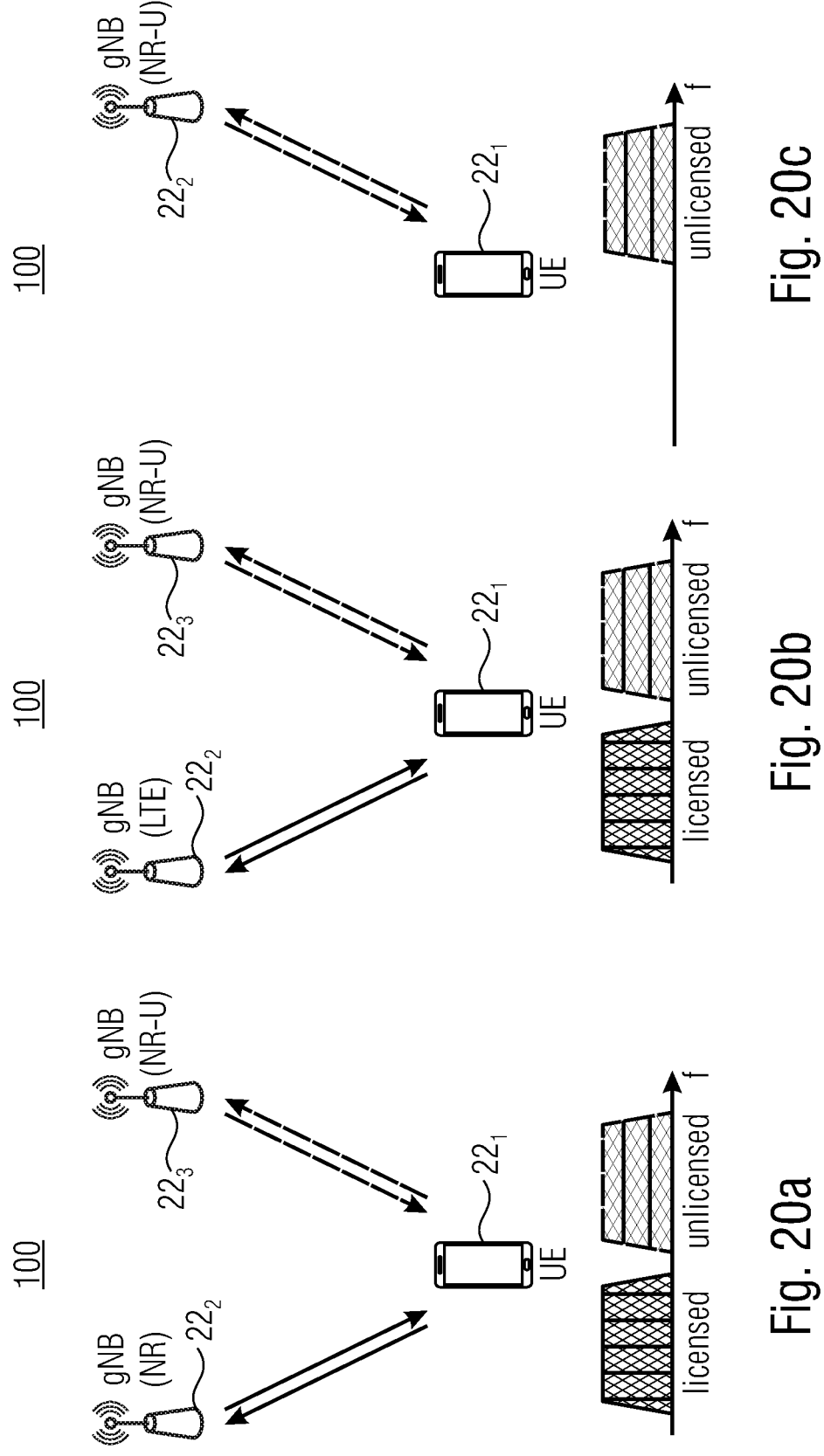
FIG. 20a-e show different representations of wireless communication systems in accordance with embodiments.
Figures 20D, 20E:
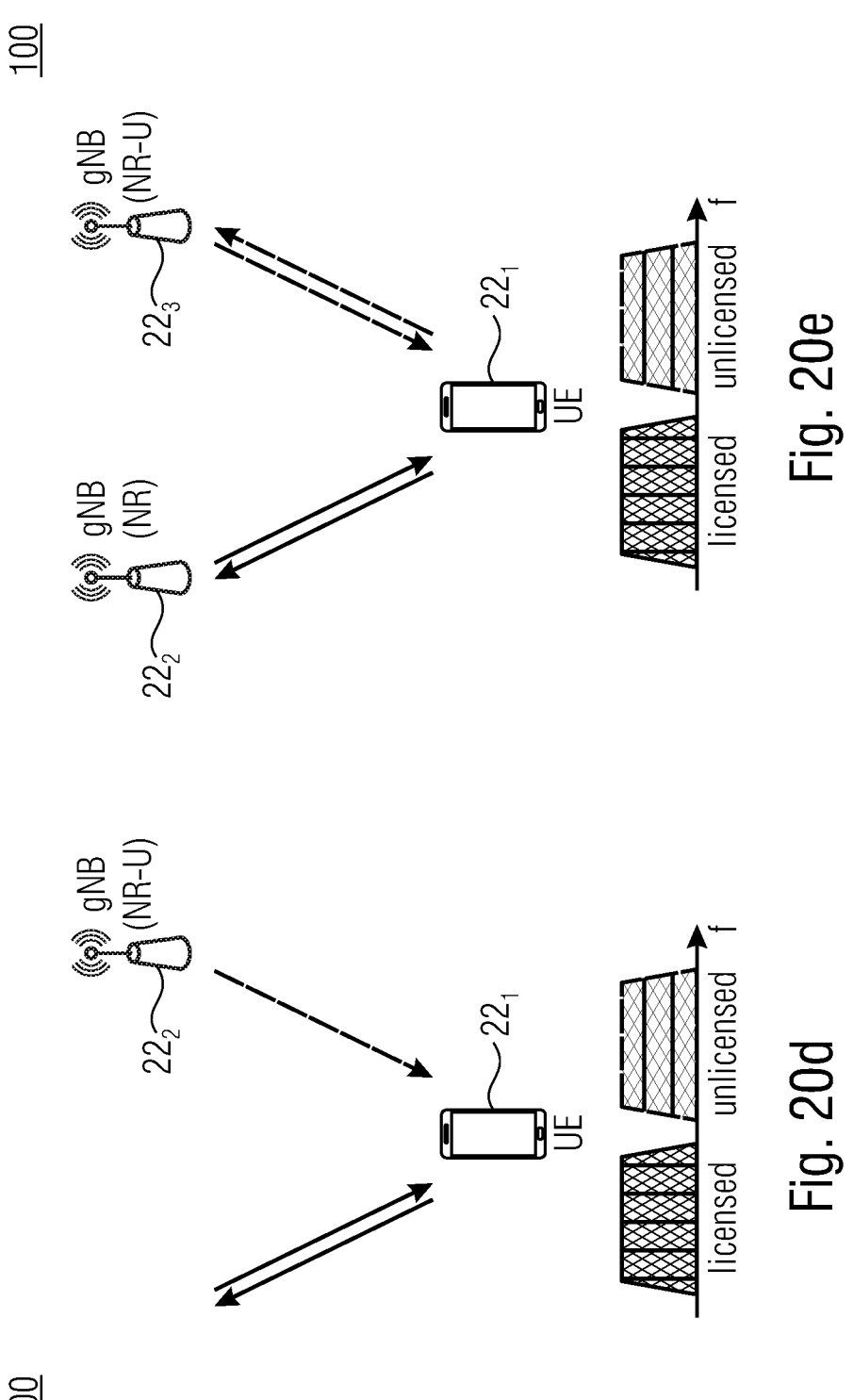

FIG. 20*a-e* show: FIG. 20*a*: a UE using NR with carrier aggregation in both licensed and unlicensed spectrum; FIG. 20*b*: a UE using LTE and NR dual connectivity in licensed and unlicensed spectrum, respectively; FIG. 20*c*: a UE using NR in unlicensed spectrum (NR-U, standalone); FIG. 20*d*: a UE using an unlicensed supplementary downlink (SDL) (similarly, an unlicensed supplementary uplink (SUL) could also be arranged); and FIG. 20*e*: NR-NR dual connectivity using both licensed and unlicensed spectrum. Such settings may be implemented in wireless communication system 100.

That is, FIGS. 20*a-e* show NR-U deployment scenarios.

When applying CA in the context of NRU, the PCC is to be operated in a licensed part of the spectrum according to the initial version of the specification. As a consequence, the SCCs can be operated in the unlicensed part of the spectrum. For simplicity in the figures above only one chuck of spectrum in the licensed and unlicensed spectrum are shown. Various deployment options are illustrated and since more than one bandwidth part is utilized in the connection, all of these scenarios fall under the category of carrier aggregation. Due to certain conditions that apply when operating a wireless system in unlicensed spectrum, the SCC has to follow certain regulatory rules, e.g., pre-emption of channels after a certain occupancy, listen-before-talk etc. These additional requirements can be more easily accommodated when the PCC operating in licensed spectrum always provides a control plane connection between the UE and the network. In the absence of a suitable control plane, the aggregated component carriers cannot be operated reliably and efficiently. Such deployment schemes are supported since 5G releases 15 describing NR-U in non-standalone mode, where the anchor is a licensed component-carrier. Enhancements for release 16 and 17 will allow full stand-alone operation of component carriers in unlicensed spectrum without a licensed anchor. Such deployments will allow combinations of carriers in FR1 and/or FR2 e.g., 5.2 GHz and 60 GHz ISM bands. Any SA deployment option without a licensed component carrier will suffer from the additional burden of rules in unlicensed bands e.g., listen-before-talk (LBT) requirements and the associated limitations on contiguous band and time slot allocation.

Dual Connectivity (DC) without CA

According to embodiments, the first radio channel $12_1$ may be provided, at least temporarily between a first node of the wireless communication system and a second node of the wireless communication system and the second radio channel $12_2$ is provided between the first node of the wireless communication system and a third node of the wireless communication system, at least temporarily. Dual Connectivity or Multi-Radio (MR-DC) is a feature that enables multiple Rx/Tx capable UE to be configured to utilise resources provided by two different nodes connected via non-ideal backhaul, one providing NR access and the other one providing either E-UTRA or NR access. One node acts as the Master Node and the other as the Secondary Node. The Master and Secondary Nodes are connected via a network interface and at least the MN is connected to the core network.

As part of MR-DC configuration, each UE is configured with two separate scheduled cell groups namely:

Master Cell Group (MCG)

Secondary Cell Group (SCG)

Master Cell Group (MCG) belongs to the Master Node (MN) and Secondary cell Group (MCG) belongs to the Secondary Node (SN). Based on the MR-DC architecture, MCG and SCG could either be LTE cells or NR cells. The network configures the UE with MCG, and zero or one SCG.

Figure 21:
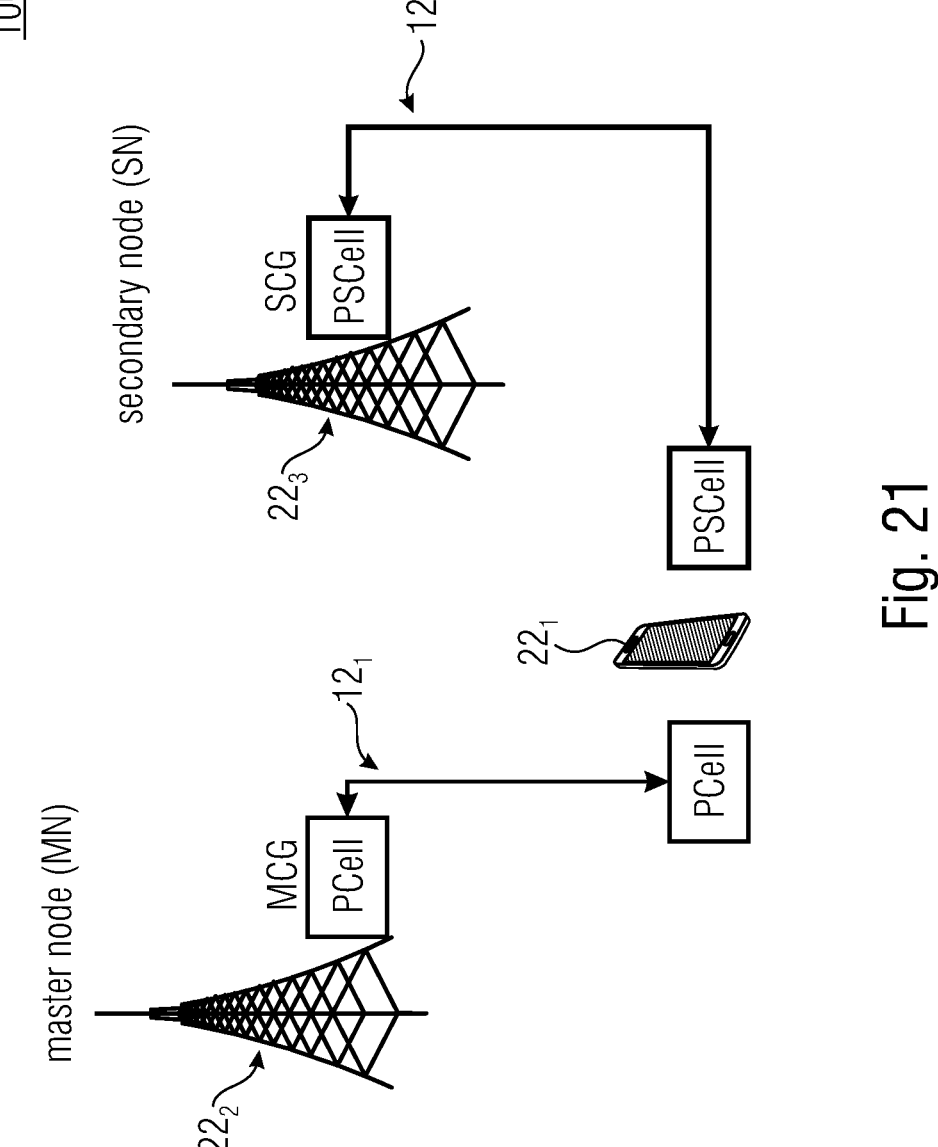
FIG. 21 shows a schematic block diagram of wireless communication system performing Dual Connectivity, in particular a PCell and an SCell thereof according to an embodiment.

There are two important cells when a UE $22_1$ is dual-connected to MN $22_2$, e.g., using radio channel $12_1$ and SN $22_3$, e.g., using radio channel $12_2$. One is PCell (Primary Cell), and the other one is PSCell (Primary Secondary Cell. When CA is not configured on both of the nodes, the UE is connected only to the two cell—Pcell and PSCell, as schematically shown in FIG. 21 showing a schematic block diagram of wireless communication system 100 performing Dual Connectivity where MCG and SCG consist of only a single cell—PCell and SCell.

Control Plane

In MR-DC, the UE has a single RRC state, based on the MN RRC and a single C-plane connection towards the Core Network.

Figure 22:
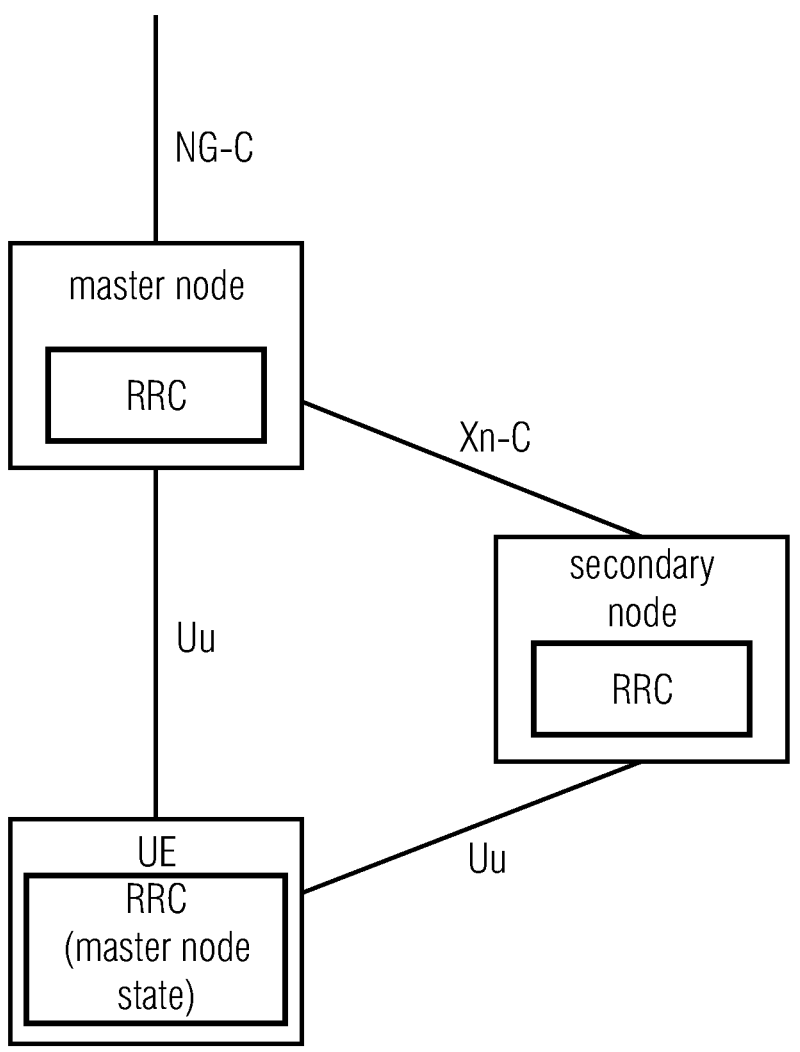
FIG. 22 illustrates a possible Control plane architecture for MR-DC with 5G Core Network according to an embodiment.

FIG. 22 illustrates a possible Control plane architecture for MR-DC with 5G Core Network. Each radio node has its own RRC entity, which can generate RRC PDUs to be sent to the UE, see 3GPP TS 37.340 FIG. 4.2.1-1).

RRC PDUs generated by the SN can be transported via the MN to the UE. The MN always sends the initial SN RRC configuration via MCG Signalling Radio Bearer (SRB1), but subsequent reconfigurations may be transported via MN or SN. When transporting RRC PDU from the SN, the MN does not modify the UE configuration provided by the SN. If the SN is a gNB, the UE can be configured to establish a SRB with the SN (SRB3) to enable RRC PDUs for the SN to be sent directly between the UE and the SN. RRC PDUs for the SN can only be transported directly to the UE for SN RRC reconfiguration not requiring any coordination with the MN. Measurement reporting for mobility within the SN can be done directly from the UE to the SN if SRB3 is configured. The option with the so called split SRB is supported for all MR-DC options. This allows duplication of RRC PDUs generated by the MN, via the direct path and via the SN. Split SRB uses NR PDCP. In V16.1.0 of the specification, the duplication of RRC PDUs generated by the SN via the MN and SN paths is not supported.

DC with CA

Figure 23:
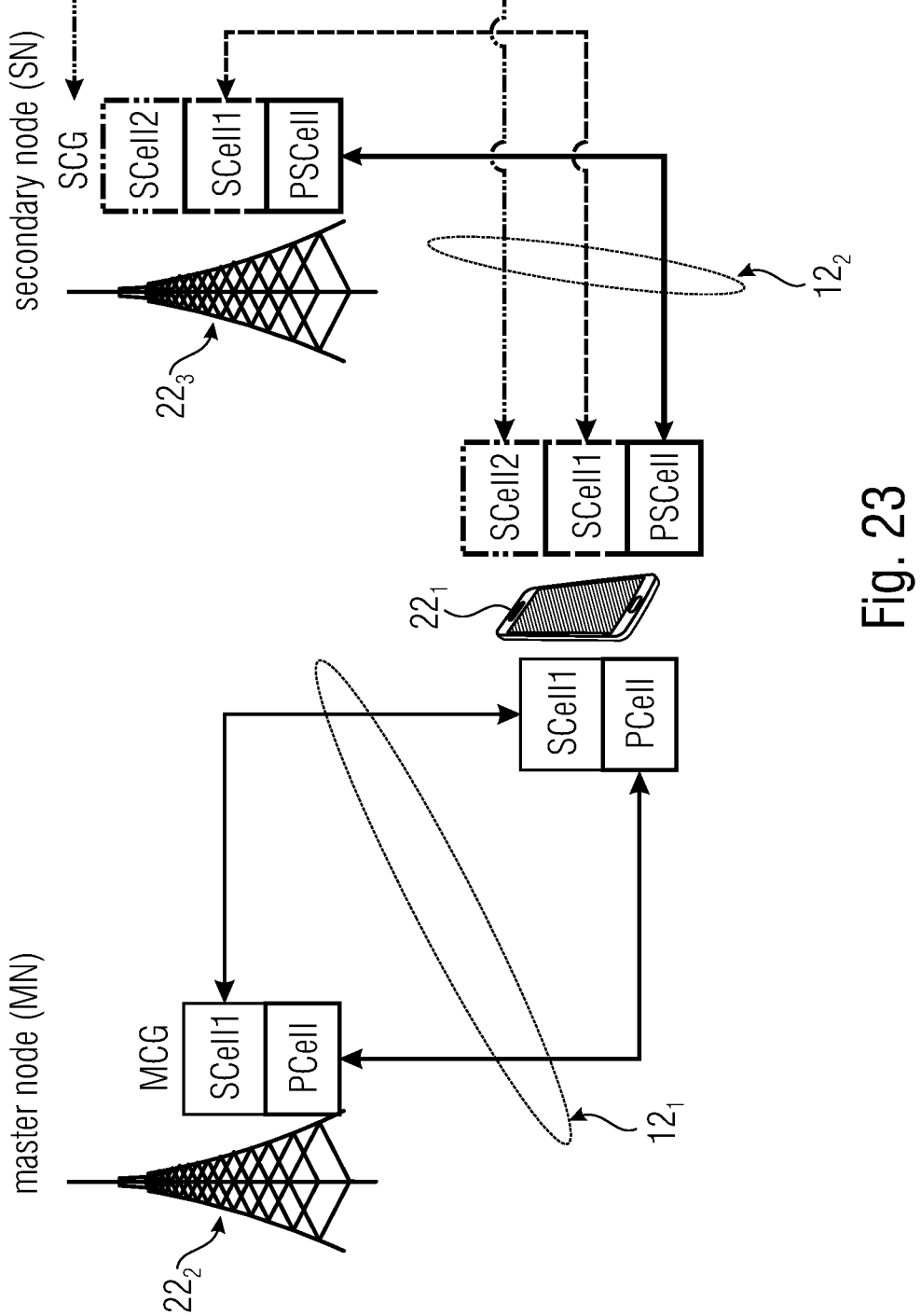
FIG. 23 a schematic representation of a part of a wireless communication system in accordance with embodiments where Carrier Aggregation is applicable, for example.

The case of Dual Connectivity (DC) with CA is schematically shown in FIG. 23. CA is applicable, for example, either per MCG or SCG. The Control plane is handled in the same way as in the case of Dual Connectivity without CA, where RRC PDUs are handled via PCell and/or PSCell.

Beamforming

Figure 24:
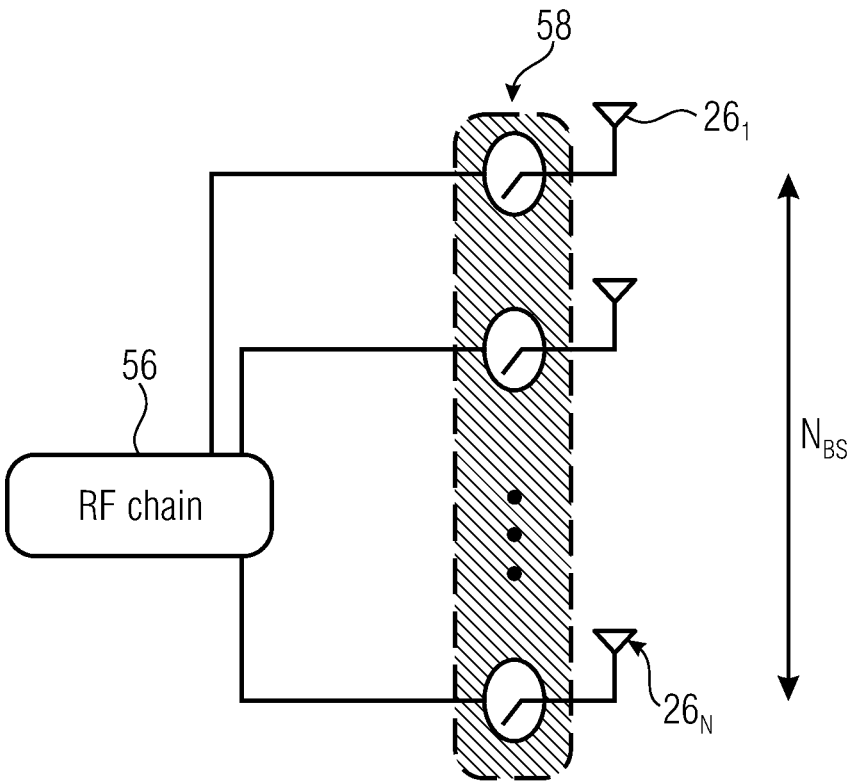
FIG. 24 shows a schematic block diagram of an analogue beamformer according to an embodiment.

With regard to known technical solutions, high quality beamforming is necessary for the integrity of phased array antenna systems such as those deployed in 5G and beyond 5G wireless communication systems. Until recently, beamformers were realized as hybrid or monolithically integrated analogue sub-systems in which their wideband operation was plagued by higher loss, amplitude and phase misbalances and the such like. Such impairments contribute to errors in beam-pointing and geo-location and to general antenna pattern contamination. An example of a generic analogue beamformer is shown in the schematic representation of FIG. 24. An analogue beamforming (ABF) at the basestation is schematically shown, where all antenna elements $26_1$ to $26_N$ share a common or single RF chain 56 through a phase shifter 58 The number of antennas at the basestation is denoted by $N_{BS}$.

Figure 25:
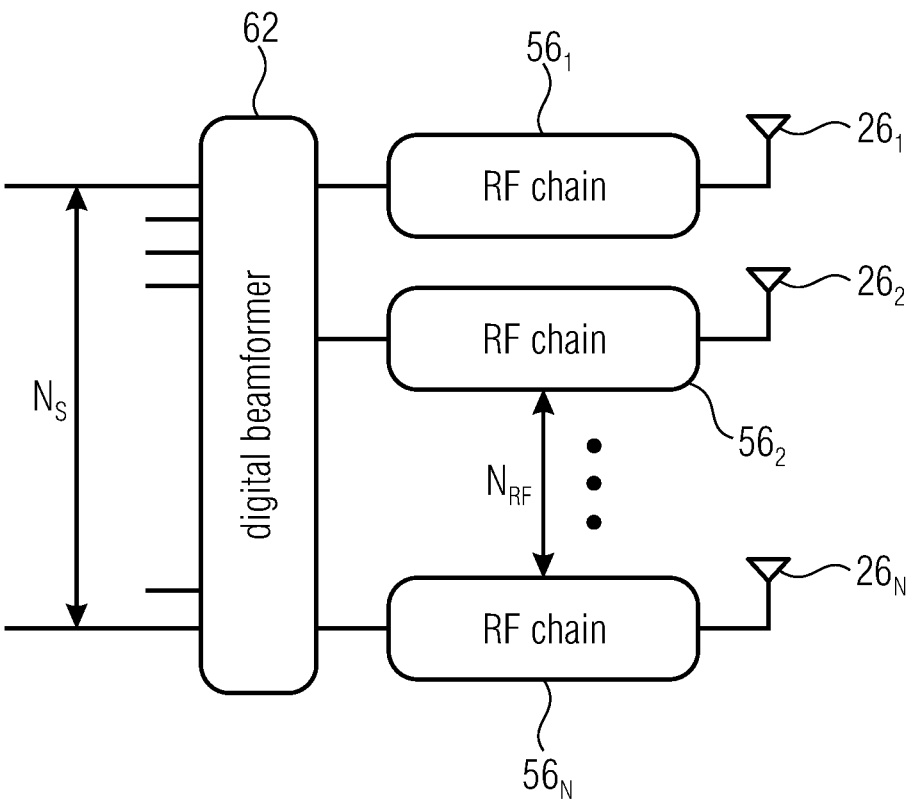
FIG. 25 shows a schematic block diagram a of a digital beamformer according to an embodiment.

In contrast to fully-digital designs in which the spatial processing is performed in a baseband unit that uses the flexible computational resources afforded by digital processors, see for example FIG. 25, showing a schematic representation of Digital beamforming (DBF) at the basestation, where each antenna element uses a separate RF chain $56_1$ to $56_N$. The number of data streams is denoted by $N_S$ and the number of RF chains at the basestation by $N_{RF}$, the elements connected to a digital beamformer 62. Analogue beamforming schemes use analogue components, such as phase-shifters, time delay elements, variable gain amplifiers and attenuators or switches. While such analogue components do not have the same processing flexibility as the digital processor, they can substantially reduce the cost and complexity of the beamforming solution and simplify its implementation. In a hybrid analogue-digital scheme therefore, the number of radiofrequency chains can be reduced by distributing the processing in both the analogue and digital domains, thus reducing overall costs and digital bandwidth requirements.

Hybrid analogue-digital schemes have been used in the past for both radar and communication systems. These types of beam forming structures have two separate processing parts—one in the analogue domain, the other in the digital domain. Here the digital processing uses computational resources while the analogue processing employs RF components such as phase shifters or switches. While a phase shifter controls the phase of an RF signal, the switch either connects or disconnects a RF chain to an antenna. The switching operation can be modelled as a binary variable and the phase shifter as a unit-norm complex variable.

Figure 26:
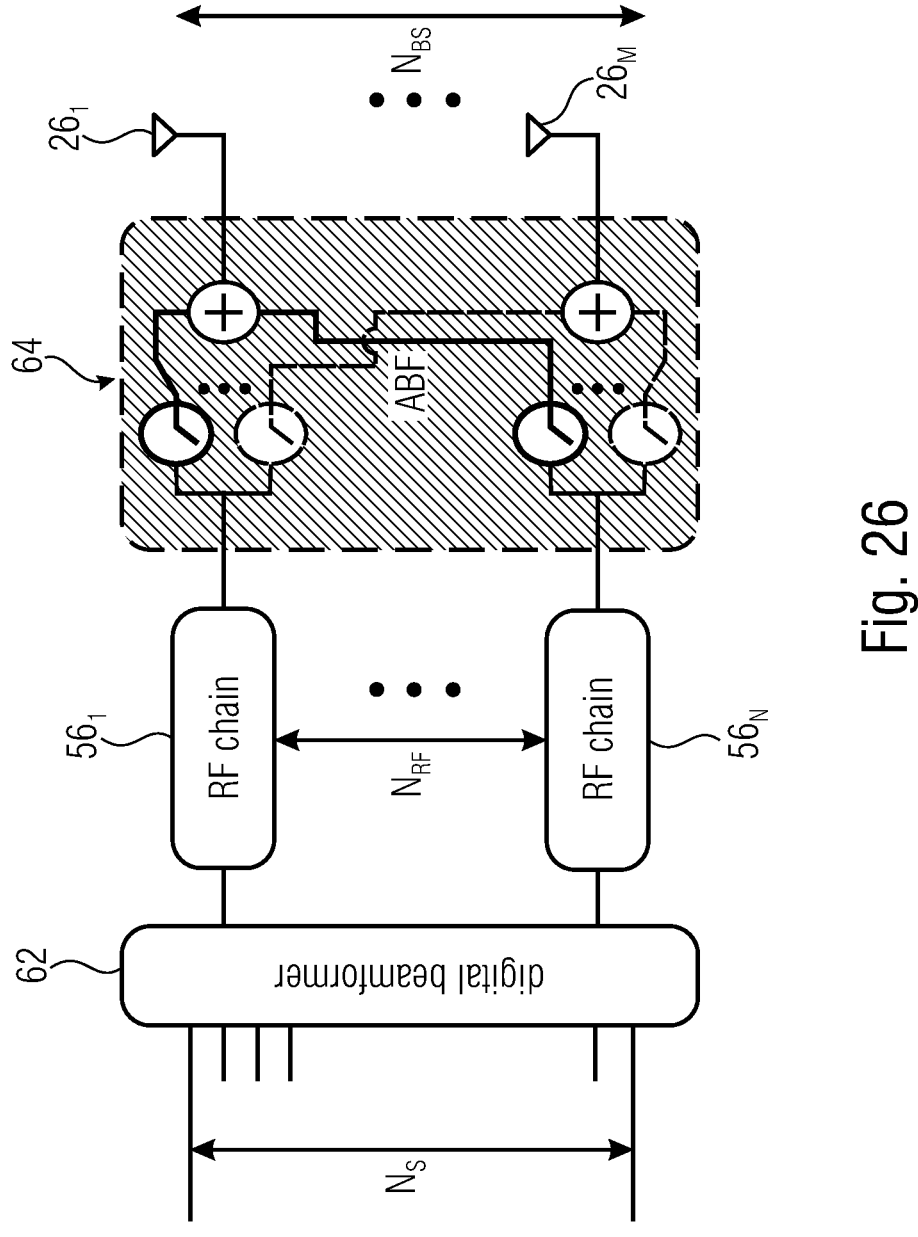
FIG. 26 shows a schematic block diagram of a fully-connected beamformer scheme with phase shifters according to an embodiment.

Although there are various hybrid analogue-digital beamforming architectures in existence which differ in their method of connecting the RF chains to the antenna, in general, each RF chain of the digital part is connected with one or more antennas via analogue components. The most complex scheme is hybrid fully connected in which each RF chain is connected to all antennas (via an analogue component). FIG. 26 shows a schematic block diagram of a fully-connected scheme with phase shifters. More particularly, a fully-connected HBF architecture at the BS is shown in which all RF chains are connected to all antennas. The ABF contains a large number of phase shifters in order to fully map all RF chains to the antennas. The number of data streams is denoted by $N_S$, the number of RF chains at the basestation by $N_{RF}$ and the number of antennas at the basestation by $N_{BS}$.

Figure 27:
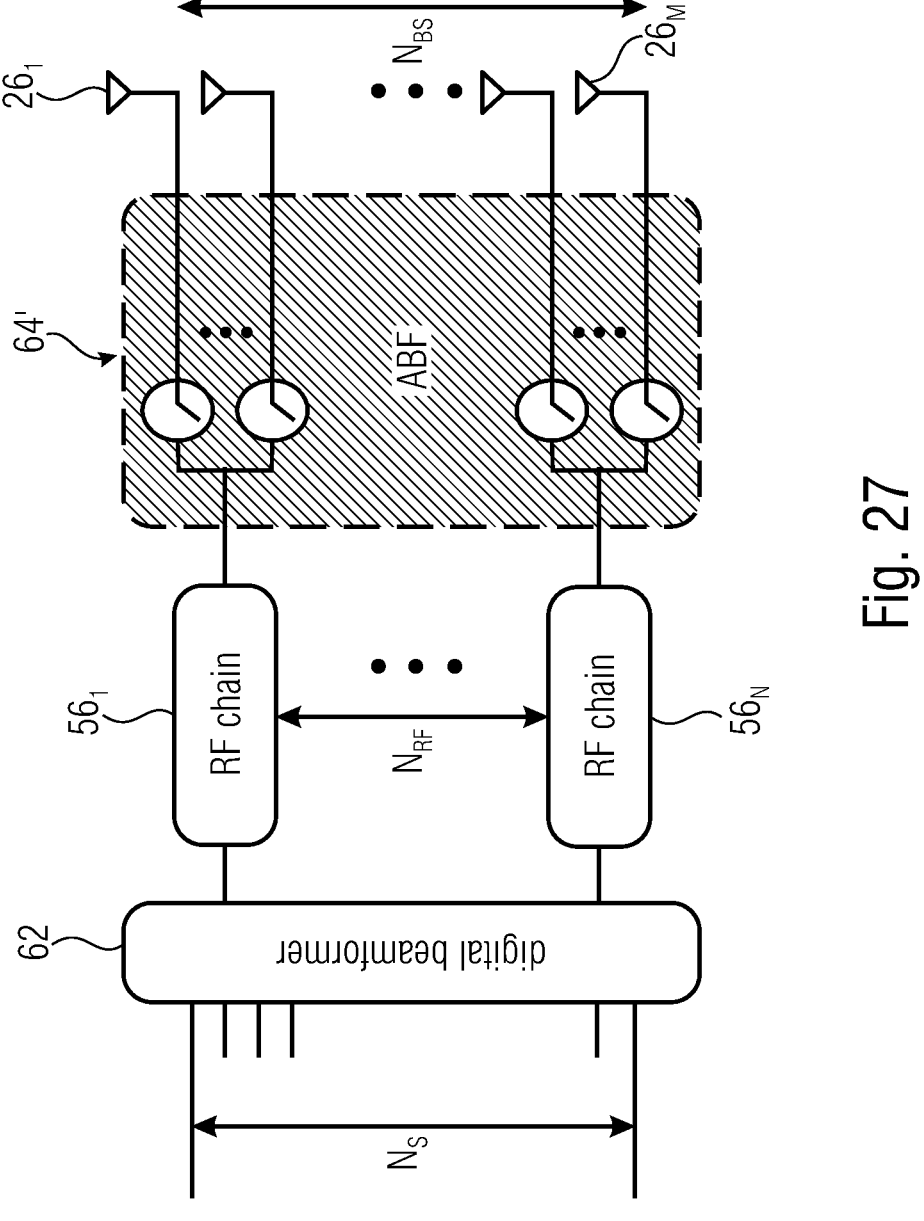
FIG. 27 shows a schematic block diagram of a fully-connected beamformer scheme using different RF chains with separated antennas according to an embodiment.

In order to substantially reduce the number of connections and analogue components other connection methods can be used; namely, localized and interleaved. Whereas a localized architecture connects each RF chain a subset of sequential antennas as schematically shown in FIG. 27, the interleaved scheme interconnects the different RF chains with separated antennas. In FIG. 27, a partially-connected HBF architecture is represented in which each RF chain is connected to a subset of all available antennas and every antenna is attached to a phase shifter. The number of data streams is denoted by $N_S$, the number of RF chains at the basestation by $N_{RF}$ and the number of antennas at the basestation by $N_{BS}$. As the RF connection lines tend to be longer in an interleaved scheme compared to a localized scheme, the implementation complexity and losses are higher. On the other hand, however, the interleaved scheme offers greater flexibility in terms of its configurability.

3GPP standards currently define two frequency ranges; frequency range one (FR1) from 410-7125 MHz; and frequency range two (FR2) from 24250-52600 MHz. Within the range of frequencies defined by FR1 and FR2, smaller ranges of frequencies are assigned to so-called bands. Generally speaking, the bandwidth available with FR1 bands is much less that the bandwidth available in the FR2 bands as illustrated by way of non-limiting example for the present embodiments that may use such different frequency ranges, in FIG. 28 and FIG. 29.

Figure 28:
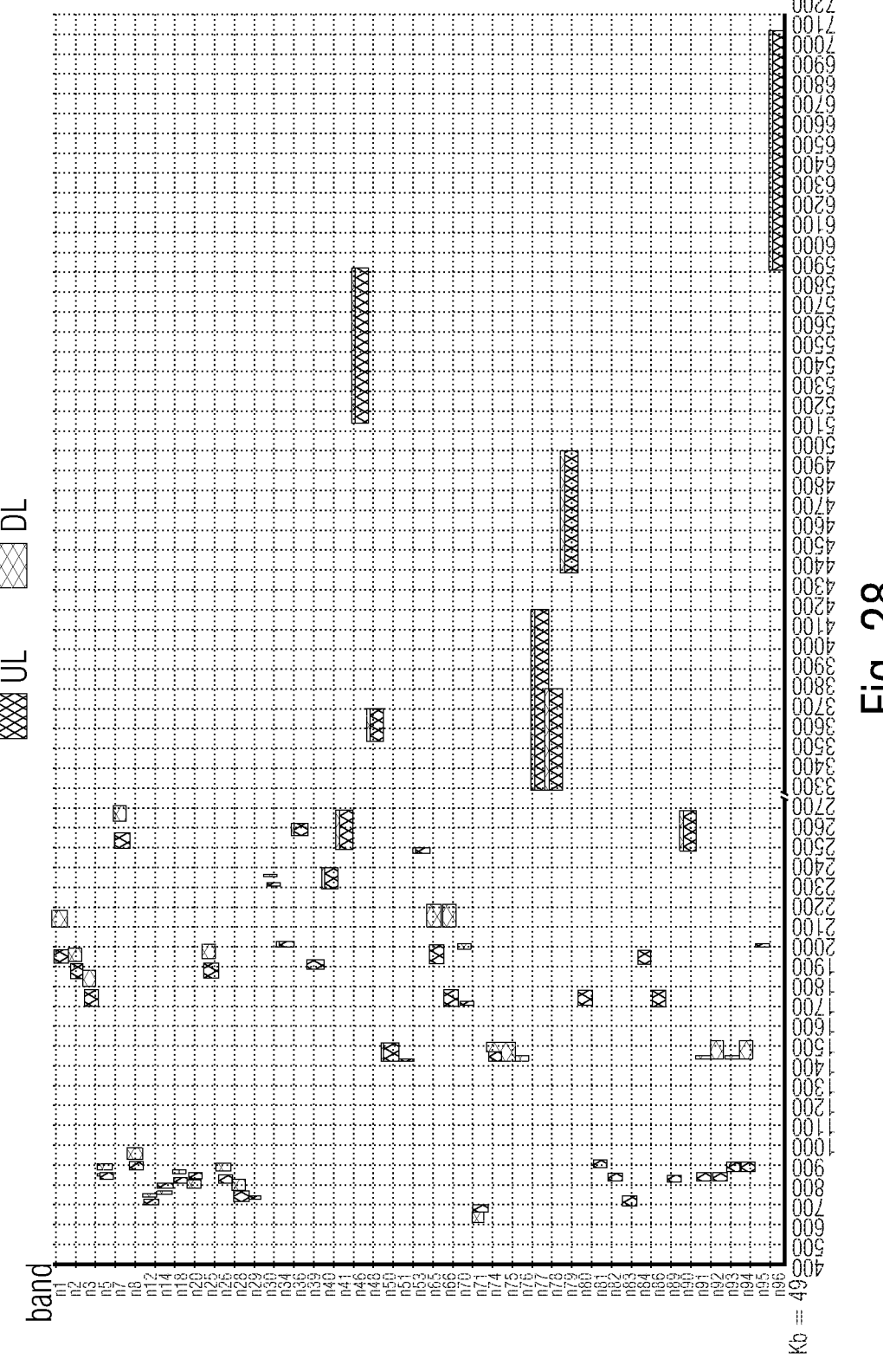
FIG. 28 shows a graphical presentation of new radio (NR) frequency bands in FR1 according to an embodiment.

FIG. 28 shows a graphical presentation of NR frequency bands in FR1 according to 3GPP TS 38.104 (Rel 16 September 2020) covering the range 410 MHz-7125 MHz. Each row represents a specific band in which the uplink is shown in blue and the downlink in orange. FR1 comprises both FDD and TDD bands. FDD bands exhibit a duplex spacing between uplink and downlink whereas TDD bands show an overlap. The x-axis in the figure spans 400 MHz-7200 MHz.

Figure 29:
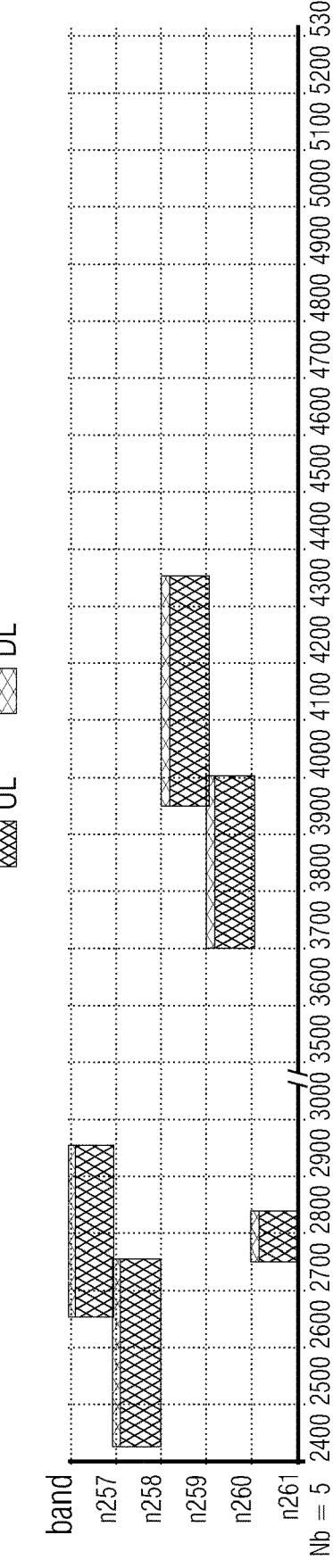
FIG. 29 shows a graphical presentation of NR frequency bands in FR2 according to an embodiment.

FIG. 29 shows a graphical presentation of NR frequency bands in FR2 according to 3GPP TS 38.104 (Rel 16 September 2020) covering the range 24250 MHz-52600 MHz. Each row represents a specific band in which the uplink is shown in blue and the downlink in orange. FR2 comprises TDD bands only. The x-axis in the figure spans 24000 MHz-53000 MHz. To deal with the harsher propagation conditions at millimetre-wave (mmWave) frequencies (higher path loss, higher blockage by common materials such as foliage, brick and mortar, etc.) 5th generation (5G) mobile networks employ high gain directional antennas (e.g., electronically-scanned antennas or phased arrays). In order to achieve (near) unidirectional coverage, the directivity of these antennas has to be controlled by appropriate means, usually electronic (i.e., beam forming). Before mmWave devices in a 5G mobile network can communicate with each other, their respective antenna patterns (beams) have to be aligned (paired) with each other. To facilitate this, both the basestation (BS, Next Generation Node Basestation gNodeB/gNB, Transmission Reception Point TRP) and the user equipment (UE) periodically transmit reference signals (RS). Reference signals can be used to identify beams. The BS's downlink reference signals can be non-pre-coded Synchronization Signal Blocks (SSB) that can also be decoded by UEs not yet in a Radio Resource Control (RRC) connected state to that BS or user specific pre-coded signals (CSI-RS, Channel State Information Reference Signals). The SSB and CSI-RS signals are usually transmitted with different beam widths (SSB are usually wide, CSI-RS are usually narrow). On the UE side, the uplink signals are called Sounding Reference Signals (SRS). Two different techniques for beam alignment are currently defined by 3GPP and are being implemented: Beam Management (BM) and Beam Correspondence (BC). Within the former, two categories are further defined: independent beam management (IBM) and common beam management (CBM).

Beam Management

Beam management is a technique in which a communication partner, usually the UE, offers a set of marked beams and the other communication partner, usually the BS, measures and evaluates the received beams based on different metrics, for example Signal to Noise Ratio (SNR). The beam best suited for communication is then determined and the selection or preference is communicated to the partner, which will then consider/decide that beam to be used. While Beam Management is most commonly used for selecting the UE's uplink beam usually marked with SRS, it is also applicable for the BS's downlink beam(s) where it can enhance the user specific beam selection in a sophisticated way using the type II feedback mechanism. In type II feedback the receiver calculates an advantageous combination of several input beams and reports the associated indices together with amplitude and phase values, at the other end, the transmitter will apply the reported amplitude and phase values on the indicated beams thus forming a quasi-perfect transmit beam according to the assisting feedback from the receiver supporting the beam management procedure.

Figure 30:
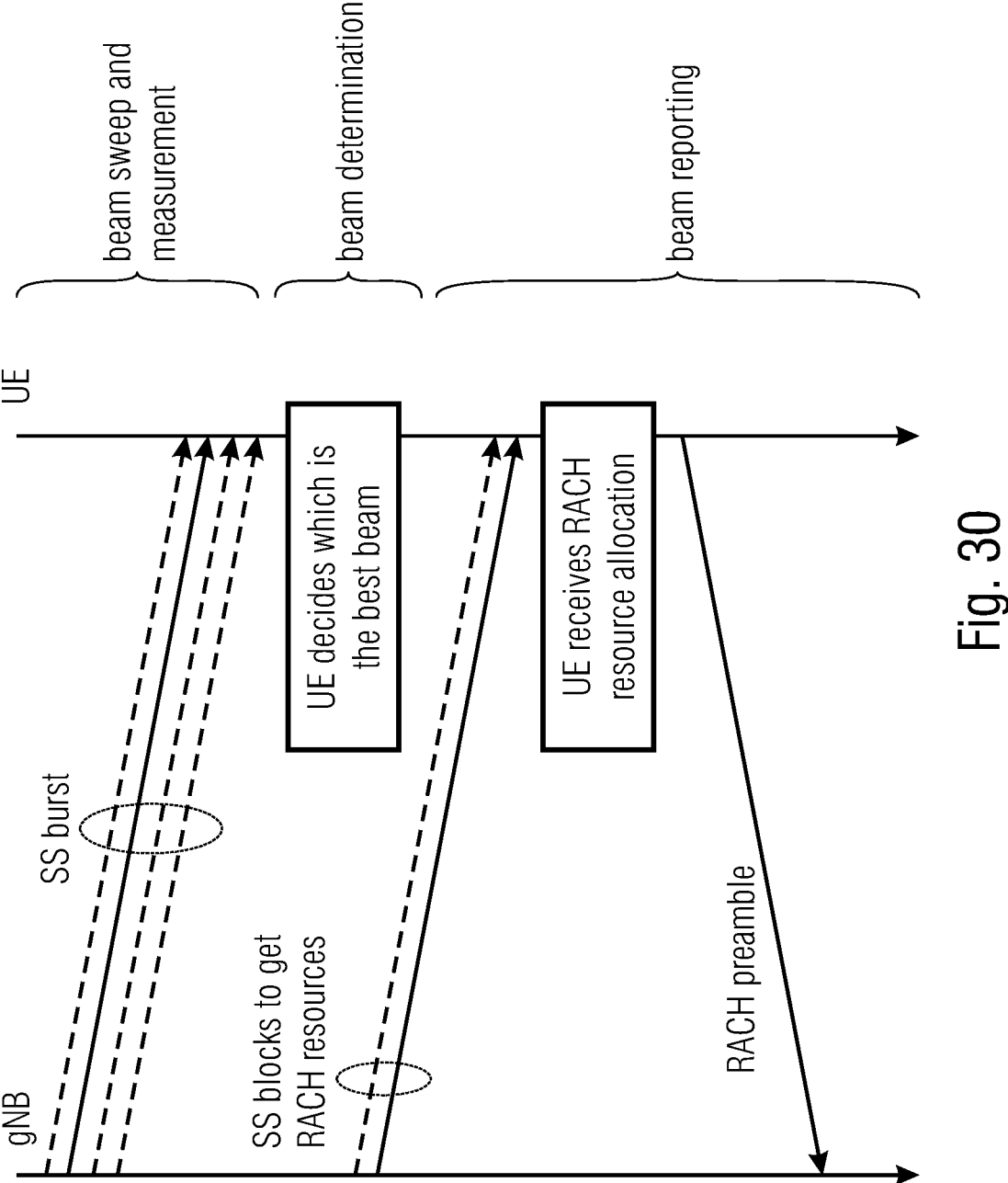
FIG. 30 shows a schematic flow chart to represent an exchange of Signals and messages during DL BM procedure for initial access (IA) according to an embodiment.
Figure 31:
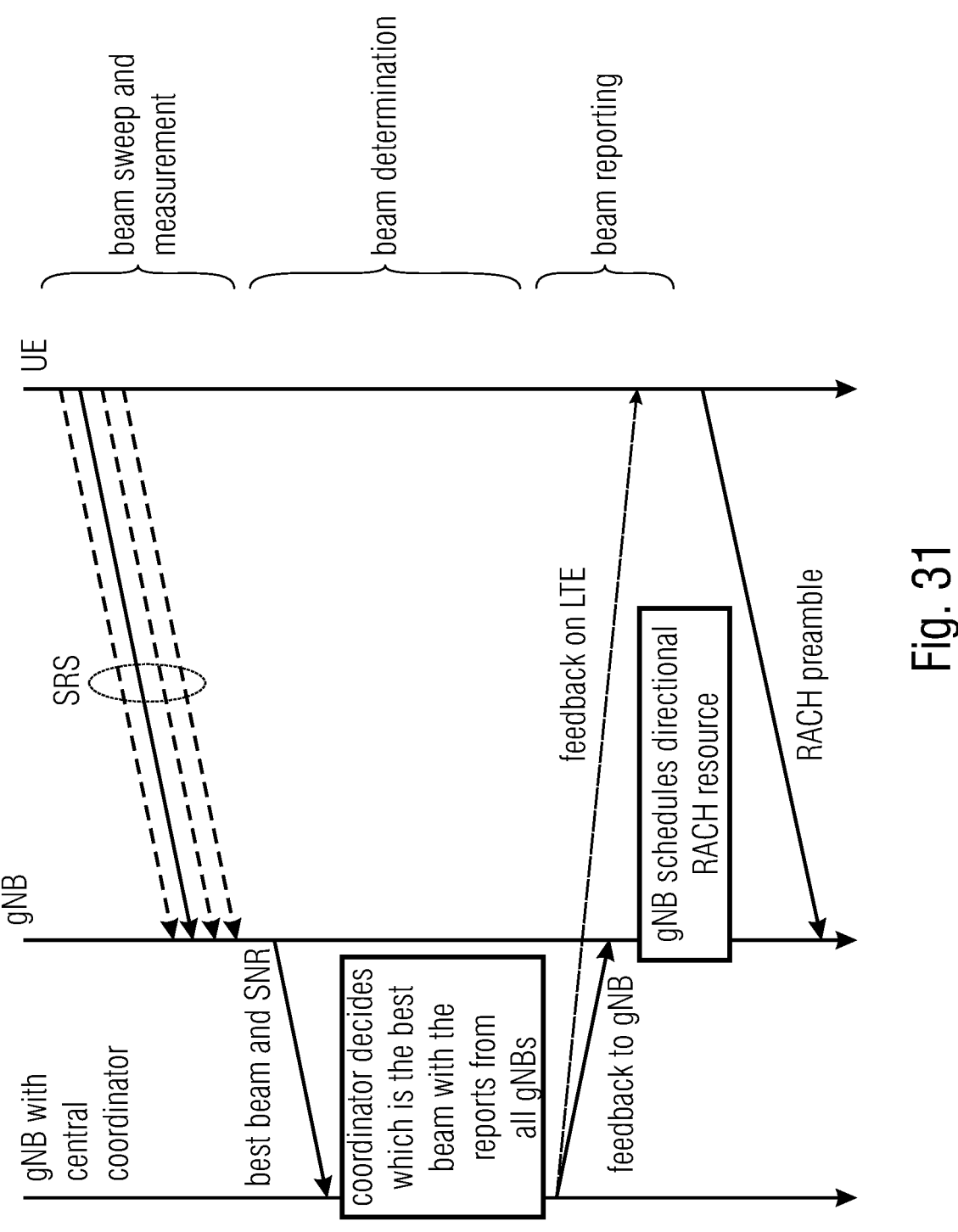
FIG. 31 shows a schematic flow chart to represent an exchange of Signals and messages during uplink (UL) beam management (BM) procedure for IA.

FIG. 30 shows a schematic flow chart to represent an exchange of Signals and messages during DL BM procedure for initial access (IA) FIG. 31 shows a schematic flow chart to represent an exchange of Signals and messages during UL BM procedure for IA.

In FIG. 30 the signals and messages exchanged during a downlink (DL) beam management procedure for initial access (IA) while FIG. 31 shows the messages exchanged during an uplink (UL) procedure. The figures also illustrate that the procedure can be divided into four different operations:

Beam sweeping: A spatial area is covered with a set of beams identified by their RS. Depending on the state of the communication, these beams can have different widths and can be pre-coded or not. During initial access for example, the BS would sweep with wide, non-pre-coded SSB beams. For beam refinement, the beams are usually much narrower and pre-coded for the specific communication partner, like CSI-RS. The sweeping process can be carried out with an exhaustive search covering the whole angular space or just a sub-space of the whole area.

Beam measurement: The quality of the received beam(s) is evaluated at the BS or UE according to suitable metrics, like SNR. A report table based on the channel quality of all received beams is compiled locally.

Beam determination: Based on the report table compiled in the previous step, the beam most suitable for communication is selected. During initial access, the receiving entity also selects its own beam for transmission in this step.

Beam reporting: The result of the previous step is transmitted to the communication partner who will then adjust its subsequent transmissions.

Beam management can be used both for initial access and for beam refinement in connected state for example to allow for mobility of the UE.

Beam management may include cases of managing beams via a feedback loop between the two communication ends and beam correspondence may relate to a receiver and transmitter within one node that act locally using receive signal extraction for transmit beam selection.

Beam Correspondence

In order to minimize the overhead by several beam sweeps and associated reporting of the results, 3GPP has introduced Beam Correspondence. This procedure allows the UE to autonomously select a suitable beam for UL transmission solely based on DL measurements. Assuming reciprocal transmit and receive capabilities of the UE/node and similar interference situations in UL and DL, the correspondingly chosen transmit beam pattern should match the received angular power profile. The UE can meet the beam correspondence requirements either fully autonomously (e.g., setting a parameter beamCorrespondenceWithoutUL–BeamSweeping=1), or with the assistance of the basestation (beamCorrespondenceWithoutUL–BeamSweeping=0). In the latter case, the UE presents the BS with a suitable set of beams which are then handled in a manner similar to beam management.

Although beam correspondence can be established on either SSB or CSI-RS signals, there is currently no standardized method from which the BS can determine the reference signal used by the UE when selecting its uplink beam.

Further to the technical problem described and detailed in connection with, for example, FIG. 2a, FIG. 2b, FIG. 3, FIG. 4 and FIG. 5, a potential technical in accordance with embodiments of the present invention is described in detail. This forms at least a part of a basis of the invention disclosed herein. It should be noted that although the examples presented in the following sub-sections are related to user equipment (UE), the invention disclosed herein is applicable to other network devices not limited to include basestations, relays, spectrum monitoring devices and the such like.

To illustrate the practical benefits of the embodiments and with reference to the teachings presented in connection with FIG. 2a, FIG. 2b, FIG. 3, FIG. 4 and FIG. 5 in which the propagation channel and effective radio channel were explained, FIG. 32 shows a tabular representation of a relationship between design parameters and system performance metrics and how the judicious choice of the former can be used in the presented embodiments to achieve a certain performance requirement. The table of FIG. 32 comprises rows assigned to design parameters and columns ascribed to performance metrics. Two design parameters $66_1$ and $66_2$ are shown; the effective aperture and the number of elements per array.

The effective area or effective aperture of an antenna as design parameter $66_1$, including an antenna array, is explained with the perspective of reception as follows. One may assume that a planewave:
  a) has the same polarization as the receive antenna;
  b) is incident upon the antenna; and
  c) c)s travelling towards the antenna in the antenna's direction of maximum radiation (the direction from which the most power would be received).

The effective aperture parameter thus describes how much power is captured by the antenna from the planewave that is incident upon it. Let p be the power density of the planewave (in watts-per-square metre [$Wm^{-2}$]). Now if $P_r$ represents the power (in watts [W]) at the antenna's terminals available to the antenna's receiver, then:

$$P_r = p \cdot A_e \qquad (1)$$

The above equation (1) shows that the effective area represents how much power is captured from the planewave and delivered by the antenna and is available to a perfectly-matched receiver. The effective aperture includes or factors in the losses which are intrinsic to the antenna, for example ohmic losses, dielectric losses, etc. It does not however include any mismatch losses which might exist due to an impedance imbalance between the antenna and the receiver. A general example relation for the effective aperture in terms of the peak antenna gain (G) of any antenna is given by:

$$A_e = \frac{\lambda^2}{4\pi} \cdot G \qquad (2)$$

It should be noted that the equation (2) above includes the peak gain of the antenna-rather than its peak directivity—and thus includes the antenna's radiation efficiency which can be attributed to, amongst other things, ohmic and dielectric losses. The effective aperture is thus a function of both antenna gain and operating frequency, shown above by its inverse, wavelength. The maximum effective aperture, $A_{em}$, is related to the peak directivity, $D_0$, of the antenna as follows:

$$A_{em} = \frac{\lambda^2}{4\pi} \cdot D_0 \qquad (3)$$

The second design parameter $66_2$ shown in the table of FIG. 32 is the number of elements per array, Nele. This parameter represents the number of elements that comprise an array but does not indicate how those elements are arranged, for example linearly, rectangularly, circularly, sparsely, conformally and so on. Neither does the parameter reveal the spacing between the elements, their orientation and their type, for example, patch, slot, cavity, helical, dipole and so on. However, for the purposes of comparison presented in the table, it is assumed for that the elements are similar in type, orientation, polarization and arrangement. In very loose terms, a greater number of elements results in higher directivity and narrower boresight beamwidth.

Having described the design parameters $66_1$ and $66_2$, we now turn our attention to the system performance metrics: link budget $68_1$; beamwidth $68_2$; and angular resolution $68_3$. The link budget $68_1$, LB, may refer to strength or range of the communication link—the higher the value is, the greater the distance over which wireless connectivity can be established and maintained. As the effective aperture is a function of the operating frequency (see eqn. (2)), so too is the link budget.

Although the beamwidth $68_2$, BW, of an array is related to the beamwidth of the element from which it is formed, it has greater dependency on the number of elements when the number of elements is large. In other words, the beamwidth of a large array is determined by the number of individual elements it comprises, Nele, rather than the beamwidth of a single element.

Whereas the beamwidth of a large array is strongly related to the number of antenna elements, Nele, the way in which the effective aperture, AE, of the array affects beamwidth is a function of the operating frequency.

A corollary of the array's beamwidth is its angular resolution $68_3$, AR, which is a measure of its ability to resolve spatially separated components—the smaller the number (measured with units of degrees), the greater the ability of the array to separate multipath components (providing of course that the beamforming network is suitably designed). Since the angular resolution is a corollary of beamwidth, its relationship to the design parameter Nele is stronger than to AE.

The system bandwidth, SBW, is defined here as the bandwidth of a given frequency interval, for example the bandwidth of a carrier aggregation component carrier, a dual connectivity carrier, a bandwidth part and so on. Inversely proportional to the system bandwidth is the system metric, temporal resolution (TR). This is the ability of the receiver to separate and therefore estimate or identify multipath components in the time domain—the smaller the number (measured with units of seconds), the greater the ability of the system to estimate and resolve.

The tabular representation of FIG. 32 shows, for each design parameter, a case where the parameter relating to a first link or radio channel is equal to the parameter in the other radio channel, i.e., the design parameter in radio channel $12_1$ equals the design parameter in radio channel $12_2$. As an example, the table is represented for the condition that the first frequency interval of radio channel $12_1$ comprises lower frequencies when compared to the frequency interval of radio channel $12_2$, e.g., centre frequencies $f_1$ $f_2$. By changing this condition, other values in the table may be obtained without changing the recognition of the described dependencies. For example, referring to design parameter $66_1$, a same effective aperture may allow for a same link budget, wherein the beam width $68_2$ may be larger for the lower frequencies indicated by $BW_1 BW_2$. At the same time, the angular resolution AR $68_3$ provides for higher numbers for radio channel $12_1$ and, thus, a final resolution for radio channel $12_2$ using higher frequencies. Changing this condition to an effective aperture of radio channel $12_1$ being larger or smaller than the other radio channel, a different behaviour may be obtained.

When referring now to the number of elements per array, the same number elements in radio channels $12_1$ and $12_2$ may allow, for the same condition $f_1f_2$, for a higher link budget in radio channel $12_1$ when compared to radio channel $12_2$ for a same or equal beam width and/or angular resolutions. Changing the number of elements per array for the different radio channels so as to be larger or smaller when comparing channel 2 to channel 1, a different behaviour in the system performance parameters $68_1$, $68_2$ and $68_3$ may be obtained.

Thus, it becomes obvious, that knowledge about a behaviour of at least a part of the radio propagation channel 14 of FIG. 1 in a frequency range which is possibly unused or different to a used radio channel may provide for helpful information for adapting the currently used radio channel, i.e., to assist beam management.

FIG. 33 shows a tabular representation of a frequency independent relationship between SBW and TR, i.e., a relation of system bandwidth on the temporal resolution of the system.

The relationships illustrated in FIG. 32 and in FIG. 33 may be used, according to embodiments, to assist the beam management methods and thus achieve optimized system performance.

When referring again to FIG. 1, the wireless communication system provides at least a first radio channel and a second radio channel, wherein, without any limitation, a higher number of radio channels may be established, used and/or maintained. It has to be noted, that the radio channels may, but are not required to be used or maintained simultaneously as the knowledge about the behaviour of a first radio channel and a second radio channel and/or a third or further radio channels may comprise some validity over time, i.e., as long as the radio propagation channel does not change its structure and/or as long as the behaviour of the channel is unchanged, the obtained information about a specific radio channel may still be used, even if the radio channel itself is unused or shut down.

Further, the radio channels $12_1$ and $12_2$ may comprise a spatial overlap, at least in parts. As will be explained in more detail, they may overlap to a high amount or even completely, when both radio channels are used between two nodes only, see, for example, FIG. 1 and/or FIG. 5. Nevertheless, the embodiments of FIG. 1 and FIG. 5 are not limited to have a complete spatial overlap, in particular, when considering the multipath propagation environment of a radio propagation channel allowing to have different paths and different frequency ranges. Such different paths may provide for only a partial spatial overlap of the radio channels, which may also be true for a higher number of nodes being involved, see, for example, the schematic representation of FIG. 3 and/or FIG. 4. Obtaining the first radio channel information and/or manage beam forming for the second radio channel may, but is not required, to be performed at a specific node participating in maintaining the first radio channel, the second radio channel, respectively. Based thereon, embodiments are also formulated in connection with a measuring entity being configured to determine at least a part of the first radio channel information and to provide the first radio channel information. Further, reference is made to a deciding entity adapted for deciding about the beam forming for the second radio channel, i.e., based on the first radio channel information. The measuring entity, a measuring entity function being performed by a measurement unit and/or a deciding entity, a deciding entity function respectively performed by a decision-making unit of the wireless communication system may, thus, be located in a same node of the wireless communication system or in different nodes. One or more nodes may participate in the communication provided by radio channels $12_1$ and/or $12_2$. However, the measuring entity may be implemented in a centralized or decentralized manner in a node that is different to a communicating node with regard to radio channels $12_1$ and $12_2$. Same is true for the deciding entity, the deciding entity function respectively.

Figure 34:
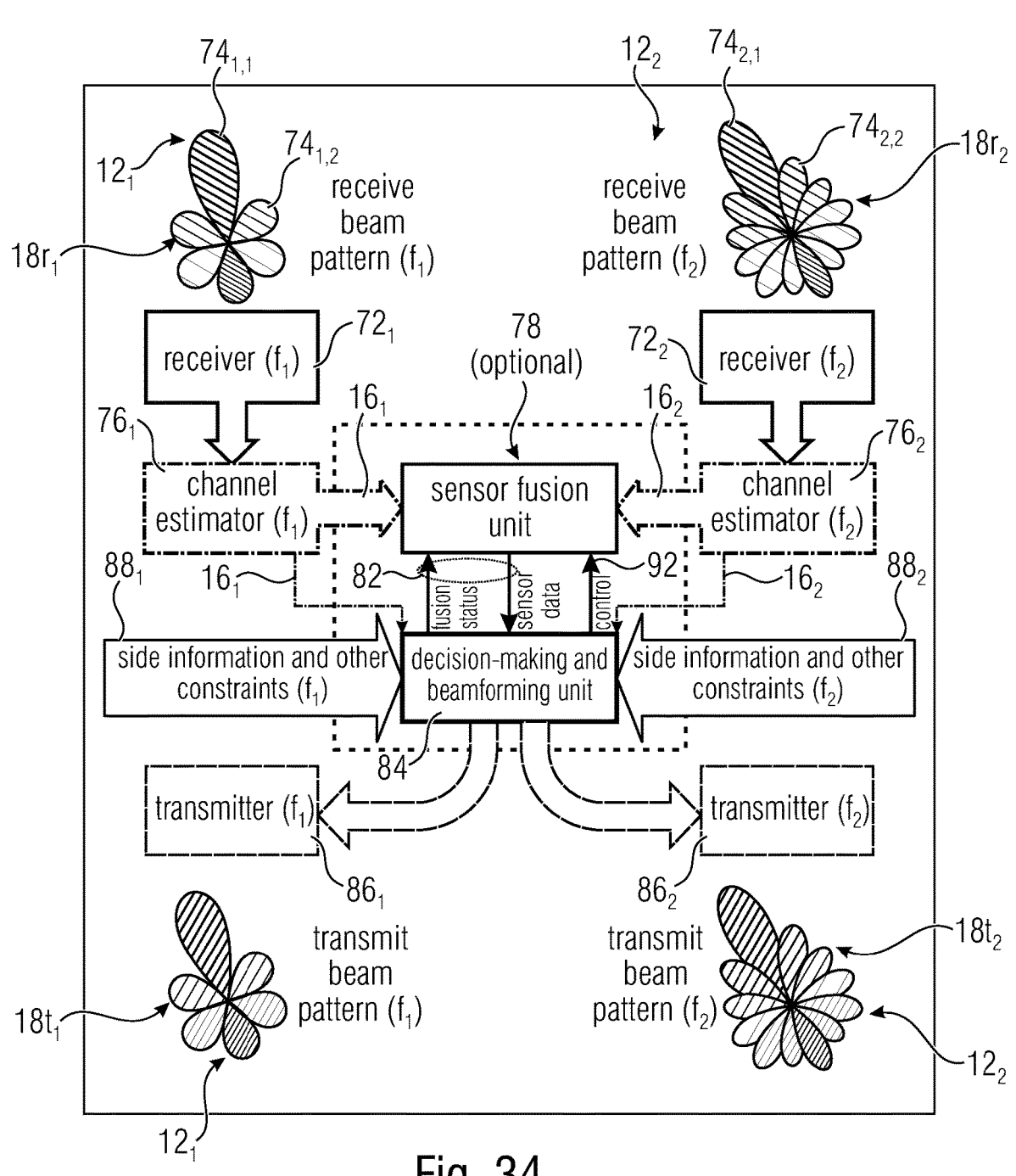
FIG. 34 shows a schematic block diagram of a part of a wireless communication system according to an embodiment comprising a deciding entity deciding about a transmit antenna pattern.

FIG. 34 shows a schematic block diagram of a part of a wireless communication system 200 according to an embodiment. For the first radio channel $12_1$ a receiver $72_1$ may form a receive beam pattern or reception antenna pattern $18r_1$ operational in the first frequency indicated by $f_1$.

For the second radio channel a receiver $72_2$ may form a second receive beam pattern or reception antenna pattern $18r_2$. A number of lobes 74 between the antenna patterns $18r_1$ and $18r_2$ may be different and/or equal. One, more or all lobes 74, e.g., a main lobe $74_{1,1}$ and $74_{2,1}$ of antenna patterns $18r_1$ and $18r_2$ may have a same or different orientation. For example, the formed antenna patterns $18r_1$ and $18r_2$ may be formed by a beamformer so as to receive a respective signal.

The settings, properties, and/or recognitions of receiver $72_1$ may be determined by a channel estimator $76_1$. Correspondingly, a channel estimator $76_2$ may be arranged so as to determine and/or evaluate channel $12_2$. As described, frequency interval $f_1$ may be in a range of larger or lower frequencies. For exchanging information with regard to one of the radio channels $12_1$ or $12_2$ to be used in the other, one of channel estimators $76_1$ and $76_2$ may be sufficient, wherein to provide a high level of optimization, it may be beneficial to evaluate more than one only, e.g., a subset or even all of the radio channels being used.

The channel estimators $76_1$ and/or $76_2$ may provide for a respective radio channel information $16_1$, $16_2$ respectively and may be referred to as a measuring entity. Alternatively, or in addition, other measurements may be performed so as to obtain the respective radio channel information and/or information indicating the radio channel $12_1$ and/or $12_2$ may be measured.

Wireless communication system 200 may comprise an optional sensor fusion unit 78 configured for receiving at least the radio channel information $16_1$ and another radio channel information, e.g., radio channel information $16_2$ indicating a behaviour of the radio channel $12_2$. The sensor fusion unit 78 may be configured for fusing the first radio channel information $16_1$ and the second radio channel information $16_2$ to obtain a fused radio channel information 82. The sensor fusion unit 78 may provide the fused channel information 82. The fused channel information 82 may comprise, for example, a fusion status and/or sensor data and may be obtained based on a sensor fusion, which combines sensory data provided by channel estimators $76_1$ and $76_2$ such that the resulting fused sensor information has less uncertainty than would be possible when these sources were being used individually. Thereby, an uncertainty reduction may be obtained which may provide for a more accurate, more complete or more dependable sensor data and/or may refer to the result of an emerging view, such as a stereoscopic vision (calculation of depth information by combining two-dimensional images from two cameras at slightly different viewpoints) as an illustrative example to be transferred to the technical field of mobile communication. That is, the sensor fusion unit 78 may implement an extrapolation of sensor information for the radio propagation channel 14 obtained from one of the frequency intervals $f_1$ or $f_2$ to the other by combining the respective information.

Wireless communication system 200 may comprise a deciding entity 84 being identified as decision-making and beam forming unit. The deciding entity may be configured for receiving information being based on the behaviour of the first radio channel and the behaviour of the second radio channel. For example, the radio channel information $16_1$ and $16_2$ and/or the fused channel information 82 may be provided to the deciding entity 82. The deciding entity 82 may be configured for deciding an antenna pattern, e.g., to be used for reception and/or transmission purpose, and for deciding about antenna pattern related parameters such as gain or power, to be selected for the second radio channel, i.e., for an application in the second radio channel or a use in the second radio channel. The antenna related parameters may relate to at least one of a gain of the antenna pattern, a transmission power of the antenna pattern, a summarized transmission power of the antenna pattern in a set of component carriers, a transmission setting/configuration of the transmitter associated with a beam forming antenna used for transmission purposes, and/or a reception setting/configuration of the receiver associated with a beam forming antenna used for reception purposes.

The decision being made by deciding entity 84 may be communicated to a transmitter $86_1$ and/or $86_2$ being implemented for transmitting a signal in the radio channel $12_1$, $12_2$ respectively. Transmitter $86_1$ may be configured for forming a transmit beam pattern or transmission antenna pattern $18t_1$ for transmitting such a signal, whilst transmitter $86_2$ may be configured for forming a transmission antenna pattern $18t_2$ using the frequency interval $f_2$ different from the antenna pattern $18t_1$ using frequency interval $f_1$. A number of lobes, null, and/or orientation of pattern $18t_1$ when compared to $18r_1$ and/or a number of lobes, nulls and/or orientation of antenna pattern $18t_2$ when compared to $18r_2$ may be same or different and is selected to be equal for illustrative purpose only.

Optionally, the deciding entity may be configured for deciding the antenna pattern and the antenna related parameters based on an interference or interference level between the radio channel $12_1$ and a different radio channel and/or between the radio channel $12_2$ and a different radio channel. Examples for such interference may be an inter-symbol or cross-channel interference. That is, interference may be used as a metric for beam selection.

Optionally, the deciding entity 84 may be adapted to obtain side information and/or additional constraints relating to radio channel $12_1$ and/or relating to radio channel $12_2$. Such additional information $88_1$, $88_2$, respectively, may be used by the deciding entity 84 for deciding the antenna pattern to be selected for the radio channel $12_1$ and/or $12_2$, i.e., the side information and/or the additional constraints may form a part of the basis for deciding about the beam pattern to be used.

Deciding entity 84 may be adapted to transmit a control signal 92 to the sensor fusion unit 78 and/or to the channel estimators $76_1$ and/or $76_2$ so as to provide for instructions which information is used for deciding about the beam pattern to be formed.

For example, the side information and/or the additional constraints may relate to at least one of:

a geo-location of at least a node of the first radio channel $12_1$;

a distance between the node of the first radio channel $12_1$ and one or more different nodes;

a relative velocity between the node of the first radio channel $12_1$ and one or more different nodes;

a relative direction of an antenna pattern used in the first radio channel and/or an antenna pattern used in the second radio channel; and a relative orientation of an antenna pattern used in the first radio channel and/or an antenna pattern used in the second radio channel.

Alternatively, or in addition, the side information may relate to at least one of a reception information, a transmission information and/or adder operational parameters. By way of example, such additional side information may indicate any operational rule to be implemented, e.g., like a temperature is too hot, then reduce a transmission power. Alternatively, or in addition and by way of non-limiting example only, it may be indicated that some specific behaviours may be implemented during some times of a day only, e.g., during a day but not during the night, during some specific dates or the like.

The deciding entity 84 may decide one or more of:

a definition, negotiation and selection of a lead carrier;

a definition, negotiation and selection of one or multiple assistant carrier(s);

a setting, a rule and/or a configuration of a sensor fusion or sensory enhancements at a receiver and/or transmit strategies/configurations at the transmitter;

a setting of a primary component carrier, PCC and/or a secondary component carrier, SCC, and/or a distribution among the multiple component carriers;

a setting of lead and/or assistance role for particular decisions, procedural input, prioritization in case of conflicting multi-objective optimization scenarios;

a request and/or a configuration of a lead and/or an assistance information from a lead and/or assistance component carrier;

an improvement estimation of the node's absolute and/or relative position, orientation, alignment, geo-location, temporal reference, frequency reference and phase reference or the like.

Combinations of such input is possible.

By way of example, conflicting multi-objective optimization scenarios may relate to different optimization criteria, e.g., a beam tracking robustness versus maximization of link SNR, high battery lifetime versus good link reliability or the like.

The receivers $72_1$ and $72_2$ may be a part of a same network node or entity, e.g., a basestation, user equipment, a relay, a measuring node or the like, but may also be implemented at different nodes. Same applies to the channel estimators with regard to the receiver and/or the sensor fusion unit and/or the deciding entity 84. However, usually, the receiver $72_1$ and the transmitter $86_1$ may be part of a same node as may be true for the receiver $72_2$ and the transmitter $86_2$.

Although obtaining the radio channel information $16_1$ and $16_2$ from a corresponding antenna pattern being used for reception may provide for a suitable and reliable way of obtaining information, embodiments are not limited hereto but may also allow to evaluate a transmission antenna pattern being used for transmission so as to obtain the radio channel information.

The IB-BMA information is used by one or multiple sensor fusion unit(s), FIG. 34, responsible to compute appropriate input to be provided to a beam management unit influencing the beam management (beam selection, beam forming etc.) in a particular band of the multiple bands used for band aggregation.

FIG. 34 shows an example of a composite channel evaluation system comprising dual channel estimators (CE). Each CE is associated with a given frequency interval and hence a specific beamformed antenna and receiver combination. The information obtained from each CE is provided to a sensor fusion unit which in turn provides sensor data and status information to a decision-making and beamforming unit (DMBU). Together with additional side information and other constraints, the DMBU provides inputs to the transmitters and their beamformed antennas It should be noted that for reasons of simplicity that although the embodiments such as in FIG. 34 shows only two frequency intervals, labelled as $f_1$ and as $f_2$, additional frequency intervals are not excluded and their inclusion would simply use the appropriate functions for each additional frequency interval.

For each frequency interval, a channel estimator may collect information from a transmitter or receiver which itself may be interfaced to the propagation channel via a beamformed antenna array. The output of each estimator may be combined in the sensor fusion unit (SFU) wherein the unit is capable of performing combination operations fully, partially, selectively, individually, sequentially, simultaneously and so on. Furthermore, the SFU is capable of interpolating, extrapolating, resampling (both up-sampling and down-sampling) in time, frequency, space and polarization. The output of the SFU comprises fusion status information and sensor data (both separate and fused) which may also contain raw or processed data from each CE.

The decision-making of deciding entity 84 and a connected beamforming unit which may be part of deciding entity but is at least connected to the respective transmitter or receiver, takes the output of the sensor fusion unit and combines it with additional inputs including frequency interval specific side information and other constraints.

Although the figure shows the SFU and DMBU as two separate units, these can be combined in the one unit as suggested by the broken-lined rectangle that encapsulates the two.

Again, for ease of representation, FIG. 34 indicates that the output of the decision-making and beamforming unit is used to provide beamforming related information for the transmitter and the beamformed transmit antenna Based on the disclosure of FIG. 34 and the other embodiments, a node of the wireless communication system 100 and/or 200 may be adapted to receive a signal in the radio channel $12_1$ using a reception antenna pattern and may select a transmission antenna pattern to be used in the radio channel $12_2$ based on the reception antenna pattern in radio channel $12_1$. That is, antenna pattern $18t_2$ may be selected based on the information obtained from pattern $18r_1$ and/or antenna pattern $18t_1$ may be formed based on knowledge being obtained from antenna pattern $18r_2$.

As an alternative or in addition, a node of the wireless communication system 100 and/or 200 may be adapted to receive a signal in the radio channel $12_1$ using reception antenna pattern $18r_1$ and may be adapted to receive a signal in the radio channel $12_2$ using reception antenna pattern $18r_2$. The node may select a transmission antenna pattern, e.g., antenna pattern $18t_1$ and/or $18t_2$ based on a fused information, e.g., fuse channel information 82, based on the initial first and second reception antenna patterns $18r_1$ and $18r_2$. Alternatively or in addition, and as described in connection with FIG. 35, the node may adapt a reception antenna pattern to be used in the radio channel $12_1$ and/or radio channel $12_2$ based on a fused information being based on the initial reception antenna patterns $18r_1$ and $18r_2$. However, as described, performing an active fusion is possible but not necessary, i.e., the deciding entity 84 may also directly obtain channel information $16_1$ and $16_2$ for such a decision.

The embodiments described herein relate to a behaviour of radio channel $12_1$ and $12_2$. Such a behaviour may be a frequency related behaviour that may differ in some extent in the different frequency intervals. However, the behaviour may be based, at least in parts, on same conditions provided in the radio propagation channel which may allow to transfer knowledge from one radio channel to another.

Figure 35:
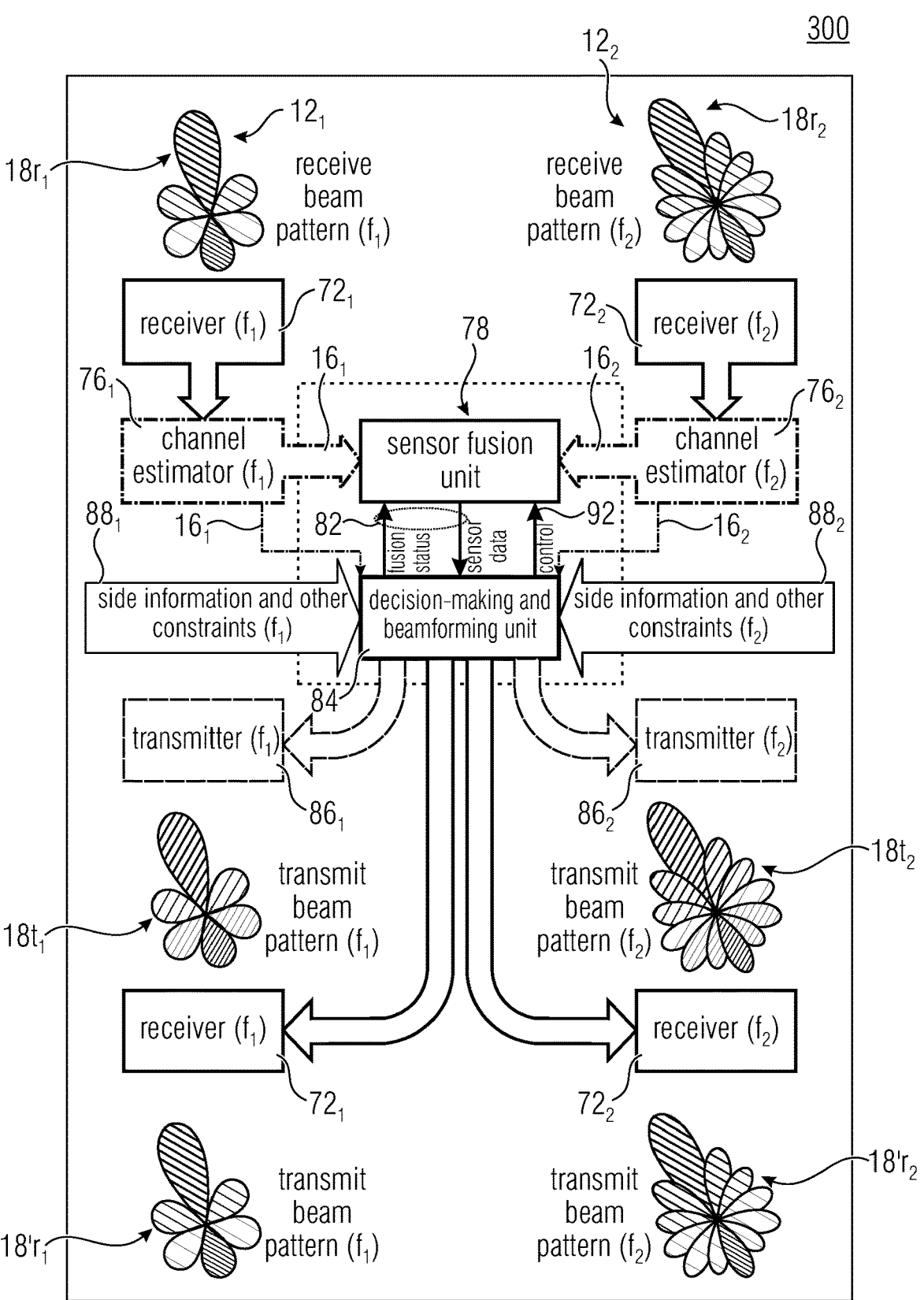
FIG. 35 shows a schematic block diagram of at least a part of a wireless communication system according to an embodiment in which the decisions being provided by the deciding entity may also relate to one or more reception antenna patterns.

FIG. 35 shows a schematic block diagram of at least a part of a wireless communication system 300 in which the decisions being provided by the deciding entity 84 may also relate to one or more adapted antenna patterns $18'r_1$, $18'r_2$ used for reception. When compared to the antenna patterns $18r_1$ and $18r_2$ being formed by receivers $72_1$, $72_2$ as described in connection with FIG. 34, antenna patterns $18'r_1$ or $18'r_2$ may be adapted, for example, by considering a possible interference between radio channels $12_1$ and $12_2$ being determined, for example, by evaluating a respective radio channel information $16_1$, $16_1$, respectively, and/or used channel information 82. The receivers forming the updated antenna patterns $18r_1$, $18r_2$ respectively may be the same receivers or different receivers when compared to receivers $71_1$ and $72_2$.

Again, deciding entity 84 may transmit a control signal 92 to sensor fusion unit 78 and/or to channel estimator $76_1$ and $76_2$ so as to provide for instructions, which information, possibly varying over time, is requested for a decision about one or more of the antenna patterns $18t_1$, $18t_2$, $18't_1$, $18't_2$.

As described, the radio channel information $16_1$ may be obtained based on measurements and/or signalling related to receiving a wireless signal. Alternatively or in addition, the radio channel information $16_1$ may be obtained based on information associated with a reception antenna pattern and/or a transmission antenna pattern used in the radio channel $12_1$. Radio channel information $16_2$ may be obtained for radio channel $12_2$ by corresponding measures.

Embodiments were described for a scenario being referred to as carrier aggregation, in which radio channels $12_1$ and $12_2$ are used by two same nodes. Further, dual connectivity (extendable to multi-connectivity without limitation) was introduced, in which a first node maintains the first radio channel to a second node and maintains at a same or a different time the second radio channel $12_2$ to a different third node. To increase the advantages obtained by the present invention, those descriptions may be transferred also to groups of nodes.

Figure 36:
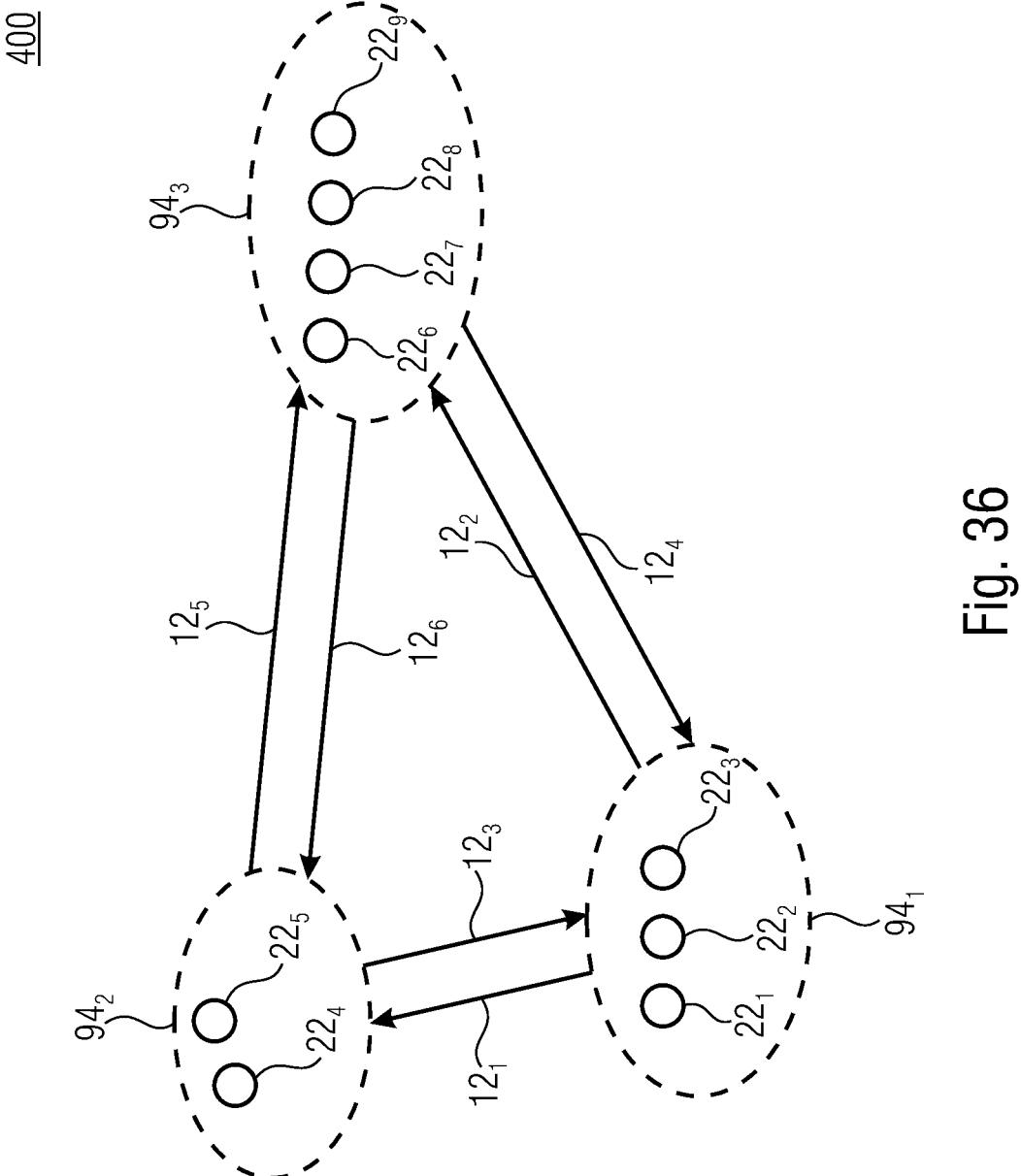
FIG. 36 shows a schematic block diagram of an example wireless communication system according to an embodiment in which devices are grouped to groups.

FIG. 36 shows a schematic block diagram of an example wireless communication system 400 according to an embodiment in which devices $22_1$ to $22_9$ are grouped to groups $94_1$, $94_2$ and $94_3$, e.g., by a logical and/or physical grouping such as a close distance to each other, wherein a different number of groups of at least one group and a single device, at least two groups or at least four groups, may be implemented. Each group may comprise any number of at least two devices.

Grouping devices in connection with the presented embodiments may be based on a finding that some devices, e.g., co-located or quasi-co-located devices may face same or at least similar radio channel conditions such that the transfer of knowledge between radio channels $12_1$ and $12_2$ may not only be performed between single devices but, at least in parts, also for groups of devices. According to an embodiment being based on the details presented when explaining dual connectivity, a first node such as device $22_2$ may be a member of group $94_1$. Radio channel $12_1$ is maintained with at least a node $22_4$ whilst radio channel $12_2$ is maintained at least with device $26_6$. At this stage, it has to be noted that a direction of the respective radio channel may be any of an uplink, a downlink or bi-directional.

Members of group $94_2$ may commonly use or share at least a part of radio channel $12_1$ whilst members of group $94_3$ may commonly use or share at least a part of radio channel $12_2$. Alternatively, or in addition, devices $22_4$ and $22_5$ of group $94_2$ may commonly use or share a radio channel $12_3$ to group $94_1$ and/or radio channels $12_5$ and/or $12_6$ to group $94_3$, which may, alternatively or in addition, share or use at least a part of a common radio channel $12_2$ with group $94_1$ and/or $12_4$ with group $94_1$.

For example, two or more devices with different measurement capabilities but co-located or quasi-co-located and connected to the same or different basestations may exchange observations/measurements of the same propagation environment 14 to obtain benefits. That is, radio channel $12_1$ may be used by a first node of the wireless communication system 400 and radio channel $12_2$ may be used by device $22_2$ and/or device $22_3$ being co-located and/or quasi-co-located to device $22_1$. However, those devices may also benefit from the measurements and/or information being obtained by use of device $22_1$ using, in this example, radio channel $12_1$. However, such a group-wise use may also be used for groups in a respective first radio channel as illustrated, for example, for groups $94_2$ and $94_6$ using radio channel $12_5$ and $12_6$ being located in different frequency intervals as well as radio channels $12_1$ and $12_3$ and $12_2$ and $12_4$, $12_5$ and $12_4$, respectively, and $12_2$ and $12_6$. Members of a group of nodes may be co-located and/or quasi-co-located nodes. This allows for multi-user cases in multi-band operation. By way of example, multiple UEs and a single basestation or more basestations may serve two groups of co-located or quasi-co-located (QCL) UEs operating in different frequency bands. Although groups $94_1$, $94_2$ and $94_3$ are illustrated as to be spaced apart from each other, different groups $94_1$ and $94_2$, $94_1$ and $94_3$ and/or $94_2$ and $94_3$ may comprise co-located or quasi-co-located nodes such as an overlap in the groups.

It should be noted that for reasons of simplicity that although the embodiments such as in FIG. 34 shows only two frequency intervals, labelled as $f_1$ and as fa, additional frequency intervals are not excluded and their inclusion would simply use the appropriate functions for each additional frequency interval.

For each frequency interval, a channel estimator may collect information from a transmitter or receiver which itself may be interfaced to the propagation channel via a beamformed antenna array. The output of each estimator may be combined in the sensor fusion unit (SFU) wherein the unit is capable of performing combination operations fully, partially, selectively, individually, sequentially, simultaneously and so on. Furthermore, the SFU is capable of interpolating, extrapolating, resampling (both up-sampling and down-sampling) in time, frequency, space and polarization. The output of the SFU comprises fusion status information and sensor data (both separate and fused) which may also contain raw or processed data from each CE.

The decision-making of deciding entity 84 and a connected beamforming unit which may be part of deciding entity but is at least connected to the respective transmitter or receiver, takes the output of the sensor fusion unit and combines it with additional inputs including frequency interval specific side information and other constraints.

Although the figure shows the SFU and DMBU as two separate units, these can be combined in the one unit as suggested by the broken-lined rectangle that encapsulates the two.

Again, for ease of representation, FIG. 34 indicates that the output of the decision-making and beamforming unit is used to provide beamforming related information for the transmitter and the beamformed transmit antenna. By extension of the concept of FIG. 34 however, additional information could also be provided for the receiver and the beamformed receive antenna as shown in FIG. 35.

The one or multiple sensor fusion units may provide a fused or extended/enhanced observation/measurement taking into account the measurement/observation in a particular band and additional information from IB-BMA.

The fused and/or extended/enhanced observation/measurement will be provided from the sensor fusion unit to the decision-making and beam management unit via an interface and an associated message space. The interface may be unidirectional or bidirectional.

The messages on the interface between the decision-making and beam forming unit and the sensor fusion unit may include configuration messages how the sensor fusion should be performed and/or what sensor information is to be reported.

The messages on the interface between the sensor fusion unit and the decision-making and beam forming unit may include messages about current capabilities of the sensor unit, current settings and acknowledgements with respect to configuration commands by the beam forming unit and fusion data as output of the sensor fusion unit.

The decisions made by the decision-making and beam forming unit, i.e., the deciding entity, may be applied at the particular band and/or at other bands which are included in the IB-BMA procedure. The associated commands may be in the form of a command to be executed, a recommendation, a suggestion or side information to be considered by the beam management unit(s) responsible for the further multiple particular bands.

The decision by one or multiple beamforming units and the associated signalling may include:

Definition, negotiation and selection of a lead carrier

Definition, negotiation and selection of one or multiple lead assistance carrier(s)

Settings, rules and/or configuration of sensor fusion or sensory enhancements at the receiver and transmit strategies/configurations at the transmitter.

Setting of PCC, SCC distribution among the multiple component carriers

Setting of "lead" and/or "assistance" for particular decisions, procedural input, prioritization in case of conflicting multi-objective optimization scenarios Request and/or configuration of "lead" and/or "assistance" information from the "lead" and/or "assistance" component carrier.

Others . . .

As described, although some embodiments are described as using two radio channels, the embodiments are not limited hereto. According to embodiments, a wireless communication system may be adapted for providing at least a third radio channel in a third frequency differing from the first frequency interval and from the second frequency interval. The wireless communication system may manage beamforming for the third radio channel based on the first radio channel information, i.e., radio channel information $16_1$ may be used for two different frequency intervals. Alternatively, or in addition, the wireless communication system may manage beamforming for the second radio channel based on the first radio channel information and a third radio channel information indicating a behaviour of the third radio channel, i.e., two or more radio channel information or information relating to two or more different frequency intervals are used for deciding about beamforming in a frequency interval.

Alternatively, or in addition, a wireless communication system may be adapted for providing at least a third radio channel in a third frequency interval differing from the first frequency interval and from the second frequency interval. The wireless communication system may manage beamforming for the third radio channel based on the first radio channel information and may manage beamforming for the second radio channel based on the first radio channel information. That is, in addition to managing beamforming and radio channel $12_2$ in FIG. 1, radio channel information $16_1$ may also be used for one or more additional different frequency intervals. Obtaining the radio channel information and/or the formed antenna pattern may be a reception antenna pattern, a transmission antenna pattern or a combination thereof.

According to some embodiments, a node may analyse one radio channel it uses and may perform control of the other channel it uses based thereon. However, e.g., when considering the non-limiting example of FIG. 36, and when considering the inventive idea that the same radio propagation channel is accessed and used, at least in parts, by more than one node, some embodiments also relate to inform other nodes about the radio channel it uses and/or analyses. For example, a first node of the wireless communication system may be adapted to use a first antenna pattern for the first radio channel and to inform a different second node at least about the first radio channel information $16_1$ and/or the used first antenna pattern. For example, the first node and the second node may communicate with a same communication partner. Such a scenario may occur, e.g., when group $94_1$ of FIG. 36 communicates with a same basestation. Information obtained by device $22_1$ may be beneficial for device $22_2$ and/or device $22_3$. Possibly but not necessarily, the nodes which exchange information are co-located or quasi-co-located. As co-located or quasi-co-located one can understand a scenario in which devices are arranged at a distance and/or position with respect to each other such that properties of a radio channel used by a first device can be inferred from a channel used by the other device. Alternatively, or in addition, such an understanding may be obtained when considering a downlink scenario from a basestation to multiple devices at a same time and by use of a single antenna pattern so as to illuminate a position of more than just one device at a same time.

According to an embodiment a device configured for operating in a wireless communication system is configured for using a first radio channel, e.g., radio channel $12_1$, in a first frequency interval. Further, the device is configured for using a second radio channel in a second frequency interval differing from the first frequency interval, e.g., channel $12_3$, $12_2$ and/or $12_4$, when referring to device $22_1$ in FIG. 36. Further, the device is configured for providing information associated with using the first radio channel $12_1$ and using the second radio channel, e.g., to a central entity or to another device performing wireless communication.

For example, the device may use the first radio channel and the second radio channel commonly for a carrier aggregation or a multi-connectivity. In FIG. 36, radio channels $12_1$ and $12_2$ used by device $22_1$ may be used for multi-connectivity. However, radio channels $12_1$ and $12_2$ might also be established, both, between groups $94_1$ and $94_2$ or, by use of a single device only for group $94_1$ and/or $94_2$ so as to perform a behaviour according to carrier aggregation.

According to an embodiment, the information associated with using the radio channel $12_1$ and using the radio channel $12_2$, $12_3$ and/or $12_4$ or a further radio channel in another frequency interval may relate to at least one of:

a capability information for supporting inter-band (IB)—beam management assistance (BMA);

further information relating to parameters of observation capabilities and associated parameterization, metrics and measurement uncertainties;

information about the message space configuration supported such as a protocol description;

information indicating features and/or assistance modes supported including antenna array properties and configurations, such as an inter-band distance between the frequency intervals, a system bandwidth per band, available bandwidth over all component carriers in one band, an antenna element number, spacing and/or geometric distribution, an effective aperture and/or an effective beam width, a beam steering angle and/or range, an effective temporal and/or angular resolution, an inter-band antenna array orientation, direction, directivity, spatial pattern and/or overlap or the like, a request for IB-BMA for a particular band, further parameters, e.g., a direction, orientation or the like, and/or specific assistance information including, e.g., a sampling rate, an aggregation level or the like.

System/Method Aspects:

A communication system connecting communication nodes at location A and location B by exchanging data using the wireless propagation channel and the effective radio channel may implement one or more of the following:

Using multiple wireless links in an aggregated mode (either carrier aggregation if the multiple wireless links terminate in the same node at each end or Dual Connectivity if the multiple wireless links terminate in different nodes at one end of the aggregated link while it remains in one single node at the other end) allowing to benefit from differences in the effective radio channel between the multiple links in different bands or the same band.

The nodes perform radio channel measurements in the multiple bands and make the measurements available to an entity responsible for the beam management other than the band the measurement was taken for.

The exchanged inter-band beam management assistance (IB-BMA) information may refer to a receiver information (measurement) and/or a transmitter information (e.g. a transmit beam pattern and/or a certain transmit beam direction).

The exchanged inter-band beam management assistance information may refer to:

Beam sweeping

Beam measurements

Beam determination

Beam reporting including beam marking by reference signals or other IDs e.g., Type II feedback to request more refined beams to be provided as spatial directional anchors in a given radio channel scenario.

Using multiple wireless links may include at least two options: first Dual connectivity of one UE with multiple gNB, secondly it included one gNB connected to multiple UEs (that is the standard configuration when a gNB serves multiple UEs in a cell) the later configuration could benefit from the embodiments if certain inter-band observations are used e.g. if a group of users is surrounded by common scatterers relevant to connect their individual radio channels over shared/common multi path components.

In such scenario—inter-band and/or inter-UE exchange of observations in the same or different bands can enhance the beam management significantly.

Furthermore, in bi-directional signalling with beamforming the gNB could be informed/signalled/requested to form additional and more sophisticated beams in order to allow for more pronounced differentiation of directions and MPC taking the Multipath environment around the group of UEs into account. This would basically allow for an enhanced/assisted CSI-RS/SSB selection, in order to provide better options for UEs in a certain area to acquire and select certain SSBs and CSI-RS.

A same band may mean same band number e.g. 48 but use of multiple component carriers or even the same component carriers but the use of multiple bandwidth parts (BWP) but is not limited hereto as a different frequency interval may be sufficient such that embodiments are not limited to widelyseparated frequency bands but also include other configurations such as intra-band contiguous and non-contiguous CA combinations.

The IB-BMA information can be exchanged between beam management entities within the same node and/or between the node using the aggregated wireless links and/or between the informing node and a third node e.g., a central entity in the network.

Device Aspects:

A communication device may be configured for communication with another communication entity using an aggregation of wireless links (component carriers) in different bands or the same band and for a same or for different communication partners, and may implement one or more of the following:

Providing capability information for supporting IB-BMA, including

Further information with respect to parameters of observation capabilities and associated parameterization, metrics and measurement uncertainties Providing information about the message space configuration supported (protocol description)

Providing information about features and assistance modes supported including antenna array properties and configurations:

Inter-band distance

System bandwidth per band (available bandwidth over all component carriers in one band)

Antenna element number, spacing and geometric distribution

Effective aperture, effective beamwidth

Beam steering angles and range

Effective temporal and angular resolution

Inter-band antenna array orientation, direction, directivity, spatial pattern overlaps etc.

Requesting IB-BMA for a particular band, and

Further parameters, e.g., direction, orientation etc.

Specific assistance information including sampling rate, aggregation level etc.

The description disclosed in this document provides a number of advantages beyond known technical solutions. Among them are the capability to adapt the information exchanged across the band and the associated usage depending on the type of beam management and/or phase or feature to be enhanced by cross carrier beam management assistance (CC-BMA or IB-BMA).

Example phases of Beam Management include but are not limited to:

Acquisition of main beam directions—initial beam pairing

Refinement of beam-pairing—optimization of beam forming

Tracking of paired beams under channel dynamics

Identification and tracking of alternative beam options and/or beam pairs for MIMO beamforming and/or fall-back options in case of multipath blockage.

In all of these phases the associated beam management procedures performed by the UE and the network can be enhanced or benefit from:

Faster acquisition of beam directions and/or beam pairing

Higher accuracy/reduced measurement uncertainty for identification of optimum selection and tracking of dominant multipath components (MPC)

More robust beam selection and combination when considering the aggregated channel of the multiple bands as a composite data pipe.

Enhanced interference reduction by more educated beam-forming

Assistance due to cross-carrier (inter-band) information exchange when allocating available bandwidth and selection of band combinations.

Improvement of metrics such as SNR, SINR, CNR, CINR etc.

Improvement of measurement accuracy in time, frequency and space

Improvement of positioning accuracy (geolocation)

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine-readable carrier.

Other embodiments comprise the computer program for performing one of the methods described herein, stored on a machine-readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The above-described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

| Abbreviations | | |
|---|---|---|
| Abbreviation | Definition | Further description |
| 2G | second generation | |
| 3G | third generation | |
| 3GPP | third generation partnership project | |
| 4G | fourth generation | |
| 5G | fifth generation | |
| 5GC | 5G core network | |
| ACLR | adjacent channel leakage ratio | |
| AP | access point | |
| ARQ | automatic repeat request | |
| BER | bit-error rate | |
| BLER | block-error rate | |
| BS | basestation transceiver | |
| BT | Bluetooth | |
| BTS | basestation transceiver | |
| CA | carrier aggregation | |
| CBR | channel busy ratio | |
| CBM | common beam management | |
| CC | component carrier | |
| CCO | coverage and capacity optimization | |
| CHO | conditional handover | |
| CLI | cross-link interference | |
| CLI-RSS | cross-link interference received signal | |
| CP1 | control plane 1 | |
| CP2 | control plane 2 | |
| CSI-RS | channel state information reference signal | |
| CU | central unit | |
| D2D | device-to-device | |
| DAPS | dual active protocol stack | |
| DC-CA | dual-connectivity carrier aggregation | |
| DECT | digitally enhanced cordless telephony | |
| DL | downlink | |
| DMRS | demodulation reference signal | |
| DOA | direction of arrival | |
| DRB | data radio bearer | |
| DU | distributed unit | |
| ECGI | E-UTRAN cell global identifier | |
| E-CID | enhanced cell ID | |
| eNB | evolved node b | |
| EN-DC | E-UTRAN-New Radio dual connectivity | |
| EUTRA | Enhanced UTRA | |
| E-UTRAN | Enhanced UTRA network | |
| gNB | next generation node-b | |
| GNSS | global navigation satellite system | |
| GPS | global positioning system | |
| HARQ | hybrid ARQ | |
| IAB | integrated access and backhaul | |
| IBM | independent beam management | |
| ID | identity/identification | |

-continued

| Abbreviations | | |
|---|---|---|
| Abbreviation | Definition | Further description |
| IIOT | industrial Internet of things | |
| KPI | key-performance indicator | |
| LTE | Long-term evolution | |
| MCG | master cell group | |
| MCS | modulation coding scheme | |
| MDT | minimization of drive tests | |
| MIMO | multiple-input/multiple-output | |
| MLR | measure, log and report | |
| MLRD | MLR device | |
| MNO | mobile network operator | |
| MR-DC | multi-RAT dual connectivity | |
| NCGI | new radio cell global identifier | |
| NG | next generation | |
| ng-eNB | next generation eNB | node providing E-UTRA user |
| NG-RAN | either a gNB or an ng-eNB | |
| NR | new radio | |
| NR-U | NR unlicensed | NR operating in unlicensed |
| OAM | operation and maintenance | |
| OEM | OEM original equipment manufacturer | |
| OTT | OTT over-the-top | |
| PCI | physical cell identifier | Also known as PCID |
| PDCP | packet data convergence protocol | |
| PER | packet error rate | |
| PHY | physical | |
| PLMN | public land mobile network | |
| QCL | quasi colocation | |
| RA | random access | |
| RACH | random access channel | |
| RAN | radio access network | |
| RAT | radio access technology | |
| RF | radio frequency | |
| RIM | radio access network information | |
| RIM-RS | RIM reference signal | |
| RLC | radio link control | |
| RLF | radio link failure | |
| RLM | radio link monitoring | |
| RP | reception point | |
| R-PLMN | registered public land mobile network | |
| RRC | radio resource control | |
| RS | reference signal | |
| RSRP | reference signal received power | |
| RSRQ | reference signal received quality | |
| RSSI | received signal strength indicator | |
| RSTD | reference signal time difference | |
| RTOA | relative time of arrival | |
| RTT | round trip time | |
| SA | standalone | |
| SCG | secondary cell group | |
| SDU | service data unit | |
| SIB | system information block | |
| SINR | signal-to-interference-plus-noise ratio | |
| SIR | signal-to-interference ratio | |
| SL | side link | |
| SNR | signal-to-noise ratio | |
| SON | self-organising network | |
| SOTA | state-of-the-art | |
| SRS | sounding reference signal | |
| SS | synchronization signal | |
| SSB | synchronization signal block | |
| SSID | service set identifier | |
| SS-PBCH | sounding signal/physical broadcast | |
| TAC | tracking area code | |
| TB | transmission block | |
| TDD | time division duplex | |
| TSG | technical specification group | |
| UE | user equipment | |
| UL | uplink | |
| URLLC | ultra-reliable low latency communication | |
| UTRAN | universal trunked radio access network | |
| V2X | vehicle-to-everything | |
| VoIP | voice over Internet protocol | |

-continued

| Abbreviations | | |
|---|---|---|
| Abbreviation | Definition | Further description |
| WI | work item | |
| WLAN | wireless local area network | |
| PDU | payload data unit | |
| PCell | Primary Cell | |
| SCell | Secondary Cell | |

REFERENCES

Reference Label Details
(use Word bookmarks)

[1] 3GPP TS 38.300 v15.0, "NR and NG-RAN Overall Description", 2018.

[2] 3GPP TS 38.213 v15.0, "Physical layer procedures for control", 2017.

[3] 3GPP TS 38.321 v15, "Medium Access Control (MAC) protocol specification", 2017.

[4] 3GPP TS 38.300 v16.0, "NR and NG-RAN Overall Description", 2020.

The invention claimed is:

1. A wireless communication system configured for providing wireless communication, the wireless communication system adapted to:

provide a first radio channel in a radio propagation channel and in a first frequency interval;

provide a second radio channel in the radio propagation channel and in a second frequency interval differing from the first frequency interval;

acquire first radio channel information indicating a behaviour of the first radio channel; and manage beamforming for the second radio channel based on the first radio channel information;

wherein at least one of the following applies:

wherein a measuring entity of the wireless communication system is to determine at least a part of the first radio channel information and to provide the first radio channel information to a deciding entity adapted for deciding about the beamforming for the second radio channel;

wireless communication system comprising a deciding entity configured for receiving information being based on the behaviour of the first radio channel and of a behaviour of the second radio channel; and for deciding an antenna pattern and antenna pattern related parameters to be selected for the second radio channel;

wireless communication system being adapted for providing at least a third radio channel in a third frequency interval differing from the first frequency interval and from the second frequency interval; wherein the wireless communication system is to manage beamforming for the third radio channel based on the first radio channel information; and/or to manage beamforming for the second radio channel based on the first radio channel information and a third radio channel information indicating a behaviour of the third radio channel;

wireless communication system being adapted for providing at least a third radio channel in a third frequency interval differing from the first frequency interval and from the second frequency interval; wherein the wireless communication system is to manage beamforming for the third radio channel based on the first radio channel information; and to manage beamforming for the second radio channel based on the first radio channel information;

a node of the wireless communication system is adapted to receive a signal in the first radio channel using a reception antenna pattern; and to select a transmission antenna pattern to be used in the second radio channel based on the reception antenna pattern;

wherein a node of the wireless communication system is adapted to receive a signal in the first radio channel using a first reception antenna pattern and is adapted to receive a signal in the second radio channel using a second reception antenna pattern; and is to select a transmission antenna pattern to be used in the first and/or second radio channel based on a fused information being based on the first and second reception antenna patterns;

wherein a node of the wireless communication system is adapted to receive a signal in the first radio channel using a first reception antenna pattern and is adapted to receive a signal in the second radio channel using a second reception antenna pattern; and is to adapt a reception antenna pattern to be used in the first and/or second radio channel based on a fused information being based on the initial first and second reception antenna patterns; and wherein a first node of the wireless communication system is adapted to use a first antenna pattern for the first radio channel; and to inform a different second node at least about:

the first radio channel information; and the used first antenna pattern.

2. The wireless communication system of claim 1, wherein the first radio channel and the second radio channel are both provided between the first node of the wireless communication system and the second node of the wireless communication system.

3. The wireless communication system of claim 1, wherein the first radio channel is provided between the first node of the wireless communication system and the second node of the wireless communication system and the second radio channel is provided between the first node of the wireless communication system and a third node of the wireless communication system.

4. The wireless communication system of claim 3, wherein the first node is a member of a first group of nodes and wherein the third node is a member of a second group of nodes; wherein members of the first group of nodes commonly use/share a part of the first radio channel and wherein members of the second group of nodes commonly use/share a part of the second radio channel.

5. The wireless communication system of claim 4, wherein members of the first group of nodes commonly use part of the propagation channel in the first frequency interval and wherein members of the second group of nodes commonly use a part of the propagation channel in the second frequency interval.

6. The wireless communication system of claim 1, wherein the first radio channel is used by the first node of the wireless communication system and the second radio channel is used by a different co-located and/or quasi co-located node of the wireless communication system.

7. The wireless communication system of claim 1, wherein the antenna pattern related parameters relate to at least one of:

a gain of the antenna pattern;

a transmission power of the antenna pattern;

a summarized transmission power of the antenna pattern in a set of component carriers;

a transmission setting/configuration of a transmitter associated with a beamforming antenna used for transmission purposes;

a reception setting/configuration of a receiver associated with a beamforming antenna used for reception purposes.

8. The wireless communication system of claim 1, wherein the deciding entity is configured for deciding the antenna pattern and the antenna pattern related parameters based on interference between the second radio channel and a different radio channel.

9. The wireless communication system of claim 1, wherein the deciding entity is adapted to acquire side information and/or additional constraints and for deciding the antenna pattern to be selected for the second radio channel based on the side information and/or the additional constraints.

10. A device configured for operating in a wireless communication system, the device configured for:

using a first radio channel in a first frequency interval;

using a second radio channel in a second frequency interval differing from the first frequency interval; and providing information associated with using the first radio channel and using the second radio channel;

wherein the device is to use the first radio channel and the second radio channel commonly for a multi-connectivity; where at least one of the following applies:

wherein the device is adapted to receive a signal in the first radio channel using a reception antenna pattern; and to select a transmission antenna pattern to be used in the second radio channel based on the reception antenna pattern;

wherein the device is adapted to receive a signal in the first radio channel using a first reception antenna pattern and is adapted to receive a signal in the second radio channel using a second reception antenna pattern; and is to select a transmission antenna pattern to be used in the first and/or second radio channel based on a fused information being based on the first and second reception antenna patterns;

wherein the device is adapted is adapted to receive a signal in the first radio channel using a first reception antenna pattern and is adapted to receive a signal in the second radio channel using a second reception antenna pattern; and is to adapt a reception antenna pattern to be used in the first and/or second radio channel based on a fused information being based on the initial first and second reception antenna patterns; and wherein the device is adapted to use a first antenna pattern for the first radio channel; and to inform a different node at least about:

the first radio channel information; and the used first antenna pattern.

11. The device of claim 10, wherein the information associated with using the first radio channel and using the second radio channel relates to at least one of:

a capability information for supporting inter-band beam management assistance, IB-BMA Further information relating to parameters of observation capabilities and associated parameterization, metrics and/or measurement uncertainties information about a message space configuration supported such as a protocol description;

information indicating features and/or assistance modes supported comprising antenna array properties and configurations, comprising one or more of:

Inter-band distance

System bandwidth per band (available bandwidth over all component carriers in one band)

Antenna element number, spacing and/or geometric distribution

Effective aperture, effective beamwidth

Beam steering angles and range

Effective temporal and angular resolution

Inter-band antenna array orientation, direction, directivity, spatial pattern and/or overlaps TX-switching Requesting IB-BMA for a particular band,
Further parameters;
Specific assistance information comprising sampling rate and/or aggregation level.

* * * * *